US011756745B2

(12) United States Patent
Brambilla et al.

(10) Patent No.: US 11,756,745 B2
(45) Date of Patent: *Sep. 12, 2023

(54) WIDE TEMPERATURE RANGE ULTRACAPACITOR

(71) Applicant: FastCAP Systems Corporation, Boston, MA (US)

(72) Inventors: Nicolò Michele Brambilla, Boston, MA (US); Fabrizio Martini, Boston, MA (US)

(73) Assignee: FASTCAP SYSTEMS CORPORATION, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,182

(22) Filed: Sep. 17, 2021

(65) Prior Publication Data

US 2022/0254575 A1    Aug. 11, 2022

Related U.S. Application Data

(63) Continuation-in-part of application No. 15/660,950, filed on Jul. 26, 2017, now Pat. No. 11,127,537, which is a continuation of application No. PCT/US2016/015237, filed on Jan. 27, 2016.

(60) Provisional application No. 62/269,077, filed on Dec. 17, 2015, provisional application No. 62/269,063, filed on Dec. 17, 2015, provisional application No. 62/108,494, filed on Jan. 27, 2015, provisional application No. 62/108,162, filed on Jan. 27, 2015.

(51) Int. Cl.
| | |
|---|---|
| *H01G 11/04* | (2013.01) |
| *H01G 9/028* | (2006.01) |
| *H01G 9/15* | (2006.01) |
| *H01G 11/56* | (2013.01) |
| *H01G 11/62* | (2013.01) |
| *H01G 11/64* | (2013.01) |

(52) U.S. Cl.
CPC ............. *H01G 11/04* (2013.01); *H01G 9/028* (2013.01); *H01G 9/15* (2013.01); *H01G 11/56* (2013.01); *H01G 11/62* (2013.01); *H01G 11/64* (2013.01); *Y02E 60/13* (2013.01)

(58) Field of Classification Search
CPC ........ H01G 11/04; H01G 11/56; H01G 11/62; H01G 11/64; H01G 9/028; H01G 9/15
See application file for complete search history.

(56) References Cited

U.S. PATENT DOCUMENTS

| | | | |
|---|---|---|---|
| 3,185,903 A | 5/1965 | Genovese | |
| 3,982,182 A | 9/1976 | Hogg | |
| 4,252,873 A | 2/1981 | Epstein et al. | |
| 4,349,910 A | 9/1982 | Belz | |
| 4,408,259 A | 10/1983 | Muranaka et al. | |
| 4,604,676 A | 8/1986 | Senda et al. | |
| 4,934,366 A | 6/1990 | Truex et al. | |
| 4,982,485 A | 1/1991 | Nakaya et al. | |
| 5,440,447 A | 8/1995 | Shipman et al. | |
| 5,441,827 A | 8/1995 | Gratzel et al. | |
| 5,476,709 A | 12/1995 | Inoue et al. | |
| 5,710,699 A | 1/1998 | King et al. | |
| 5,711,988 A | 1/1998 | Tsai et al. | |
| 5,885,650 A | 3/1999 | Melody et al. | |
| 5,923,619 A | 7/1999 | Knapen et al. | |
| 5,945,749 A | 8/1999 | Li | |
| 5,982,156 A | 11/1999 | Weimer et al. | |
| 6,059,847 A | 5/2000 | Farahmandi et al. | |
| 6,118,251 A | 9/2000 | Atwater | |
| 6,193,032 B1 | 2/2001 | Lesieutre et al. | |
| 6,193,779 B1 | 2/2001 | Reichert et al. | |
| 6,194,815 B1 | 2/2001 | Carroll | |
| 6,201,685 B1 | 3/2001 | Jerabek et al. | |
| 6,205,016 B1 | 3/2001 | Niu | |
| 6,232,706 B1 | 5/2001 | Dai et al. | |
| 6,257,332 B1 | 7/2001 | Vidrine et al. | |
| 6,304,427 B1 | 10/2001 | Reed et al. | |
| 6,318,457 B1 | 11/2001 | Den Boer et al. | |
| 6,350,488 B1 | 2/2002 | Lee et al. | |
| 6,388,423 B1 | 5/2002 | Schilleci, Jr. | |
| 6,413,285 B1 | 7/2002 | Chu et al. | |
| 6,444,326 B1 | 9/2002 | Smith | |
| 6,454,816 B1 | 9/2002 | Lee et al. | |
| 6,491,848 B1 | 12/2002 | Sato et al. | |
| 6,498,712 B1 | 12/2002 | Ditlya | |
| 6,511,760 B1 | 1/2003 | Barone et al. | |
| 6,514,113 B1 | 2/2003 | Lee et al. | |
| 6,565,701 B1 | 5/2003 | Jerabek et al. | |
| 6,665,169 B2 | 12/2003 | Tennent et al. | |

(Continued)

FOREIGN PATENT DOCUMENTS

| | | |
|---|---|---|
| CN | 1096611 A | 12/1994 |
| CN | 1317809 A | 10/2001 |

(Continued)

OTHER PUBLICATIONS

[No Author Listed], New technology for electric vehicle. Japan Electric Society, Electric Vehicle Drive System Survey Special Committee. Machinery Industry Press. Section 5.6. Aug. 2008:134-9.

[No. Author Listed], Principles of Automobile Engines. The Peoples Transportation Press. Oct. 2007:260.

An et al., "Electrochemical Properties of High-Power Supercapacitors Using Single—Walled Carbon Nanotube Electrodes," Adv. Funct. Mater., Oct. 2001, 387-392, vol. 11, No. 5.

An, et al., "Supercapacitors Using Single—Walled Carbon Nanotube Electrodes", Advanced Materials, Apr. 2001, pp. 497-500, vol. 13, No. 7.

(Continued)

*Primary Examiner* — C Melissa Koslow

(57) ABSTRACT

A solid state polymer electrolyte is disclosed for use in an ultracapacitor. The electrolyte includes an ionic liquid and a polymer and may include other additives, wherein an ultracapacitor that utilizes the solid state electrolyte is configured to output electrical energy at temperatures between about −40° C. and about 250° C. or more.

17 Claims, 12 Drawing Sheets

(56) References Cited

U.S. PATENT DOCUMENTS

| | | |
|---|---|---|
| 6,764,874 B1 | 7/2004 | Zhang et al. |
| 6,872,681 B2 | 3/2005 | Niu et al. |
| 6,906,911 B2 | 6/2005 | Ikeda et al. |
| 6,914,341 B1 | 7/2005 | McIntyre |
| 6,924,059 B1 | 8/2005 | Kawakami et al. |
| 6,927,475 B2 | 8/2005 | Lu |
| 6,952,060 B2 | 10/2005 | Goldner et al. |
| 6,962,823 B2 | 11/2005 | Empedocles et al. |
| 7,070,833 B2 | 7/2006 | Smith et al. |
| 7,126,207 B2 | 10/2006 | Mosley et al. |
| 7,168,487 B2 | 1/2007 | Salamitou et al. |
| 7,201,627 B2 | 4/2007 | Ohnuma |
| 7,327,556 B2 | 2/2008 | Ro et al. |
| 7,335,395 B2 | 2/2008 | Ward et al. |
| 7,381,367 B1 | 6/2008 | Baker et al. |
| 7,468,679 B2 | 12/2008 | Feluch |
| 7,493,962 B2 | 2/2009 | Sheffield |
| 7,511,941 B1 | 3/2009 | Gallay et al. |
| 7,567,013 B2 | 7/2009 | Lu et al. |
| 7,645,434 B2 | 1/2010 | Welz-Biermann et al. |
| 7,699,102 B2 | 4/2010 | Storm et al. |
| 7,713,658 B2 | 5/2010 | Mizuta et al. |
| 7,785,558 B2 | 8/2010 | Hikata |
| 7,834,197 B2 | 11/2010 | Nishida et al. |
| 7,897,209 B2 | 3/2011 | Shibuya et al. |
| 7,914,927 B2 | 3/2011 | Mizuta et al. |
| 7,982,345 B2 | 7/2011 | Tung et al. |
| 7,982,439 B2 | 7/2011 | Trainor et al. |
| 7,999,695 B2 | 8/2011 | Rodney et al. |
| 8,025,971 B2 | 9/2011 | Maeno et al. |
| 8,168,331 B2 | 5/2012 | Best et al. |
| 8,284,539 B2 | 10/2012 | Lu et al. |
| 8,531,818 B2 | 9/2013 | Hashimoto et al. |
| 8,760,851 B2 | 6/2014 | Signorelli et al. |
| 8,932,750 B2 | 1/2015 | Cooley et al. |
| 9,001,495 B2 | 4/2015 | Martini et al. |
| 9,013,144 B2 | 4/2015 | Cooley et al. |
| 9,017,634 B2 | 4/2015 | Brambilla et al. |
| 9,206,672 B2 | 12/2015 | Cooley et al. |
| 9,209,434 B2 | 12/2015 | Epstein |
| 9,214,709 B2 | 12/2015 | Cooley et al. |
| 9,218,917 B2 | 12/2015 | Brambilla et al. |
| 9,515,499 B2 | 12/2016 | Signorelli et al. |
| 9,558,894 B2 | 1/2017 | Signorelli et al. |
| 9,679,703 B2 | 6/2017 | Bendale et al. |
| 9,683,441 B2 | 6/2017 | Signorelli et al. |
| 9,954,382 B2 | 4/2018 | Cooley et al. |
| 2001/0006108 A1 | 7/2001 | Brett |
| 2001/0040379 A1 | 11/2001 | Schultz et al. |
| 2002/0043369 A1 | 4/2002 | Vinegar et al. |
| 2002/0159943 A1 | 10/2002 | Smalley et al. |
| 2002/0177018 A1 | 11/2002 | Fuglevand |
| 2003/0003359 A1 | 1/2003 | Banno et al. |
| 2003/0027038 A1 | 2/2003 | Tsukamoto et al. |
| 2003/0030969 A1 | 2/2003 | Farahmandi et al. |
| 2003/0081372 A1 | 5/2003 | Nakazawa et al. |
| 2004/0084219 A1 | 5/2004 | Moore et al. |
| 2004/0131937 A1 | 7/2004 | Chen et al. |
| 2004/0188350 A1 | 9/2004 | Beste et al. |
| 2004/0229117 A1 | 11/2004 | Mitani et al. |
| 2004/0265682 A1 | 12/2004 | Hudson et al. |
| 2005/0152096 A1 | 7/2005 | Farahmandi et al. |
| 2005/0172721 A1 | 8/2005 | Daigle |
| 2005/0182744 A1 | 8/2005 | Kawabata et al. |
| 2005/0208207 A1 | 9/2005 | Hinoki et al. |
| 2005/0230270 A1 | 10/2005 | Ren et al. |
| 2005/0231893 A1 | 10/2005 | Harvey |
| 2005/0234177 A1 | 10/2005 | Zaghib et al. |
| 2005/0238810 A1 | 10/2005 | Scaringe et al. |
| 2006/0019168 A1 | 1/2006 | Li et al. |
| 2006/0191681 A1 | 8/2006 | Storm et al. |
| 2006/0194102 A1 | 8/2006 | Keshishian et al. |
| 2006/0256506 A1 | 11/2006 | Konuma et al. |
| 2006/0279906 A1 | 12/2006 | Stemen et al. |
| 2007/0015336 A1 | 1/2007 | Farahmandi et al. |
| 2007/0024266 A1 | 2/2007 | Yurgil |
| 2007/0026295 A1 | 2/2007 | Angell et al. |
| 2007/0076349 A1 | 4/2007 | Dementiev et al. |
| 2007/0097598 A1 | 5/2007 | Siggel et al. |
| 2007/0146965 A1 | 6/2007 | Mitchell et al. |
| 2007/0175663 A1 | 8/2007 | Rotthaeuser |
| 2007/0188977 A1 | 8/2007 | Takeda et al. |
| 2007/0254213 A1 | 11/2007 | Best et al. |
| 2007/0258192 A1 | 11/2007 | Schindall et al. |
| 2007/0258193 A1 | 11/2007 | Zhong et al. |
| 2007/0259216 A1 | 11/2007 | Logan |
| 2007/0287072 A1 | 12/2007 | Liegl |
| 2007/0292746 A1 | 12/2007 | Sloop |
| 2007/0296606 A1 | 12/2007 | Godager |
| 2008/0013224 A1 | 1/2008 | Kim et al. |
| 2008/0068801 A1 | 3/2008 | Wilk |
| 2008/0083626 A1 | 4/2008 | Kubo et al. |
| 2008/0090183 A1 | 4/2008 | Zhu et al. |
| 2008/0094777 A1 | 4/2008 | Itahashi et al. |
| 2008/0123330 A1 | 5/2008 | Sullivan |
| 2008/0128123 A1 | 6/2008 | Gold |
| 2008/0150524 A1 | 6/2008 | Song et al. |
| 2008/0192407 A1 | 8/2008 | Lu et al. |
| 2008/0212261 A1 | 9/2008 | Ajayan et al. |
| 2008/0316678 A1 | 12/2008 | Ehrenberg et al. |
| 2009/0011330 A1 | 1/2009 | Onodera et al. |
| 2009/0021890 A1 | 1/2009 | Bourcier et al. |
| 2009/0102478 A1 | 4/2009 | Reiderman et al. |
| 2009/0194314 A1 | 8/2009 | Varkey et al. |
| 2009/0250409 A1 | 10/2009 | Fiene et al. |
| 2009/0272935 A1 | 11/2009 | Hata et al. |
| 2009/0272946 A1 | 11/2009 | Lu |
| 2009/0286163 A1 | 11/2009 | Shin et al. |
| 2009/0294753 A1 | 12/2009 | Hauge et al. |
| 2009/0302153 A1 | 12/2009 | Matasso et al. |
| 2009/0303658 A1 | 12/2009 | Hiroyuki et al. |
| 2010/0016287 A1 | 1/2010 | Bonanomi et al. |
| 2010/0046142 A1 | 2/2010 | Aitchison et al. |
| 2010/0119934 A1 | 5/2010 | Ushio et al. |
| 2010/0134955 A1 | 6/2010 | O'Connor et al. |
| 2010/0178564 A1 | 7/2010 | Asari et al. |
| 2010/0194117 A1 | 8/2010 | Pabon et al. |
| 2010/0196600 A1 | 8/2010 | Shibuya et al. |
| 2010/0196758 A1 | 8/2010 | Hojo et al. |
| 2010/0236777 A1 | 9/2010 | Partouche et al. |
| 2010/0259866 A1 | 10/2010 | Shaffer et al. |
| 2011/0049901 A1 | 3/2011 | Tinnen et al. |
| 2011/0057151 A1 | 3/2011 | Chen et al. |
| 2011/0080689 A1 | 4/2011 | Bielawski et al. |
| 2011/0085285 A1 | 4/2011 | Zednicek et al. |
| 2011/0122662 A1 | 5/2011 | Li et al. |
| 2011/0141661 A1 | 6/2011 | Muthu et al. |
| 2011/0150736 A1 | 6/2011 | Hagiwara et al. |
| 2011/0151317 A1 | 6/2011 | Giroud et al. |
| 2011/0170236 A1 | 7/2011 | Young |
| 2012/0154979 A1 | 6/2012 | Signorelli et al. |
| 2012/0156528 A1 | 6/2012 | Cooley |
| 2012/0169298 A1 | 7/2012 | Martin |
| 2012/0268074 A1 | 10/2012 | Cooley et al. |
| 2012/0313586 A1 | 12/2012 | Signorelli et al. |
| 2013/0026978 A1 | 1/2013 | Cooley et al. |
| 2013/0029215 A1 | 1/2013 | Signorelli et al. |
| 2013/0033130 A1 | 2/2013 | Nair et al. |
| 2013/0044130 A1 | 2/2013 | Geisner et al. |
| 2013/0044405 A1 | 2/2013 | Brambilla et al. |
| 2013/0045157 A1 | 2/2013 | Brambilla et al. |
| 2013/0141840 A1 | 6/2013 | Cooley et al. |
| 2013/0235509 A1 | 9/2013 | Ruoff et al. |
| 2013/0342962 A1 | 12/2013 | Fletcher et al. |
| 2014/0042988 A1 | 2/2014 | Kuttipillai |
| 2014/0057164 A1 | 2/2014 | Brambilla et al. |
| 2014/0265565 A1 | 9/2014 | Cooley et al. |
| 2014/0265580 A1 | 9/2014 | Cooley et al. |
| 2015/0000118 A1 | 1/2015 | Zhao et al. |
| 2015/0002987 A1 | 1/2015 | Signorelli et al. |
| 2015/0107824 A1 | 4/2015 | Signorelli et al. |
| 2015/0210548 A1 | 7/2015 | Brambilla et al. |
| 2015/0218913 A1 | 8/2015 | Cooley et al. |
| 2015/0279578 A1 | 10/2015 | Martini et al. |

(56) References Cited

U.S. PATENT DOCUMENTS

| | | |
|---|---|---|
| 2015/0287961 A1 | 10/2015 | Signorelli et al. |
| 2017/0316889 A1 | 11/2017 | Martini et al. |
| 2018/0068804 A1 | 3/2018 | Brambilla et al. |
| 2018/0135408 A1 | 5/2018 | Cooley et al. |
| 2018/0171777 A1 | 6/2018 | Cooley et al. |
| 2018/0204689 A1 | 7/2018 | Brambilla |
| 2018/0211794 A1 | 7/2018 | Brambilla |
| 2021/0327655 A1 | 10/2021 | Brambilla |

FOREIGN PATENT DOCUMENTS

| | | |
|---|---|---|
| CN | 1538470 A | 10/2004 |
| CN | 1759497 A | 4/2006 |
| CN | 101180691 A | 5/2008 |
| CN | 101221853 A | 7/2008 |
| CN | 101222055 A | 7/2008 |
| CN | 101395748 A | 3/2009 |
| CN | 103682434 A | 3/2014 |
| EP | 1146527 A2 | 10/2001 |
| EP | 1305502 B1 | 3/2007 |
| JP | S63261811 A | 10/1988 |
| JP | H01220424 A | 9/1989 |
| JP | H05159972 A | 6/1993 |
| JP | 05234814 | 9/1993 |
| JP | H09293490 A | 11/1997 |
| JP | 2002535808 A | 10/2002 |
| JP | 2003115422 A | 4/2003 |
| JP | 2003133185 A | 5/2003 |
| JP | 2004123653 A | 4/2004 |
| JP | 2004127774 A | 4/2004 |
| JP | 2004153101 A | 5/2004 |
| JP | 2007109609 A | 4/2007 |
| JP | 2007131596 A | 5/2007 |
| JP | 2007273149 | 10/2007 |
| JP | 2008088135 A | 4/2008 |
| JP | 2009534828 A | 9/2009 |
| JP | 2010109355 A | 5/2010 |
| JP | 2010220413 A | 9/2010 |
| JP | 2010245070 A | 10/2010 |
| JP | 2012074541 A | 4/2012 |
| KR | 101386903 B1 | 4/2014 |
| RU | 98846 U1 | 10/2010 |
| WO | 9407272 A1 | 3/1994 |
| WO | 9966985 A1 | 12/1999 |
| WO | 0042674 | 7/2000 |
| WO | 2004082059 A1 | 9/2004 |
| WO | 2005101432 A1 | 10/2005 |
| WO | 2007055392 A1 | 5/2007 |
| WO | 2007101303 A1 | 9/2007 |
| WO | 2008016990 A2 | 2/2008 |
| WO | 2009137508 A1 | 11/2009 |
| WO | 2011029006 A2 | 3/2011 |
| WO | 2012041437 A2 | 4/2012 |
| WO | 2014088712 A1 | 6/2012 |
| WO | 2012151618 A1 | 11/2012 |
| WO | 2012162500 A2 | 11/2012 |
| WO | 2013010641 A1 | 1/2013 |
| WO | 2013016145 A1 | 1/2013 |
| WO | 2013126915 A1 | 8/2013 |
| WO | 2014145259 A2 | 9/2014 |
| WO | 2015054432 A1 | 4/2015 |
| WO | 2015102716 A2 | 7/2015 |
| WO | 2015171528 A1 | 11/2015 |

OTHER PUBLICATIONS

Awad, et al., "Thermal degradation studies of alkyl-imidazolium salts and their application in nanocomposites," Thermochimica Acta, pp. 3-11, 2004, vol. 409.

Balducci, et al., "High temperature carbon—carbon supercapacitor using ionic liquid as electrolyte," J. Power Sources, pp. 922-927, Jan. 3, 2007, vol. 165.

Borges et al., Supercapacitor Operating at 200 Degrees Celsius. Scientific Reports. 2013;3:2572. 6 pages.

Borra et al., Deposition of metal films on an ionic liquid as a basis for a lunar telescope. Jun. 2007;447:979-81.

Brandon et al., Low-Temperature Supercapacitors. NASA Tech Briefs. Jul. 2008:11-12.

Courtney et al., Ionic Liquid Ion Source Emitter Arrays Fabricated on Bulk Porous Substrates for Spacecraft Propulsion. MIT Doctoral Thesis. Jun. 2011. 334 pages.

Dahi et al., Polyimide/ionic liquid composite membranes for fuel cells operating at high temperatures. Electrochimica Acta. Jun. 2014;130:830-40.

Dahi et al., Supported ionic liquid membranes for water and volatile organic compounds separation: Sorption and permeation properties. Journal of Membrane Science 2014;458:164-78. Epub Feb. 10, 2014.

Diaz et al., Progress in the use of ionic liquids as electrolyte membranes in fuel cells. Journal of Membrane Science. Nov. 2014;469:379-96.

Emmenegger, et al., "Investigation of Electrochemical Double-layer (ECDL) Capacitors Electrodes Based on Carbon Nanotubes and Activated Carbon Materials," J. of Power Sources, 2003,pp. 321-329, vol. 124.

Extended European Search Report for EP App. No. 16812065.7 dated Nov. 7, 2018.

Farmer et al., The oxidation of alcohols in substituted imidazolium ionic liquids using ruthenium catalysts. Green Chemistry. 2002;4:97-102.

Halber, "Researchers Fired Up Over New Battery", The Tech, Feb. 8, 2006, pp. 1, 5, vol. 50, No. 16.

Hensley, et al., "The evolution of oilfield batteries", Oilfield Review, Autumn 1998, pp. 42-57.

Hua, Diesel Engine Failure Analysis. Coal Industry Press. 1987:217-9.

International Search Report and Written Opinion for PCT/US2012/039342 dated Dec. 6, 2012.

International Search Report and Written Opinion for PCT/US2013/027697 dated Jun. 26, 2013.

Izadi-Najafabadi et al., Extracting the full potential of single-walled carbon nanotubes as durable supercapacitor electrodes operable at 4 V with high power and energy density. Adv Mater. Sep. 15, 2010;22(35)E235-41.

Koch, "Electrochemical Double Layer Capacitors for High Temperature Applications," 14th International Seminar on Double Layer Capacitors and Hybrid Energy Storage Devices, Dec. 6-8, 2004, pp. 33-39.

Koch, "Thermally Robust Capacitors for the Drilling Industry," Report for U.S. Dept. of Energy Grant No. DE-FG02-06ER84598 for the period Jun. 28, 2006 to Mar. 27, 2007. 19 pages.

Liu, et al., "Graphene-Based Supercapacitor with an Ultrahigh Energy Density," Nano Lett., pp. 4863-4868, 2010, vol. 10.

Marincic, "High Temperature Electrochemical Double Layer Capacitors with Reduced Leakage Rate," 14th International Seminar on Double Layer Capacitors and Hybrid Energy Storage Devices, Dec. 6-8, 2004,pp. 310-316.

Maxwell Technologies Application Note, "Maxwell Technologies' Test Procedures for Capacitance, ESR, Leakage Current and Self-Discharge Characterizations of Ultracapacitors," Jul. 2009,pp. 1-10.

Murakami, et al., "Growth of Vertically Aligned Single-walled Carbon Nanotube Films on Quartz Substrates and Their Optical Anisotropy," Chem. Phys. Lett., 2004, pp. 298-303, vol. 385.

Ngo et al., "Thermal properties of imidazolium ionic liquids," Thermochimica Acta, pp. 97-102, 2000, vol. 357-58.

Nishida, et al., "Physical and electrochemical properties of 1-alkyl-3-nriethylirnidazolium tetrafluoroborate for electrolyte," J. Fluorine Chem., pp. 135-141,2003, vol. 120.

Niu, et al., "High Power Electrochemical Capacitors Based on Carbon Nanotube Electrodes," Appl. Phys. Lett., Mar. 17, 1997, pp. 1480-1482, vol. 70, No. 11.

Office Action dated Apr. 16, 2019 for CN App No. 201280036518.X.

Office Action dated Jul. 16, 2014 for U.S. Appl. No. 12/928,897.

(56) References Cited

OTHER PUBLICATIONS

Randstrom, "The influence of air and its components on the cathodic stability of N-butyl-N-methylpyrrolidinium bis(trifluoromethanesulfonyl)imide," Electrochimica Acta, pp. 1837-1842, Aug. 19, 2007, vol. 53.
Robertson, "Realistic applications of CNTs," materialstoday, Oct. 2004, pp. 46-52, vol. 7, No. 10.
Sato et al., Electrochemical properties of novel ionic liquids for electric double layer capacitor applications. Electrochimica Acta. 2004;49:3603-11. Epub May 8, 2004.
Signorelli et al., Electrochemical Double-Layer Capacitors Using Carbon Nanotube Electrode Structures. Proceedings of teh IEEE. Oct. 2009;97(11):1837-47.
Signorelli, et al., "Carbon Nanotube Enhanced Ultracapacitor", MIT Lab. for Electromagnetic and Electronic Systems; Sep. 2004, 2 pages.
Signorelli, et al., "Fabrication and Electrochemical Testing of the First Generation Carbon-Nanotube Based Ultracapacitor Cell," 17th International Seminar on Double Layer Capacitors and Hybrid Energy Storage Devices, Dec. 10-12, 2007, pp. 70-78.
Signorelli, et al., "High Density Energy Storage Using a Nanotube-Enhanced Ultracapacitor," 16th International Seminar on Double Layer Capacitors and Hybrid Energy Storage Devices, Dec. 4-6, 2006, pp. 15-21.
Signorelli, et al., "High Potential Vertically Aligned Carbon Nanotubes as EDLC Electrodes," 18th International Seminar on Double Layer Capacitors and Hybrid Energy Storage Devices, Dec. 8-10, 2008, pp. 73-79.
Signorelli, et al., "Nanotube Enhanced Ultracapacitor," 14th International Seminar on Double Layer Capacitors and Hybrid Energy Storage Devices, Dec. 6-8, 2004, pp. 49-61.
Signorelli, et al., "Nanotube Enhanced Ultracapacitor," 15th International Seminar on Double Layer Capacitors and Hybrid Energy Storage Devices, Dec. 5-7, 2005, pp. 158-168.
Ue, et al., "Application of Low-Viscosity Ionic Liquid to the Electrolyte of Double-Layer Capacitors," J. Electrochem. Soc., Feb. 28, 2003,pp. A499-A502, vol. 150, No. 4.
Wongwiriyapan, et al., "Direct Growth of Single-Walled Carbon Nanotube Networks on Alumina Substrate: A novel route to Ultrasensitive Gas Sensor Fabrication", Japanese Journal of Applied Physics, Nov. 9, 2005, pp. 8227-8230, vol. 44, No. 11.
Zhang, Status of patents and Development Trends Report in Various Industries. Intellectual Property Publishing House. Dec. 2009. 117-8.
Zuckerbrod, et al., "How Dry I Am: Optimizing Cell Performance Through Proper Component Drying," 15th International Seminar on Double Layer Capacitors and Hybrid Energy Storage Devices, Dec. 5-7, 2005,pp. 101-110.
[No Author Listed], Oscilla Power, Homepage. Web Printout. Last accessed Feb. 29, 2012 from <http://oscillapower.com/>. 2 pages.
[No Author Listed], Oscilla Power, iMEC Technology. Web Printout. Last accessed Feb. 29, 2012 from <http://oscillapower.com/imec-technology/>.
Extended European Search Report for EP App. No. 12817809.2 dated Jul. 14, 2015.
Extended European Search Report for EP App. No. 13751667.0 dated Sep. 21, 2015.
Extended European Search Report for EP dated Feb. 4, 2015 for EP App. No. 12810706.7.
International Preliminary Report on Patentability for PCT/US2012/045994 dated Jan. 23, 2014.
International Preliminary Report on Patentability for PCT/US2012/047474 dated Feb. 6, 2014.
International Preliminary Report on Patentability for PCT/US2013/027697 dated Sep. 4, 2014.
International Preliminary Report on Patentability for PCT/US2014/059971 dated Apr. 21, 2016.
International Preliminary Report on Patentability for PCT/US2016/015237 dated Aug. 10, 2017.
International Search Report and Written Opinion for PCT/US2007/068314 dated Feb. 13, 2008.
International Search Report and Written Opinion for PCT/US2012/041438 dated Nov. 19, 2012.
International Search Report and Written Opinion for PCT/US2012/045994 dated Dec. 26, 2012.
International Search Report and Written Opinion for PCT/US2012/047474 dated Oct. 16, 2012.
International Search Report and Written Opinion for PCT/US2014/059971 dated Jul. 28, 2015.
International Search REport and Written Opinion for PCT/US2016/015237 dated Feb. 2, 2017.
International Search REport for PCT/US2014/029992 dated Oct. 7, 2014.
International Search Report for PCT/US2014/030310 dated Oct. 10, 2014.
Office Action dated Dec. 11, 2013 for U.S. Appl. No. 12/928,897.
Office Action dated Jun. 18, 2014 for U.S. Appl. No. 13/588,452.
Office Action dated May 29, 2014 for U.S. Appl. No. 13/560,628.
Office Action dated Oct. 15, 2014 for U.S. Appl. No. 13/587,037.

PRIMARY STRUCTURES OF CATIONS

Fig. 12

| Name |
| --- |
| Ethylene Carbonate |
| Ethyl Acetate |
| Methyl Formate |
| Methyl Acetate |
| 1, 3-Dioxalane |
| Triethylamine |
| Methyl Propionate |
| Ethyl Butyrate |
| Sulfuryl Chloride Fluoride Catholytes |
| Chlorofluoro carbon |
| Thionyl Chloride |
| 2-Methyltetrahydrofuran |
| Methyl Butyrate |
| Ethyl Propionate |
| EMC |
| Methyl Butyrate |
| Ethyl Propionate |
| Propyl Butyrate |
| Butyl Butyrate |
| Propionitrile |
| Butyronitrile |
| Chloroethane |
| Chlorodifluoromethane |
| Methyl Isobutyl Ketone |
| Pentane |
| n-Propyl Alcohol |
| n-Butyl Chloride |
| Ethyl Ether |
| Triethylamine |
| Ethyl Alcohol |
| Methyl t-Butyl Ether |
| Tetrahydrofuran |
| Isobutyl Alcohol |
| Iso-Octane |
| Methanol |
| Hexane |
| Dichloromethane |
| Toluene |

Fig. 13

| Cation | | Anion | |
|---|---|---|---|
| 1-Butyl-3-methylimidazolium | BMIM | Tetrafluoro(borate) | $BF_4$ |
| 1-Hexyl-3-methylimidazolium | HMIM | Tetrafluoro(borate) | $BF_4$ |
| 1-Hexyl-3-methylimidazolium | HMIM | Hexafluorophosphate | $PF_6$ |
| Diethylmethyl-2-methoxyethyl ammonium | DEME | Bis(trifluoromethylsufonyl)imide | $NTf_2$ |
| - | - | Bis(trifluoromethylsufonyl)imide | $NTf_2$ |
| - | - | Bis(trifluoromethylsufonyl)imide | $NTf_2$ |
| - | - | Hexafluorophosphate | $PF_6$ |
| - | - | Bis(trifluoromethylsufonyl)imide | $NTf_2$ |
| 1-Butyl-3-methylimidazolium | BMIM | Bis(trifluoromethylsufonyl)imide | $NTf_2$ |
| - | - | - | $Cl^-$ |
| - | - | - | - |
| - | - | Ehtylsulfate | - |
| - | - | - | $Cl^-$ |
| - | - | - | $NTf_2$ |
| 1,1-Dichloroethane | - | - | - |
| 1,1-Dichloroethane | - | - | - |
| Propyl Butyrate | - | - | - |
| Butyl Butyrate | - | - | - |

Fig. 14A

| LT | Electrolyte (remainder ionic fluid) | # | 70C ESR (Ohm) | 70C % ESR | 70C Capacitance (mF) | 70C % Capacitance | RT ESR (Ohm) | RT Capacitance (mF) | -5C ESR (Ohm) | -5C % ESR | -5C Capacitance (mF) | -5C % Capacitance |
|---|---|---|---|---|---|---|---|---|---|---|---|---|
| 2014052101 | 25% Solvent | 21 | | | | | 0.028 | 42225.0 | 0.050 | 79.5% | 35273.03 | -16.5% |
| 2014052101 | 50% Solvent | 24 | | | | | 0.016 | 42098.8 | 0.020 | 25.1% | 40175.63 | -4.6% |
| 2014052101 | 50% Solvent | 26 | | | | | 0.015 | 44587.1 | 0.023 | 47.4% | 42898.78 | -3.8% |
| 2014052101 | 25% Solvent | 31 | | | | | 0.019 | 41361.9 | | | | |
| 2014052101 | 75% Solvent | 33 | 0.013804 | 6% | 40893.7474 | 1% | 0.013 | 40621.1 | 0.015 | 18.7% | 41015.82 | 1.0% |
| 2014052101 | 75% Solvent | 34 | 0.01299088 | -6% | 41405.5954 | -2% | 0.014 | 42317.1 | 0.014 | 0.0% | 42274.88 | -0.1% |

| -20C | | | -30C | | | -40C | | |
|---|---|---|---|---|---|---|---|---|
| ESR (Ohm) | % ESR | Capacitance (mF) | % Capacitance | ESR (Ohm) | % ESR | Capacitance (mF) | % Capacitance | ESR (Ohm) | % ESR | Capacitance (mF) | % Capacitance |
| 0.132 | 376.7% | 24164.108 | -42.8% | 0.192 | 594.6% | 9434.407 | -77.7% | 0.640 | 2214% | 3890.490 | -90.8% |
| 0.032 | 95.1% | 33784.332 | -19.7% | 0.039833 | 145.1% | 25586.157 | -39.2% | 0.064 | 295% | 22465.085 | -46.6% |
| 0.035 | 126.3% | 39232.890 | -12.0% | 0.049515 | 221.1% | 34378.758 | -22.9% | 0.074 | 379% | 30029.022 | -32.7% |
| | | | | | | | | 0.119 | 535% | 15716.422 | -62.0% |
| 0.017 | 31.3% | 40462.377 | -0.4% | 0.018673 | 43.8% | 39962.994 | -1.6% | 0.020 | 56% | 40414.533 | -0.5% |
| 0.015 | 11.8% | 41871.993 | -1.1% | 0.01626 | 17.7% | 41570.740 | -1.8% | 0.017 | 24% | 42167.292 | -0.4% |

WIDE TEMPERATURE RANGE ULTRACAPACITOR

CROSS REFERENCE TO RELATED APPLICATIONS

This application is a Continuation-in-Part of U.S. application Ser. No. 15/660,950, filed Jul. 26, 2017, now U.S. Pat. No. 11,127,537, granted Sep. 21, 2021, which is a continuation of International Patent Application No. PCT/US2016/015237, filed Jan. 27, 2016, which claims the benefit of each of U.S. Provisional Application Nos. 62/108,162 and 62/108,494, each filed Jan. 27, 2015 and U.S. Provisional Application Nos. 62/269,063 and 62/269,077, each filed Dec. 17, 2015. The contents of this application are also related to International Publication No. WO201510271 published Aug. 9, 2015. The disclosures of the aforesaid applications are incorporated herein by reference.

STATEMENT REGARDING FEDERALLY SPONSORED RESEARCH OR DEVELOPMENT

This invention was made with support under government grant Contract No. NNX15CC71P awarded by the National Aeronautics and Space Administration (NASA), Contract No. NNX15CP59P awarded by the National Aeronautics and Space Administration (NASA). The U.S. government may have rights in this invention.

BACKGROUND

The invention disclosed herein relates to energy storage cells, and in particular to techniques for providing an electric double-layer capacitor that is operable at high temperatures.

Energy storage cells are ubiquitous in our society. While most people recognize an energy storage cell simply as a "battery," other types of cells may be included. For example, recently, ultracapacitors have garnered much attention as a result of their favorable characteristics. In short, many types of energy storage cells are known and in use today.

As a general rule, an energy storage cell includes an energy storage media disposed within a housing (such as a canister). While a metallic canister can provide robust physical protection for the cell, such a canister is typically both electrically and thermally conductive and can react with the energy storage cell. Typically, such reactions increase in rate as ambient temperature increases. The electrochemical or other properties of many canisters can cause poor initial performance and lead to premature degradation of the energy storage cell, especially at elevated temperatures.

In fact, a variety of factors work to degrade performance of energy storage systems at elevated temperatures. Thus, what are needed are methods and apparatus for improving performance of an electric double-layer capacitor (EDLC) at elevated temperatures. Preferably, the methods and apparatus result in improved performance at a minimal cost.

One factor that negatively affects EDLC performance at elevated temperatures is the degradation of electrolyte at elevated temperatures. A variety of electrolytes are used in EDLCs, but only a few are stable enough at elevated temperatures to be used in high temperature energy storage cells. Moreover, the available electrolytes typically do not perform adequately at temperatures over about 200° C. Certain applications require energy storage cells that are capable of operating at temperatures in excess of about 200° C., e.g., subsurface drilling, such as petroleum exploration and geothermal wells. Moreover, in certain demanding applications, the available electrolytes do not perform adequately at temperatures over about 150° C. Therefore, electrolytes are needed to extend the operating temperature range of high temperature energy storage cells, particularly EDLCs, to temperatures over about 200° C. Also desirable are electrolytes that are capable of performing over a wide range temperatures, e.g., down to very low temperatures such as −40° C. or even −110° C. and below.

Although typically necessary in any EDLC to prevent contact between the electrodes, the separator frequently introduces undesirable characteristics to EDLCs, e.g., contamination and decomposition. However, available EDLCs cannot work without a separator to prevent contact between the electrodes, i.e., a short circuit. Therefore, a separator-less EDLC would be desirable to improve the properties of the EDLC.

The foregoing Background section is provided for informational purposes only, and does not constitute an admission that any of the information contained therein is prior art to the present application.

SUMMARY

In one aspect, a solid state polymer electrolyte is disclosed for use in an ultracapacitor. The electrolyte includes an ionic liquid and a polymer and may include other additives, wherein an ultracapacitor that utilizes the solid state electrolyte is configured to output electrical energy at temperatures between about −40° C. and about 250° C., 275° C., 300° C., 350° C., or more.

In certain embodiments, other additives are mixed with the polymer, e.g., gelling agents (e.g., silica or silicates), other inorganic or ceramic powders (e.g., alumina, titania, magnesia, aluminosilicates, or titanates such as $BaTiO_3$), clays (e.g., bentonite or montmorillonite and their derivatives), solvents, other polymeric materials, plasticizers, and combinations thereof.

In another aspect, an apparatus is disclosed comprising an electric double layer capacitor having a on operational temperature range comprising −110 C to 80 C, or any subrange thereof.

In some embodiments, the capacitor comprises an electrolyte comprising: a salt; a first solvent; and a second solvent; wherein a melting point of the first solvent is greater than a melting point of the second solvent; wherein a dielectric constant of the first solvent is greater than a dielectric constant of the second solvent.

In some embodiments, the capacitor comprises a pressurized housing containing an electrolyte comprising: a salt; a first solvent, wherein the first solvent is a gas at a temperature of 0 C and a pressure of 760 mmHg.

Various embodiments may include any of the features described above or in the listing of claims provided herein, alone, or in any suitable combination.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 12 shows a table of exemplary solvents.

FIG. 13 shows a table of exemplary anions and cations.

FIG. 14A is part one of a table showing exemplary ultracapacitor performance.

FIG. 14B is part two of a table showing exemplary ultracapacitor performance, rows continue from FIG. 14A.

DETAILED DESCRIPTION

Following below are more detailed descriptions of various concepts related to, and embodiments of, inventive methods and apparatus for energy storage devices. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

In general, the capacitor includes energy storage media that is adapted for providing high power density and high energy density when compared to prior art devices. The capacitor includes components that are configured for ensuring operation over the temperature range, and includes any one or more of a variety of forms of electrolyte that are likewise rated for the temperature range. The combination of construction, energy storage media and electrolyte result in capabilities to provide robust operation under extreme conditions. To provide some perspective, aspects of an exemplary embodiment are now introduced.

Figure 1A:
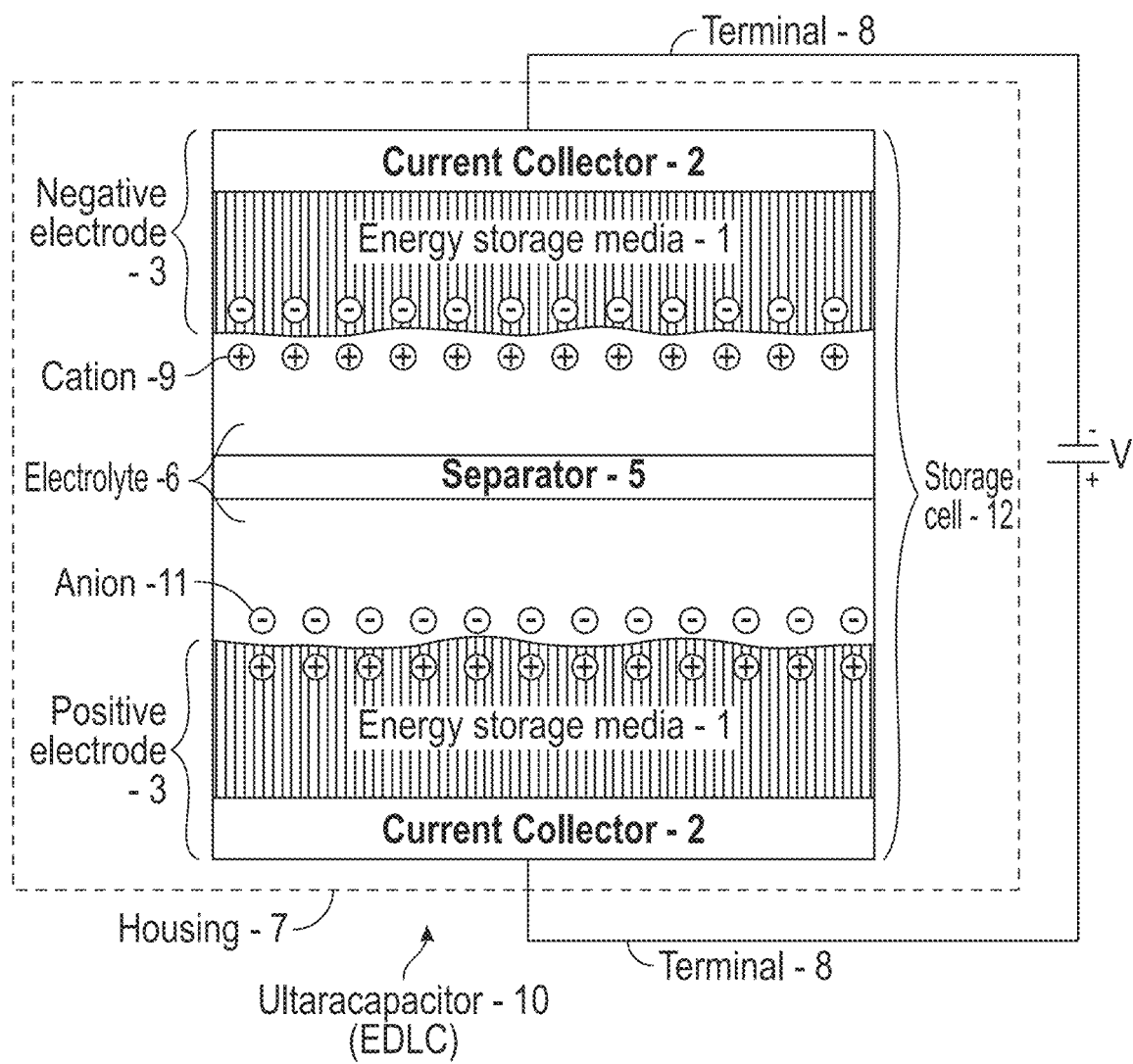
FIG. 1A illustrates aspects of an exemplary ultracapacitor that employs a separator.
Figure 1B:
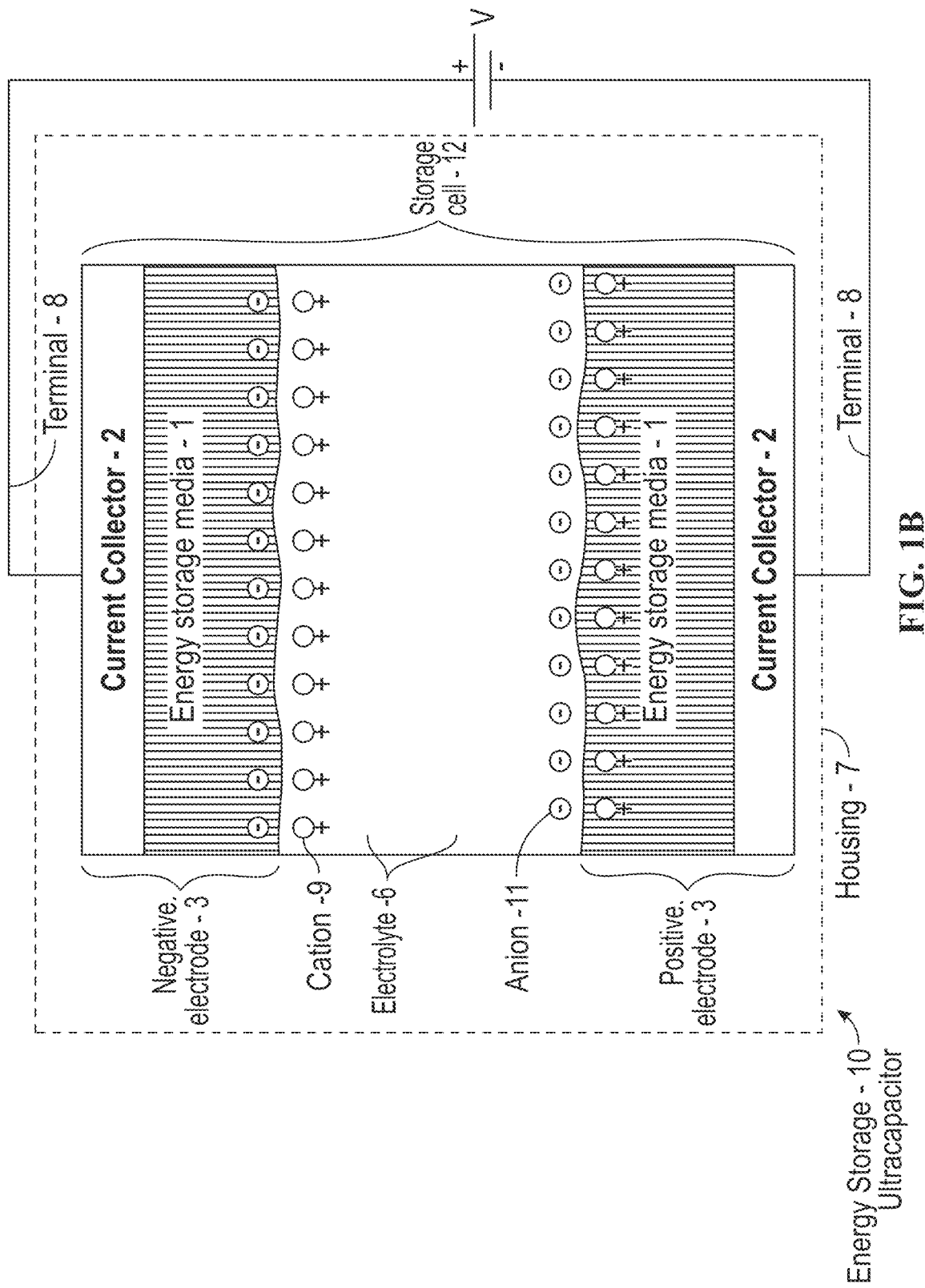
FIG. 1B illustrates aspects of an exemplary ultracapacitor without a separator.

Referring to FIGS. 1A and 1B, exemplary embodiments of a capacitor are shown. In each case, the capacitor is an "ultracapacitor 10." The difference between FIG. 1A and FIG. 1B is the inclusion of a separator in exemplary ultracapacitor 10 of FIG. 1A. The concepts disclosed herein generally apply equally to any exemplary ultracapacitor 10. Certain electrolytes of certain embodiments are uniquely suited to constructing an exemplary ultracapacitor 10 without a separator. Unless otherwise noted, the discussion herein applies equally to any ultracapacitor 10, with or without a separator.

The exemplary ultracapacitor 10 is an electric double-layer capacitor (EDLC). The EDLC includes at least one pair of electrodes 3 (where the electrodes 3 may be referred to as a negative electrode 3 and a positive electrode 3, merely for purposes of referencing herein). When assembled into the ultracapacitor 10, each of the electrodes 3 presents a double layer of charge at an electrolyte interface. In some embodiments, a plurality of electrodes 3 is included (for example, in some embodiments, at least two pairs of electrodes 3 are included). However, for purposes of discussion, only one pair of electrodes 3 are shown. As a matter of convention herein, at least one of the electrodes 3 uses a carbon-based energy storage media 1 (as discussed further herein) to provide energy storage. However, for purposes of discussion herein, it is generally assumed that each of the electrodes includes the carbon-based energy storage media 1. It should be noted that a conventional electrolytic capacitor differs from an ultracapacitor because conventional metallic electrodes differ greatly (at least an order of magnitude) in surface area.

Each of the electrodes 3 includes a respective current collector 2 (also referred to as a "charge collector"). In some embodiments, the electrodes 3 are separated by a separator 5. In general, the separator 5 is a thin structural material (usually a sheet) used to separate the negative electrode 3 from the positive electrode 3. The separator 5 may also serve to separate pairs of the electrodes 3. Once assembled, the electrodes 3 and the separator 5 provide a storage cell 12. Note that, in some embodiments, the carbon-based energy storage media 1 may not be included on one or both of the electrodes 3. That is, in some embodiments, a respective electrode 3 might consist of only the current collector 2. The material used to provide the current collector 2 could be roughened, anodized or the like to increase a surface area thereof. In these embodiments, the current collector 2 alone may serve as the electrode 3. With this in mind, however, as used herein, the term "electrode 3" generally refers to a combination of the energy storage media 1 and the current collector 2 (but this is not limiting, for at least the foregoing reason).

At least one form of electrolyte 6 is included in the ultracapacitor 10. The electrolyte 6 fills void spaces in and between the electrodes 3 and the separator 5. In general, the electrolyte 6 is a substance that disassociates into electrically charged ions. A solvent that dissolves the substance may be included in some embodiments of the electrolyte 6, as appropriate. The electrolyte 6 conducts electricity by ionic transport.

Generally, the storage cell 12 is formed into one of a wound form or prismatic form which is then packaged into a cylindrical or prismatic housing 7. Once the electrolyte 6 has been included, the housing 7 may be hermetically sealed. In various examples, the package is hermetically sealed by techniques making use of laser, ultrasonic, and/or welding technologies. In addition to providing robust physical protection of the storage cell 12, the housing 7 is configured with external contacts to provide electrical communication with respective terminals 8 within the housing 7. Each of the terminals 8, in turn, provides electrical access to energy stored in the energy storage media 1, generally through electrical leads which are coupled to the energy storage media 1.

As discussed herein, "hermetic" refers to a seal whose quality (i.e., leak rate) is defined in units of "atm-cc/second,"

which means one cubic centimeter of gas (e.g., He) per second at ambient atmospheric pressure and temperature. This is equivalent to an expression in units of "standard He-cc/sec." Further, it is recognized that 1 atm-cc/sec is equal to 1.01325 mbar-liter/sec. Generally, the ultracapacitor 10 disclosed herein is capable of providing a hermetic seal that has a leak rate no greater than about $5.0 \times 10^{"6}$ atm-cc/sec, and may exhibit a leak rate no higher than about $5.0 \times 10^{"10}$ atm-cc/sec. It is also considered that performance of a successfully hermetic seal is to be judged by the user, designer or manufacturer as appropriate, and that "hermetic" ultimately implies a standard that is to be defined by a user, designer, manufacturer or other interested party.

Leak detection may be accomplished, for example, by use of a tracer gas. Using tracer gas such as helium for leak testing is advantageous as it is a dry, fast, accurate and non destructive method. In one example of this technique, the ultracapacitor 10 is placed into an environment of helium. The ultracapacitor 10 is subjected to pressurized helium. The ultracapacitor 10 is then placed into a vacuum chamber that is connected to a detector capable of monitoring helium presence (such as an atomic absorption unit). With knowledge of pressurization time, pressure and internal volume, the leak rate of the ultracapacitor 10 may be determined.

In some embodiments, at least one lead (which may also be referred to herein as a "tab") is electrically coupled to a respective one of the current collectors 2. A plurality of the leads (accordingly to a polarity of the ultracapacitor 10) may be grouped together and coupled to into a respective terminal 8. In turn, the terminal 8 may be coupled to an electrical access, referred to as a "contact" (e.g., one of the housing 7 and an external electrode (also referred to herein for convention as a "feed-through" or "pin")).

Consider now the energy storage media 1 in greater detail. In the exemplary ultracapacitor 10, the energy storage media 1 is formed of carbon nanotubes. The energy storage media 1 may include other carbonaceous materials including, for example, activated carbon, carbon fibers, rayon, graphene, aerogel, carbon cloth, and a plurality of forms of carbon nanotubes. Activated carbon electrodes can be manufactured, for example, by producing a carbon base material by carrying out a first activation treatment to a carbon material obtained by carbonization of a carbon compound, producing a formed body by adding a binder to the carbon base material, carbonizing the formed body, and finally producing an active carbon electrode by carrying out a second activation treatment to the carbonized formed body. Carbon fiber electrodes can be produced, for example, by using paper or cloth pre-form with high surface area carbon fibers.

In some embodiments, the electrode of the ultracapacitor 10 includes a current collector comprising aluminum with an aluminum carbide layer on at least one surface, on which at least one layer of carbon nanotubes (CNTs) is disposed. The electrode may comprise vertically-aligned, horizontally-aligned, or nonaligned (e.g., tangled or clustered) CNTs. The electrode may comprise compressed CNTs. The electrode may comprise single-walled, double-walled, or multiwalled CNTs. The electrode may comprise multiple layers of CNTs. In some embodiments, the carbide layer includes elongated whisker structures with a nanoscale width. In some embodiments, the whiskers protrude into the layer of CNTs. In some embodiments, the whiskers protrude through an intervening layer (e.g., an oxide layer) into the layer of CNTs. Further details relating to electrodes of this type may be found in U.S. Provisional Patent Application No. 62/061,947 "ELECTRODE FOR ENERGY STORAGE DEVICE USING ANODIZED ALUMINUM" filed Oct. 9, 2014, International Application No. PCT/US15/55032 "NANOSTRUCTURED ELECTRODE FOR ENERGY STORAGE DEVICE", filed Oct. 9, 2015, the entire contents of which are incorporated herein by reference.

In an exemplary method for fabricating carbon nanotubes, an apparatus for producing an aligned carbon-nanotube aggregate includes apparatus for synthesizing the aligned carbon-nanotube aggregate on a base material having a catalyst on a surface thereof. The apparatus includes a formation unit that processes a formation step of causing an environment surrounding the catalyst to be an environment of a reducing gas and heating at least either the catalyst or the reducing gas; a growth unit that processes a growth step of synthesizing the aligned carbon-nanotube aggregate by causing the environment surrounding the catalyst to be an environment of a raw material gas and by heating at least either the catalyst or the raw material gas; and a transfer unit that transfers the base material at least from the formation unit to the growth unit. A variety of other methods and apparatus may be employed to provide the aligned carbon-nanotube aggregate.

In some embodiments, material used to form the energy storage media 1 may include material other than pure carbon (and the various forms of carbon as may presently exist or be later devised). That is, various formulations of other materials may be included in the energy storage media 1. More specifically, and as a non-limiting example, at least one binder material may be used in the energy storage media 1, however, this is not to suggest or require addition of other materials (such as the binder material). In general, however, the energy storage media 1 is substantially formed of carbon, and may therefore referred to herein as a "carbonaceous material," as a "carbonaceous layer" and by other similar terms. In short, although formed predominantly of carbon, the energy storage media 1 may include any form of carbon (as well as any additives or impurities as deemed appropriate or acceptable) to provide for desired functionality as energy storage media 1.

In one set of embodiments, the carbonaceous material includes at least about 60% elemental carbon by mass, and in other embodiments at least about 75%, 85%, 90%, 95% or 98%) by mass elemental carbon.

Carbonaceous material can include carbon in a variety forms, including carbon black, graphite, and others. The carbonaceous material can include carbon particles, including nanoparticles, such as nanotubes, nanorods, graphene sheets in sheet form, and/or formed into cones, rods, spheres (buckyballs) and the like.

Some embodiments of various forms of carbonaceous material suited for use in energy storage media 1 are provided herein as examples. These embodiments provide robust energy storage and are well suited for use in the electrode 3. It should be noted that these examples are illustrative and are not limiting of embodiments of carbonaceous material suited for use in energy storage media 1.

In general, the term "electrode" refers to an electrical conductor that is used to make contact to another material which is often non-metallic, in a device that may be incorporated into an electrical circuit. Generally, the term "electrode," as used herein, is with reference to the current collector 2 and the additional components as may accompany the current collector 2 (such as the energy storage media 1) to provide for desired functionality (for example, the energy storage media 1 which is mated to the current collector 2 to provide for energy storage and energy transmission). An exemplary process for complimenting the energy storage media 1 with the current collector 2 to provide the electrode 3 is now provided.

Figure 2:
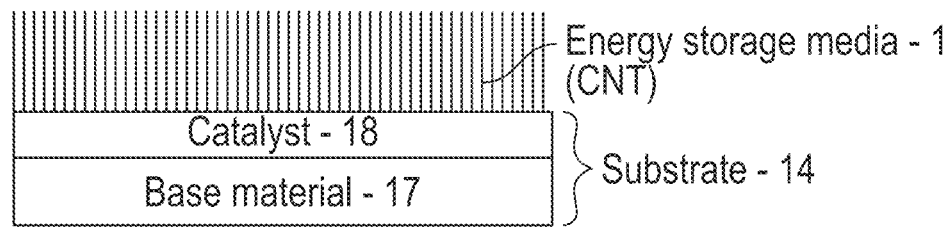
FIG. 2 is a block diagram depicting a plurality of carbon nanotubes (CNT) grown onto a substrate.

Referring now to FIG. 2, a substrate 14 that is host to carbonaceous material in the form of carbon nanotube aggregate (CNT) is shown. In the embodiment shown, the substrate 14 includes a base material 17 with a thin layer of a catalyst 18 disposed thereon. In general, the substrate 14 is at least somewhat flexible (i.e., the substrate 14 is not brittle), and is fabricated from components that can withstand environments for deposition of the energy storage media 1 (e.g., CNT). For example, the substrate 14 may withstand a high-temperature environment of between about 400 degrees Celsius to about 1,100 degrees Celsius. A variety of materials may be used for the substrate 14, as determined appropriate.

Figure 3:
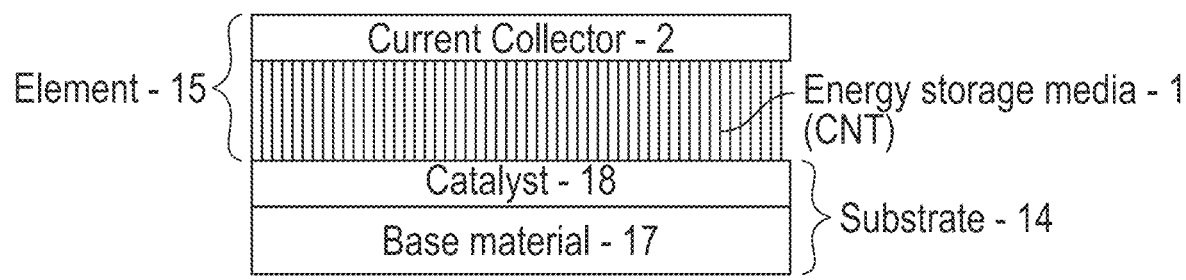
FIG. 3 is a block diagram depicting deposition of a current collector onto the CNT of FIG. 2 to provide an electrode element.

Refer now to FIG. 3. Once the energy storage media 1 (e.g., CNT) has been fabricated on the substrate 14, the current collector 2 may be disposed thereon. In some embodiments, the current collector 2 is between about 0.5 micrometers (μm) to about 25 micrometers (μm) thick. In some embodiments, the current collector 2 is between about 20 micrometers (μm) to about 40 micrometers (μm) thick. The current collector 2 may appear as a thin layer, such as layer that is applied by chemical vapor deposition (CVD), sputtering, e-beam, thermal evaporation or through another suitable technique. Generally, the current collector 2 is selected for its properties such as conductivity, being electrochemically inert and compatible with the energy storage media 1 (e.g., CNT). Some exemplary materials include aluminum, platinum, gold, tantalum, titanium, and may include other materials as well as various alloys.

Once the current collector 2 is disposed onto the energy storage media 1 (e.g., CNT), an electrode element 15 is realized. Each electrode element 15 may be used individually as the electrode 3, or may be coupled to at least another electrode element 15 to provide for the electrode 3.

Figure 4:
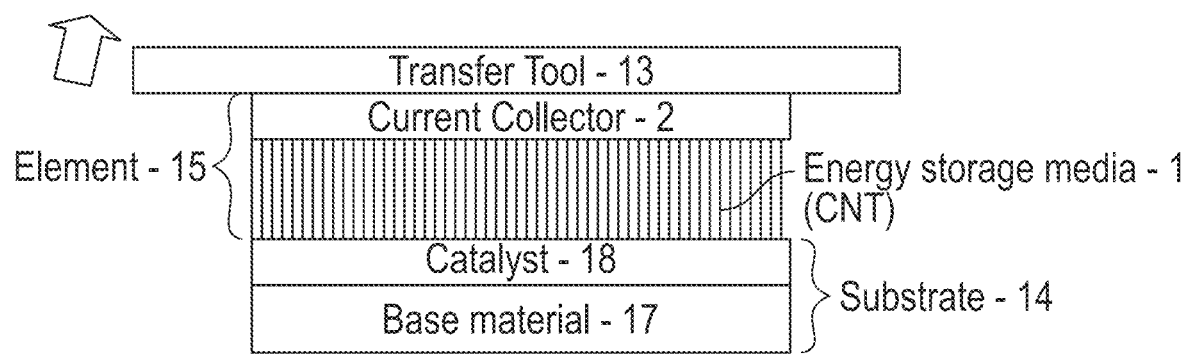
FIG. 4 is a block diagram depicting addition of transfer tape to the electrode element of FIG. 3.

Once the current collector 2 has been fabricated according to a desired standard, post-fabrication treatment may be undertaken. Exemplary post-treatment includes heating and cooling of the energy storage media 1 (e.g., CNT) in a slightly oxidizing environment. Subsequent to fabrication (and optional post-treatment), a transfer tool may be applied to the current collector 2. Reference may be had to FIG. 4.

FIG. 4 illustrates application of transfer tool 13 to the current collector 2. In this example, the transfer tool 13 is a thermal release tape, used in a "dry" transfer method. Exemplary thermal release tape is manufactured by NITTO DENKO CORPORATION of Fremont, Calif. and Osaka, Japan. One suitable transfer tape is marketed as REV ALPHA. This release tape may be characterized as an adhesive tape that adheres tightly at room temperature and can be peeled off by heating. This tape, and other suitable embodiments of thermal release tape, will release at a predetermined temperature. Advantageously, the release tape does not leave a chemically active residue on the electrode element 15.

In another process, referred to as a "wet" transfer method, tape designed for chemical release may be used. Once applied, the tape is then removed by immersion in a solvent. The solvent is designed to dissolve the adhesive.

In other embodiments, the transfer tool 13 uses a "pneumatic" method, such as by application of suction to the current collector 2. The suction may be applied, for example, through a slightly oversized paddle having a plurality of perforations for distributing the suction. In another example, the suction is applied through a roller having a plurality of perforations for distributing the suction. Suction driven embodiments offer advantages of being electrically controlled and economic as consumable materials are not used as a part of the transfer process. Other embodiments of the transfer tool 13 may be used.

Figure 5:
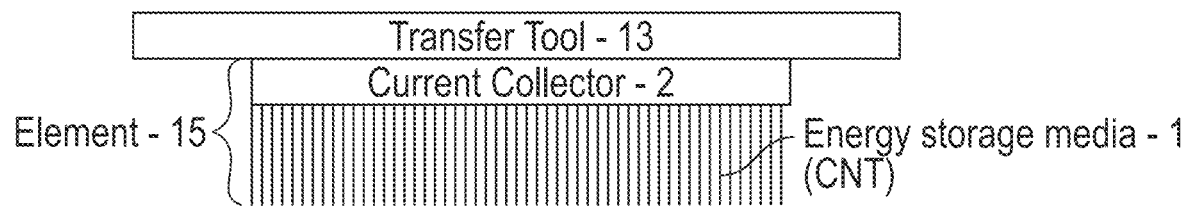
FIG. 5 is a block diagram depicting the electrode element during a transfer process.

Once the transfer tool 13 has been temporarily coupled to the current collector 2, the electrode element 15 is gently removed from the substrate 14 (see FIGS. 4 and 5). The removal generally involves peeling the energy storage media 1 (e.g., CNT) from the substrate 14, beginning at one edge of the substrate 14 and energy storage media 1 (e.g., CNT).

Figure 6:
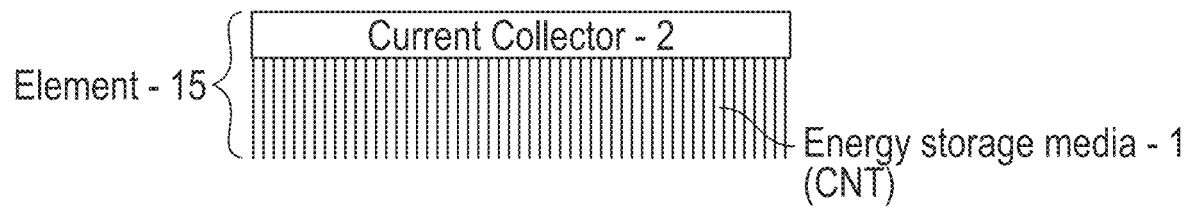
FIG. 6 is a block diagram depicting the electrode element subsequent to transfer.

Subsequently, the transfer tool 13 may be separated from the electrode element 15 (see FIG. 6). In some embodiments, the transfer tool 13 is used to install the electrode element 15. For example, the transfer tool 13 may be used to place the electrode element 15 onto the separator 5. In general, once removed from the substrate 14, the electrode element 15 is available for use.

Figure 7:
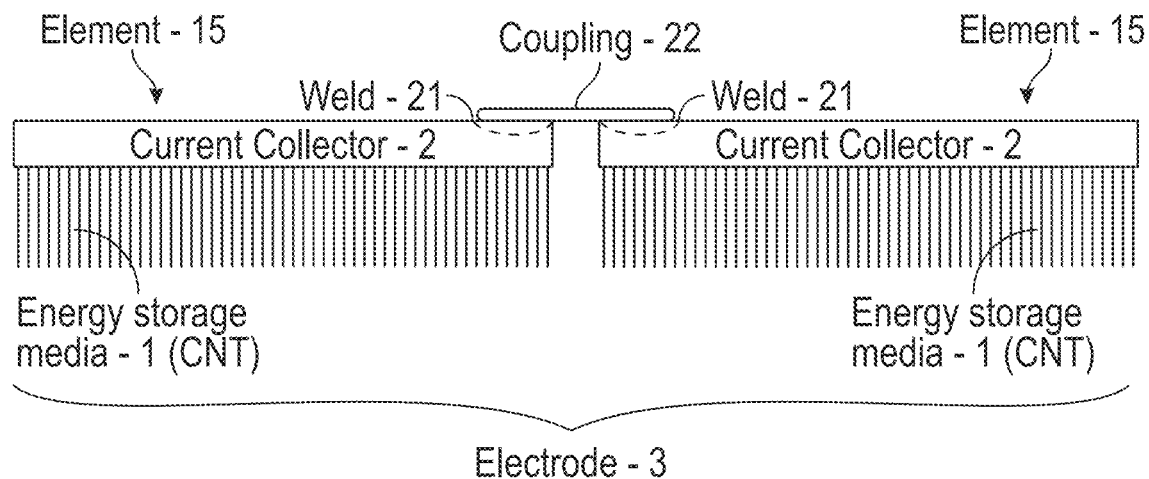
FIG. 7 is a block diagram depicting an exemplary electrode fabricated from a plurality of the electrode elements.

In instances where a large electrode 3 is desired, a plurality of the electrode elements 15 may be mated. Reference may be had to FIG. 7. As shown in FIG. 7, a plurality of the electrode elements 15 may be mated by, for example, coupling a coupling 22 to each electrode element 15 of the plurality of electrode elements 15. The mated electrode elements 15 provide for an embodiment of the electrode 3.

In some embodiments, the coupling 22 is coupled to each of the electrode elements 15 at a weld 21. Each of the welds 21 may be provided as an ultrasonic weld 21. It has been found that ultrasonic welding techniques are particularly well suited to providing each weld 21. That is, in general, the aggregate of energy storage media 1 (e.g., CNT) is not compatible with welding, where only a nominal current collector, such as disclosed herein is employed. As a result, many techniques for joining electrode elements 15 are disruptive, and damage the element 15. However, in other embodiments, other forms of coupling are used, and the coupling 22 is not a weld 21.

The coupling 22 may be a foil, a mesh, a plurality of wires or in other forms. Generally, the coupling 22 is selected for properties such as conductivity and being electrochemically inert. In some embodiments, the coupling 22 is fabricated from the same material(s) as are present in the current collector 2.

In some embodiments, the coupling 22 is prepared by removing an oxide layer thereon. The oxide may be removed by, for example, etching the coupling 22 before providing the weld 21. The etching may be accomplished, for example, with potassium hydroxide (KOH). The electrode 3 may be used in a variety of embodiments of the ultracapacitor 10. For example, the electrode 3 may be rolled up into a "jelly roll" type of energy storage.

The separator 5 may be fabricated from various materials. In some embodiments, the separator 5 is non-woven glass. The separator 5 may also be fabricated from fiberglass, ceramics and flouro-polymers, such as polytetrafluoroethylene (PTFE), commonly marketed as TEFLON™ by DuPont Chemicals of Wilmington, Del. For example, using non-woven glass, the separator 5 can include main fibers and binder fibers each having a fiber diameter smaller than that of each of the main fibers and allowing the main fibers to be bonded together.

For longevity of the ultracapacitor 10 and to assure performance at high temperature, the separator 5 should have a reduced amount of impurities and in particular, a very limited amount of moisture contained therein. In particular, it has been found that a limitation of about 200 ppm of moisture is desired to reduce chemical reactions and improve the lifetime of the ultracapacitor 10, and to provide for good performance in high temperature applications. Some embodiments of materials for use in the separator 5 include polyamide, polytetrafluoroethylene (PTFE), polyether-ether-ketone (PEEK), aluminum oxide ($Al_2O_3$), fiberglass, glass-reinforced plastic (GRP), polyester, nylon, and polyphenylene sulfide (PPS).

In general, materials used for the separator 5 are chosen according to moisture content, porosity, melting point, impurity content, resulting electrical performance, thickness, cost, availability and the like. In some embodiments, the separator 5 is formed of hydrophobic materials.

Accordingly, procedures may be employed to ensure excess moisture is eliminated from each separator 5. Among other techniques, a vacuum drying procedure may be used. A selection of materials for use in the separator 5 is provided in Table 1. Some related performance data is provided in Table 2.

TABLE 1

Separator Materials

| Material | Melting point | PPM $H_2O$ unbaked | PPM $H_2O$ baked | Vacuum dry procedure |
|---|---|---|---|---|
| Polyamide | 256° C. | 2052 | 20 | 180° C. for 24 h |
| Polytetrafluoroethylene, PTFE | 327° C. | 286 | 135 | 150° C. for 24 h |
| Polyether ether ketone, PEEK | 256° C. | 130 | 50 | 215° C. for 24 h |
| Aluminum Oxide, $Al_2O_3$ | 330° C. | 1600 | 100 | 215° C. for 24 h |
| Fiberglass (GRP) | 320° C. | 2000 | 167 | 215° C. for 24 h |

TABLE 2

Separator Performance Data

| Material | µm | Porosity | ESR $1^{st}$ test (Ω) | ESR $2^{nd}$ test (Ω) | After 10 CV |
|---|---|---|---|---|---|
| Polyamide | 42 | Nonwoven | 1.069 | 1.069 | 1.213 |
| PEEK | 45 | Mesh | 1.665 | 1.675 | 2.160 |
| PEEK 60% | 25 | 60% | 0.829 | 0.840 | 0.883 |
| Fiberglass (GRP) | 160 | Nonwoven | 0.828 | 0.828 | 0.824 |
| Aluminum Oxide, $Al_2O_3$ | 25 | — | 2.400 | 2.400 | 2.400 |

In order to collect data for Table 2, two electrodes 3, based on carbonaceous material, were provided. The electrodes 3 were disposed opposite to and facing each other. Each of the separators 5 were placed between the electrodes 3 to prevent a short circuit. The three components were then wetted with electrolyte 6 and compressed together. Two aluminum bars and PTFE material was used as an external structure to enclose the resulting ultracapacitor 10.

The ESR $1^{st}$ test and ESR $2^{nd}$ test were performed with the same configuration one after the other. The second test was run five minutes after the first test, leaving time for the electrolyte 6 to further soak into the components.

Note that, in some embodiments, the ultracapacitor 10 does not require or include the separator 5. For example, in some embodiments, such as where the electrodes 3 are assured of physical separation by a geometry of construction, it suffices to have electrolyte 6 alone between the electrodes 3. More specifically, and as an example of physical separation, one such ultracapacitor 10 may include electrodes 3 that are disposed within a housing such that separation is assured on a continuous basis. A bench-top example would include an ultracapacitor 10 provided in a beaker. A further example may include an ultracapacitor featuring a solid state electrolyte, as described in greater detail below.

The ultracapacitor 10 may be embodied in several different form factors (i.e., exhibit a certain appearance). Examples of potentially useful form factors include, a cylindrical cell, an annular or ring-shaped cell, a flat prismatic cell or a stack of flat prismatic cells comprising a box-like cell, and a flat prismatic cell that is shaped to accommodate a particular geometry such as a curved space. A cylindrical form factor may be most useful in conjunction with a cylindrical tool or a tool mounted in a cylindrical form factor. An annular or ring-shaped form factor may be most useful in conjunction with a tool that is ring-shaped or mounted in a ring-shaped form factor. A flat prismatic cell shaped to accommodate a particular geometry may be useful to make efficient use of "dead space" (i.e., space in a tool or equipment that is otherwise unoccupied, and may be generally inaccessible).

While generally disclosed herein in terms of a "jelly roll" application (i.e., a storage cell 12 that is configured for a cylindrically shaped housing 7), the rolled storage cell may take any form desired. For example, as opposed to rolling the storage cell 12, folding of the storage cell 12 may be performed to provide for the rolled storage cell. Other types of assembly may be used. As one example, the storage cell 12 may be a flat cell, referred to as a "coin type" of cell. Accordingly, rolling is merely one option for assembly of the rolled storage cell. Therefore, although discussed herein in terms of being a "rolled storage cell", this is not limiting. It may be considered that the term "rolled storage cell" generally includes any appropriate form of packaging or packing the storage cell 12 to fit well within a given design of the housing 7.

Various forms of the ultracapacitor 10 may be joined together. The various forms may be joined using known techniques, such as welding contacts together, by use of at least one mechanical connector, by placing contacts in electrical contact with each other and the like. A plurality of the ultracapacitors 10 may be electrically connected in at least one of a parallel and a series fashion.

Electrolyte Materials

Figure 8:
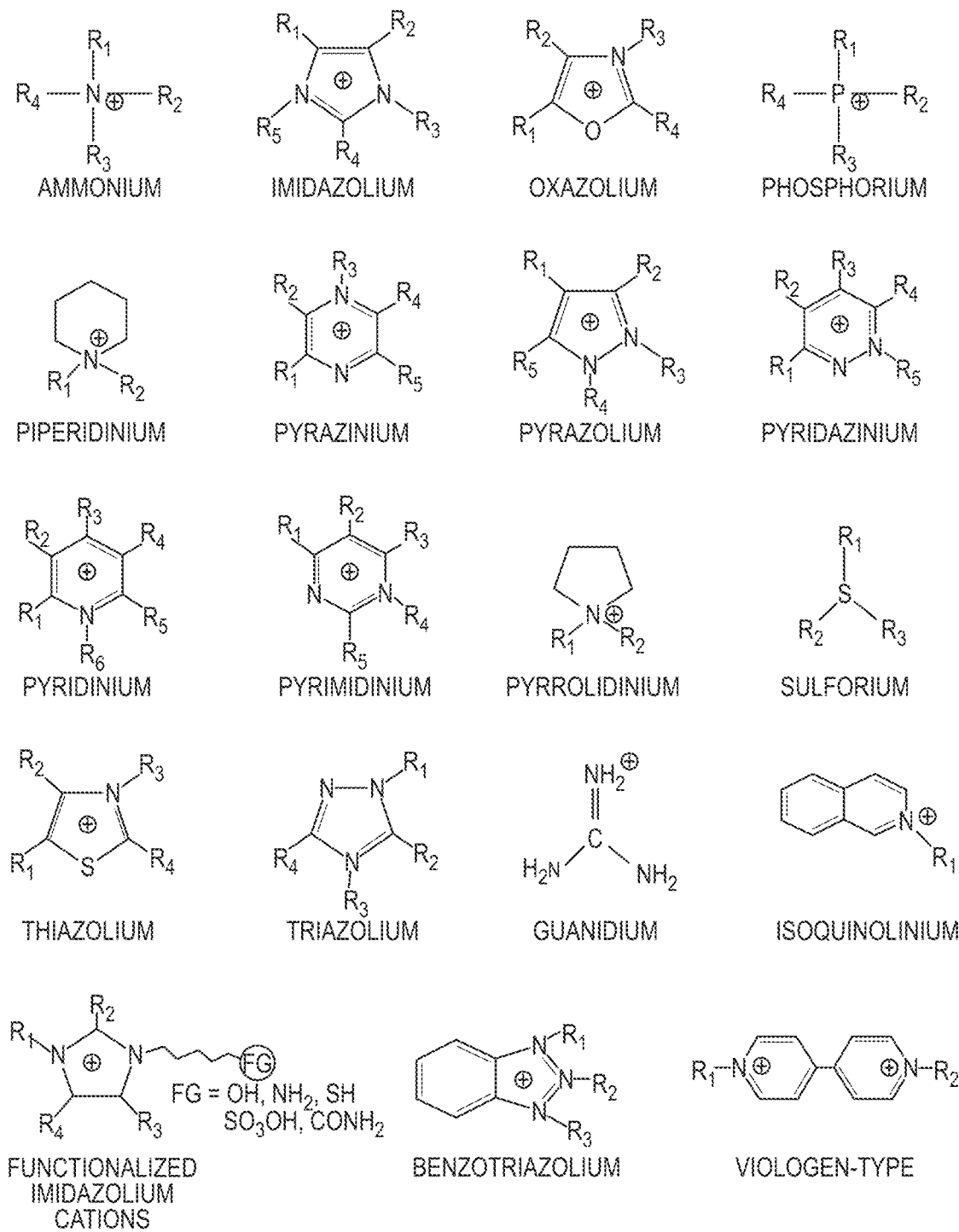
FIG. 8 depicts embodiments of primary structures for cations that may be included in the exemplary ultracapacitor.

The electrolyte 6 includes a pairing of cations 9 and anions 11 and may include a solvent or other additives. The electrolyte 6 include an "ionic liquid" as appropriate. Various combinations of cations 9, anions 11 and solvent may be used. In the exemplary ultracapacitor 10, the cations 9 may include at least one of tetrabutylammondium, 1-(3-Cyanopropyl)-3-methylimidazolium, 1,2-Dimethyl-3-propylimidazolium, 1,3-Bis(3-cyanopropyl)imidazolium, 1,3-Diethoxyimidazolium, 1-Butyl-1-methylpiperidinium, 1-Butyl-2,3-dimethylimidazolium, 1-Butyl-3-methylimidazolium, 1-Butyl-4-methylpyridinium, 1-Butylpyridinium, 1-Decyl-3-methylimidazolium, 1-Ethyl-3-methylimidazolium, 1-Pentyl-3-methylimidazolium, 1-Hexyl-3-methylimidazolium, 3-Methyl-1-propylpyridinium, and combinations thereof as well as other equivalents as deemed appropriate. Additional exemplary cations 9 include ammonium, imidazolium, pyrazinium, piperidinium, pyridinium, pyrimidinium, and pyrrolidinium (structures of which are depicted in FIG. 8). In the exemplary ultracapacitor 10, the anions 11 may include at least one of bis(trifluoromethanesulfonate)imide, tris(trifluoromethanesulfonate)methide, dicyanamide, tetrafluoroborate, tetra(cyano)borate, hexafluorophosphate, tris(pentafluoroethyl)trifluorophosphate, trifluoromethanesulfonate, bis(pentafluoroethanesulfonate)imide, thiocyanate, trifluoro(trifluoromethyl)borate, and combinations thereof as well as other equivalents as deemed appropriate.

The solvent may include acetonitrile, amides, benzonitrile, butyrolactone, cyclic ether, dibutyl carbonate, diethyl carbonate, diethylether, dimethoxyethane, dimethyl carbonate, dimethylformamide, dimethyl sulfone, dioxane, dioxolane, ethyl formate, ethylene carbonate, ethylmethyl carbonate, lactone, linear ether, methyl formate, methyl propionate, methyltetrahydrofuran, nitrobenzene, nitromethane, n-methylpyrrolidone, propylene carbonate, sulfolane, sulfone, tetrahydrofuran, tetramethylene sulfone, thiophene, ethylene glycol, diethylene glycol, triethylene glycol, polyethylene glycols, carbonic acid ester, γ-butyrolactone, nitrile, tricyanohexane, any combination thereof or other material(s) that exhibit appropriate performance characteristics.

In certain embodiments, electrolyte 6 may include one or more additional additives, e.g., gelling agents (e.g., silica or silicates), other inorganic or ceramic powders (e.g., alumina, titania, magnesia, aluminosilicates, or titanates such as $BaTiO_3$), clays (e.g., bentonite or montmorillonite and their derivatives), solvents, polymeric materials (including polymeric microbeads), plasticizers, and combinations thereof. Porous inorganic oxides are useful additives for providing a gel electrolyte. Exemplary additives include silica, silicates, alumina, titania, magnesia, aluminosilicates, zeolites, or titanates. For example, an electrolyte according to one embodiment of the present invention comprises an ionic liquid, e.g., one of the ionic liquids described herein, such as an ionic liquid comprising a cation, as described herein, and an anion, as described herein, and fumed silica as a gelling agent, which are mixed in a ratio to produce an ionic liquid gel. Certain embodiments may employ a different form of silica as a gelling agent, e.g., silica gel, mesoporous silica, or a microcrystalline or polycrystalline form of silica. The amount of the additive will vary according to the nature of the application and is typically in the range of about 2 wt. % to about 20 wt. %, e.g., about 5 wt. % to about 10 wt. %, in the range of potentially as much as about 50 wt. %, of the electrolyte.

As discussed herein, water and other contaminants may impede ultracapacitor performance. In certain embodiments, the additives described herein are dried or otherwise purified prior to incorporating them in an ultracapacitor or ultracapacitor electrolyte. For example, the moisture content of the electrolyte comprising an additive, e.g., a gelling agent, should be comparable to the ranges described above, e.g., less than about 1000 ppm, preferably less than about 500 ppm.

A suitable concentration of additive will be determined based on the desired properties of the electrolyte and/or ultracapacitor, e.g., the viscosity of the electrolyte or the leakage current, capacitance, or ESR of the ultracapacitor. The specific surface area (SSA) also affects the properties of the electrolyte and the resultant ultracapacitor. Generally, a high SSA is desirable, e.g., above about 100 $m^2/g$, above about 200 $m^2/g$, about 400 $m^2/g$, about 800 $m^2/g$, or about 1000 $m^2/g$. The viscosity of the electrolyte comprising the additive affects the performance of the resultant ultracapacitor and must be controlled by adding an appropriate amount of the additive.

In certain embodiments, where an appropriate gel-based electrolyte is employed, a separator-less ultracapacitor 10 can be prepared, as shown in FIG. 1B. A separator-less ultracapacitor 10 of FIG. 1B is prepared in a manner analogous a typical ultracapacitor having a separator, e.g., an ultracapacitor of FIG. 1A, except that the gel-based electrolyte is of a sufficient stability that a separator is not required.

In certain embodiments, a solid state polymeric electrolyte may be prepared and employed in an ultracapacitor. In such embodiments, a polymer containing an ionic liquid is cast by dissolving a polymer in a solvent together with an electrolyte and any other additives, e.g., e.g., gelling agents (e.g., silica or silicates), other inorganic or ceramic powders (e.g., alumina, titania, magnesia, aluminosilicates, or titanates such as $BaTiO_3$), clays (e.g., bentonite or montmorillonite and their derivatives), solvents, other polymeric materials, plasticizers, and combinations thereof. After drying the cast polymer electrolyte film can be incorporated into an ultracapacitor using the techniques for assembling ultracapacitors described herein, except that the polymer electrolyte replaces both the liquid (or gel) electrolyte and the separator in the ultracapacitor. The polymer film may also be cast directly onto the electrode of an ultracapacitor. Exemplary polymers include polyamide, polytetrafluoroethylene (PTFE), polyvinylidene fluoride-hexafluoropropylene copolymer (PVDF-HFP), polyether ether ketone (PEEK), CRAFT, sulfonated poly(ether ether ketone) (SPEEK), crosslinked sulfonated poly(ether ether ketone) (XSPEEK), and other polymer and copolymers stable at high temperature and appropriate for hermetic applications.

The advanced electrolyte systems of the present disclosure comprise, in one embodiment, include certain enhanced electrolyte combinations suitable for use in a temperature range of about minus 40 degrees Celsius to about 250 degrees Celsius, e.g., about minus 10 degrees Celsius to about 250 degrees Celsius, e.g., about minus 5 degrees Celsius to about 250 degrees Celsius e.g., about 0 degrees Celsius to about 250 degrees Celsius e.g., about minus 20 degrees Celsius to about 200 degrees Celsius e.g., about 150 degrees Celsius to about 250 degrees Celsius e.g., about 150 degrees Celsius to about 220 degrees Celsius e.g., about 150 degrees Celsius to about 200 degrees Celsius, e.g., about minus 10 degrees Celsius to about 210 degrees Celsius e.g., about minus 10 degrees Celsius to about 220 degrees Celsius e.g., about minus 10 degrees Celsius to about 230 degrees Celsius. In some embodiments, e.g., where a solid state polymer electrolyte is used, the upper temperature limit may be increased to more the 250 degrees Celsius, e.g., greater than 300 degrees Celsius or even 350 degrees Celsius.

Generally, a higher degree of durability at a given temperature may be coincident with a higher degree of voltage stability at a lower temperature. Accordingly, the development of a high temperature durability advanced electrolyte system (AES), with enhanced electrolyte combinations, generally leads to simultaneous development of high voltage, but lower temperature AES, such that these enhanced electrolyte combinations described herein may also be useful at higher voltages, and thus higher energy densities, but at lower temperatures.

In one embodiment, the present invention provides an enhanced electrolyte combination suitable for use in an energy storage cell, e.g., an ultracapacitor, comprising a novel mixture of electrolytes selected from the group consisting of an ionic liquid mixed with a second ionic liquid, an ionic liquid mixed with an organic solvent, and an ionic liquid mixed with a second ionic liquid and an organic solvent wherein each ionic liquid is selected from the salt of any combination of the following cations and anions, wherein the cations are selected from the group consisting of 1-butyl-3-methylimidazolium, 1-ethyl-3-methylimidazolium, 1-hexyl-3-methylimidazolium, 1-butyl-1-methylpiperidinium, butyltrimethyl ammonium, 1-butyl-1-methylpyrrolidinium, trihexyltetradecylphosphonium, and 1-butyl-3-methylimidaxolium; and the anions are selected from the group consisting of tetrafluoroborate, bis(trifluoromethylsulfonyl)imide, tetracyanoborate, and trifluoromethanesulfonate; and wherein the organic solvent is selected from the group consisting of linear sulfones (e.g., ethyl isopropyl sulfone, ethyl isobutyl sulfone, ethyl methyl sulfone, methyl isopropyl sulfone, isopropyl isobutyl sulfone, isopropyl s-butyl sulfone, butyl isobutyl sulfone, and dimethyl sulfone), linear carbonates (e.g., ethylene carbonate, propylene carbonate, and dimethyl carbonate), and acetonitrile.

For example, given the combinations of cations and anions above, each ionic liquid may be selected from the group consisting of 1-butyl-3-methylimidazolium tetrafluoroborate; 1-butyl-3-methylimidazolium bis(trifluoromethylsulfonyl)imide; 1-ethyl-3-methylimidazolium tetrafluoroborate; 1-ethyl-3-methylimidazolium tetracyanoborate; 1-hexyl-3-methylimidazolium tetracyanoborate; 1-butyl-1-methylpyrrolidinium bis(trifluoromethylsulfonyl)imide; 1-butyl-1-methylpyrrolidinium tris(pentafluoroethyl)trifluorophosphate; 1-butyl-1-methylpyrrolidinium tetracyanoborate; trihexyltetradecylphosphonium bis(trifluoromethylsulfonyl)imide, 1-butyl-1-methylpiperidinium bis(trifluoromethylsulfonyl)imide, butyltrimethylammonium bis(trifluoromethylsulfonyl)imide, and 1-butyl-3-methylimidazolium trifluoromethanesulfonate.

In certain embodiments, the ionic liquid is 1-butyl-3-methylimidazolium tetrafluoroborate.

In certain embodiments, the ionic liquid is 1-butyl-3-methylimidazolium bis(trifluoromethylsulfonyl)imide.

In certain embodiments, the ionic liquid is 1-ethyl-3-methylimidazolium tetrafluoroborate.

In certain embodiments, the ionic liquid is 1-ethyl-3-methylimidazolium tetracyanoborate.

In certain embodiments, the ionic liquid is 1-hexyl-3-methylimidazolium tetracyanoborate.

In certain embodiments, the ionic liquid is 1-butyl-1-methylpyrrolidinium bis(trifluoromethylsulfonyl)imide.

In one embodiment, the ionic liquid is 1-butyl-1-methylpyrrolidinium tris(pentafluoroethyl)trifluorophosphate.

In certain embodiments, the ionic liquid is 1-butyl-1-methylpyrrolidinium tetracyanoborate.

In certain embodiments, the ionic liquid is trihexyltetradecylphosphonium bis(trifluoromethylsulfonyl)imide.

In certain embodiments, the ionic liquid is 1-butyl-1-methylpiperidinium bis(trifluoromethylsulfonyl)imide.

In certain embodiments, the ionic liquid is butyltrimethylammonium bis(trifluoromethylsulfonyl)imide.

In certain embodiments, the ionic liquid is 1-butyl-3-methylimidazolium trifluoromethanesulfonate.

In certain embodiments, the organic solvent is selected from ethyl isopropyl sulfone, ethyl isobutyl sulfone, ethyl methyl sulfone, methyl isopropyl sulfone, isopropyl isobutyl sulfone, isopropyl s-butyl sulfone, butyl isobutyl sulfone, or bimethyl sulfone, linear sulfones.

In certain embodiments, the organic solvent is selected from polypropylene carbonate, propylene carbonate, dimethyl carbonate, ethylene carbonate.

In certain embodiments, the organic solvent is acetonitrile.

In certain embodiments, the enhanced electrolyte composition is an ionic liquid with an organic solvent, wherein the organic solvent is 55%-90%, e.g., 37.5%, by volume of the composition.

In certain embodiments, the enhanced electrolyte composition is an ionic liquid with a second ionic liquid, wherein one ionic liquid is 5%>-90%>, e.g., 60%>, by volume of the composition.

The enhanced electrolyte combinations of the present invention provide a wider temperature range performance for an individual capacitor {e.g. without a significant drop in capacitance and/or increase in ESR when transitioning between two temperatures, e.g. without more than a 90% decrease in capacitance and/or a 1000% increase in ESR when transitioning from about +30° C. to about −40° C.), and increased temperature durability for an individual capacitor {e.g., less than a 50% decrease in capacitance at a given temperature after a given time and/or less than a 100% increase in ESR at a given temperature after a given time, and/or less than 10 A/L of leakage current at a given temperature after a given time, e.g., less than a 40%> decrease in capacitance and/or a 75% increase in ESR, and/or less than 5 A/L of leakage current, e.g., less than a 30% decrease in capacitance and/or a 50% increase in ESR, and/or less than 1 A/L of leakage current).

Without wishing to be bound by theory, the combinations described above provide enhanced eutectic properties that affect the freezing point of the advanced electrolyte system to afford ultracapacitors that operate within performance and durability standards at temperatures of down to −40 degrees Celsius.

As described above for the novel electrolytes of the present invention, in certain embodiments, the advanced electrolyte system (AES) may be admixed with electrolytes provided that such combination does not significantly affect the advantages achieved by utilization of the advanced electrolyte system.

In certain embodiments, the enhanced electrolyte combinations are selected herein for use the advanced electrolyte systems may also be purified. Such purification may be performed using art-recognized techniques or techniques provided herein.

Referring now to FIG. 8, there are shown various additional embodiments of cations 9 suited for use in an ionic liquid to provide the electrolyte 6. These cations 9 may be used alone or in combination with each other, in combination with at least some of the foregoing embodiments of cations 9, and may also be used in combination with other cations 9 that are deemed compatible and appropriate by a user, designer, manufacturer or other similarly interested party. The cations 9 depicted in FIG. 8 include, without limitation, ammonium, imidazolium, oxazolium, phosphonium, piperidinium, pyrazinium, pyrazinium, pyridazinium, pyridinium, pyrimidinium, pyrrolidinium, sulfonium, thiazolium, triazolium, guanidium, isoquinolinium, benzotriazolium, viologen-types, and functionalized imidazolium cations.

With regard to the cations 9 shown in FIG. 8, various branch groups ($R_{1s}$, $R_2$, $R_3$, ... $R_x$) are included. In the case of the cations 9, each branch groups ($R_x$) may be one of alkyl, heteroalkyl, alkenyl, heteroalkenyl, alkynyl, heteroalkynyl, halo, amino, nitro, cyano, hydroxyl, sulfate, sulfonate, or a carbonyl group any of which is optionally substituted.

The term "alkyl" is recognized in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 20 or fewer carbon atoms in its backbone (e.g., $C_1$-$C_{20}$ for straight chain, $C_1$-$C_{20}$ for branched chain). Likewise, cycloalkyls have from about 3 to about 10 carbon atoms in their ring structure, and alternatively about 5, 6 or 7 carbons in the ring structure. Examples of alkyl groups include, but are not limited to, methyl, ethyl, propyl, butyl, pentyl, hexyl, ethyl hexyl, cyclopropyl, cyclobutyl, cyclopentyl, cyclohexyl and the like.

The term "heteroalkyl" is recognized in the art and refers to alkyl groups as described herein in which one or more atoms is a heteroatom (e.g., oxygen, nitrogen, sulfur, and the like). For example, alkoxy group (e.g., —OR) is a heteroalkyl group.

The terms "alkenyl" and "alkynyl" are recognized in the art and refer to unsaturated aliphatic groups analogous in length and possible substitution to the alkyls described above, but that contain at least one double or triple bond respectively.

The "heteroalkenyl" and "heteroalkynyl" are recognized in the art and refer to alkenyl and alkynyl alkyl groups as described herein in which one or more atoms is a heteroatom (e.g., oxygen, nitrogen, sulfur, and the like).

Generally, any ion with a negative charge maybe used as the anion 11. The anion 11 selected is generally paired with a large organic cation 9 to form a low temperature melting ionic salt. Room temperature (and lower) melting salts come from mainly large anions 9 with a charge of −1. Salts that melt at even lower temperatures generally are realized with anions 11 with easily delocalized electrons. Anything that will decrease the affinity between ions (distance, delocalization of charge) will subsequently decrease the melting point. Although possible anion formations are virtually infinite, only a subset of these will work in low temperature ionic liquid application. This is a non-limiting overview of possible anion formations for ionic liquids.

Common substitute groups (a) suited for use of the anions 11 provided in Table 3 include: —F, —Cl", —Br", —I" —OCH$_3$", —CN", —SCN", —C$_2$H$_3$O$_2$", —ClO", —ClO$_2$", —ClO$_3$", —ClO$_4$", —NCO", —NCS", —NCSe", —NCN", —OCH(CH$_3$)$_2$", —CH$_2$OCH$_3$", —COOH", —OH", —SOCH$_3$", —SO$_2$CH$_3$", —SOCH$_3$", —SO$_2$CF$_3$", —SO$_3$H", —SO$_3$CF$_3$", —O(CF$_3$)$_2$C$_2$(CF$_3$)$_2$O", —CF$_3$", —CHF$_2$", —CH$_2$F", —CH$_3$" —NO$_3$", —NO$_2$", —SO$_3$", —SO$_4^{2-}$", —SF$_5$", —CB$_n$H$_{12}$", —CB$_n$H$_6$Ci$_6$", —CH$_3$CB$_n$H$_n$", —C$_2$H$_5$CB$_{ii}$H$_{ii}$", -A-PO$_4$", -A-SO$_2$", A-SO$_3$", -A-SO$_3$H", -A-COO", -A-CO" {where A is a phenyl (the phenyl group or phenyl ring is a cyclic group of atoms with the formula CeH$_5$) or substituted phenyl, alkyl, (a radical that has the general formula CnH$_{2n+1}$i, formed by removing a hydrogen atom from an alkane) or substituted alkyl group, negatively charged radical alkanes, (alkane are chemical compounds that consist only of hydrogen and carbon atoms and are bonded exclusively by single bonds) halogenated alkanes and ethers (which are a class of organic compounds that contain an oxygen atom connected to two alkyl or aryl groups).

With regard to anions 11 suited for use in an ionic liquid that provides the electrolyte 6, various organic anions 11 may be used. Exemplary anions 11 and structures thereof are provided in Table 3. In a first embodiment, (No. 1), exemplary anions 11 are formulated from the list of substitute groups (a) provided above, or their equivalent. In additional embodiments, (Nos. 2-5), exemplary anions 11 are formulated from a respective base structure (Y$_2$, Y$_3$, Y$_4$, . . . Y$_n$) and a respective number of anion substitute groups (a$_1$, a$_2$, a$_3$, . . . a$_n$), where the respective number of anion substitute groups (a) may be selected from the list of substitute (a) groups provided above, or their equivalent. Note that in some embodiments, a plurality of anion substitute groups (a) (i.e., at least one differing anion substitute group (a)) may be used in any one embodiment of the anion 11. Also, note that in some embodiments, the base structure (Y) is a single atom or a designated molecule (as described in Table 3), or may be an equivalent.

More specifically, and by way of example, with regard to the exemplary anions provided in Table 3, certain combinations may be realized. As one example, in the case of No. 2, the base structure (Y$_2$) includes a single structure (e.g., an atom, or a molecule) that is bonded to two anion substitute groups (a$_2$). While shown as having two identical anion substitute groups (a$_2$), this need not be the case. That is, the base structure (Y$_2$) may be bonded to varying anion substitute groups (a$_2$), such as any of the anion substitute groups (a) listed above. Similarly, the base structure (Y$_3$) includes a single structure (e.g., an atom) that is bonded to three anion substitute groups (a$_3$), as shown in case No. 3. Again, each of the anion substitute groups (a) included in the anion may be varied or diverse, and need not repeat (be repetitive or be symmetric) as shown in Table 3. In general, with regard to the notation in Table 3, a subscript on one of the base structures denotes a number of bonds that the respective base structure may have with anion substitute groups (a). That is, the subscript on the respective base structure (Y$_n$) denotes a number of accompanying anion substitute groups (a$_n$) in the respective anion.

TABLE 3

Exemplary Organic Anions for an Ionic Liquid

| No.: | Ion | Guidelines for Anion Structure and Exemplary Ionic Liquids |
|---|---|---|
| 1 | -a$_i$ | Some of the above a may mix with organic cations to form an ionic liquid. An exemplary anion: Cl⁻ Exemplary ionic liquid: [BMI*][Cl] *BMI - butyl methyl immadizolium |

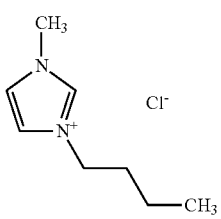

TABLE 3-continued

Exemplary Organic Anions for an Ionic Liquid

| No.: | Ion | Guidelines for Anion Structure and Exemplary Ionic Liquids |
|---|---|---|
| 2 | $-Y_2a_2$ | $Y_2$ may be any of the following: N, O, C=O, S=O.<br>Exemplary anions include: B $(CF_3CO_2)_4^-$ $N(SO_2CF_3)_2^-$<br>Exemplary ionic liquid:<br>[EMI*][NTF$_2$]<br>*EMI - ethyl methyl immadizolium<br>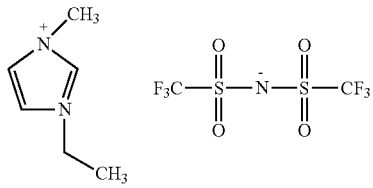 |
| 3 | $-Y_3a_3$ | $Y_3$ may be any of the following: Be, C, N, O, Mg, Ca, Ba, Ra, Au.<br>Exemplary anions include: —C(SO$_2$CF$_3$)$_3^-$<br>Exemplary ionic liquid:<br>[BMI] C(SO$_2$CF$_3$)$_3^-$<br>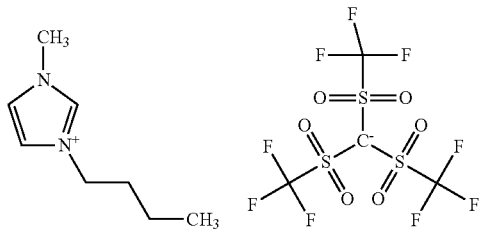 |
| 4 | $-Y_4a_4$ | $Y_4$ may be any of the following: B, Al, Ga, Th, In, P.<br>Exemplary anions include: —BF$_4^-$, —AlCl$_4^-$<br>Exemplary ionic liquid: [BMI][BF$_4$]<br>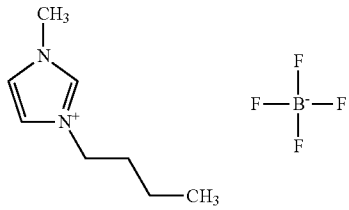 |
| 5 | $-Y_6a_6$ | $Y_6$ can be any of the following: P, S, Sb, As, N, Bi, Nb, Sb.<br>Exemplary anions include: —P(CF$_3$)$_4$F$_2^-$, —AsF$_6^-$<br>Exemplary ionic liquid: [BMI][PF$_6$]<br>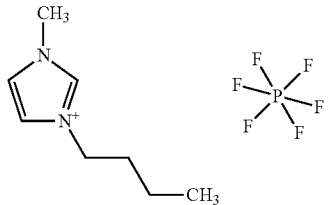 |

The term "cyano" is given its ordinary meaning in the art and refers to the group, CN. The term "sulfate" is given its ordinary meaning in the art and refers to the group, SO$_2$. The term "sulfonate" is given its ordinary meaning in the art and refers to the group, SO$_3$X, where X may be an electron pair, hydrogen, alkyl or cycloalkyl. The term "carbonyl" is recognized in the art and refers to the group, C=0.

An important aspect for consideration in construction of the ultracapacitor 10 is maintaining good chemical hygiene. In order to assure purity of the components, in various embodiments, the activated carbon, carbon fibers, rayon, carbon cloth, and/or nanotubes making up the energy storage media 1 for the two electrodes 3, are dried at elevated temperature in a vacuum environment. The separator 5 is also dried at elevated temperature in a vacuum environment. Once the electrodes 3 and the separator 5 are dried under vacuum, they are packaged in the housing 7 without a final seal or cap in an atmosphere with less than 50 parts per million (ppm) of water. The uncapped ultracapacitor 10 may be dried, for example, under vacuum over a temperature range of about 100 degrees Celsius to about 250 degrees Celsius. Once this final drying is complete, the electrolyte 6 may be added and the housing 7 is sealed in a relatively dry atmosphere (such as an atmosphere with less than about 50 ppm of moisture). Of course, other methods of assembly may be used, and the foregoing provides merely a few exemplary aspects of assembly of the ultracapacitor 10.

Generally, impurities in the electrolyte 6 are kept to a minimum. For example, in some embodiments, a total concentration of halide ions (chloride, bromide, fluoride, iodide), is kept to below about 1,000 ppm. A total concentration of metallic species (e.g., Br, Cd, Co, Cr, Cu, Fe, K, Li, Mo, Na, Ni, Pb, Zn, including an at least one of an alloy and an oxide thereof), is kept to below about 1,000 ppm. Further, impurities from solvents and precursors used in the synthesis process are kept below about 1,000 ppm and can include, for example, bromoethane, chloroethane, 1-bromobutane, 1-chlorobutane, 1-methylimidazole, ethyl acetate, methylene chloride and so forth.

In some embodiments, the impurity content of the ultracapacitor 10 has been measured using ion selective electrodes and the Karl Fischer titration procedure, which has been applied to electrolyte 6 of the ultracapacitor 10. It has been found that the total halide content in the ultracapacitor 10 according to the teachings herein has been found to be less than about 200 ppm of halides ($Cl^-$ and $F^-$) and water content is less than about 100 ppm.

One example of a technique for purifying electrolyte is provided in a reference entitled "The oxidation of alcohols in substituted imidazolium ionic liquids using ruthenium catalysts," Farmer and Welton, The Royal Society of Chemistry, 2002, 4, 97-102. An exemplary process is also provided herein.

The advanced electrolyte systems (AES) of the present invention comprise, in some embodiments, certain novel electrolytes for use in high temperature ultracapacitors. In this respect, it has been found that maintaining purity and low moisture relates to a degree of performance of the energy storage 10; and that the use of electrolytes that contain hydrophobic materials and which have been found to demonstrate greater purity and lower moisture content are advantageous for obtaining improved performance. These electrolytes exhibit good performance characteristics in a temperature range of about minus 40 degrees Celsius to about 250 degrees Celsius, e.g., about minus 10 degrees Celsius to about 250 degrees Celsius, e.g., about minus 5 degrees Celsius to about 250 degrees Celsius e.g., about 0 degrees Celsius to about 250 degrees Celsius e.g., about minus 20 degrees Celsius to about 200 degrees Celsius e.g., about 150 degrees Celsius to about 250 degrees Celsius e.g., about 150 degrees Celsius to about 220 degrees Celsius e.g., about 150 degrees Celsius to about 200 degrees Celsius, e.g., about minus 10 degrees Celsius to about 210 degrees Celsius e.g., about minus 10 degrees Celsius to about 220 degrees Celsius e.g., about minus 10 degrees Celsius to about 230 degrees Celsius.

Accordingly, novel electrolyte entities useful as the advanced electrolyte system (AES) include species comprising a cation (e.g., cations shown in FIG. 8 and described herein) and an anion, or combinations of such species. In some embodiments, the species comprises a nitrogen-containing, oxygen-containing, phosphorus-containing, and/or sulfur-containing cation, including heteroaryl and heterocyclic cations. In one set of embodiments, the advanced electrolyte system (AES) include species comprising a cation selected from the group consisting of ammonium, imidazolium, oxazolium, phosphonium, piperidinium, pyrazinium, pyrazolium, pyridazinium, pyridinium, pyrimidinium, sulfonium, thiazolium, triazolium, guanidium, isoquinolinium, benzotriazolium, and viologen-type cations, any of which may be substituted with substituents as described herein. In one embodiment, the novel electrolyte entities useful for the advanced electrolyte system (AES) of the present invention include any combination of cations presented in FIG. 8, selected from the group consisting of phosphonium, piperidinium, and ammonium, wherein the various branch groups Rx (e.g., Ri, R2, R3, . . . –Rx) may be selected from the group consisting of alkyl, heteroalkyl, alkenyl, heteroalkenyl, alkynyl, heteroalkynyl, halo, amino, nitro, cyano, hydroxyl, sulfate, sulfonate, and carbonyl, any of which is optionally substituted, and wherein at least two Rx are not H (i.e., such that the selection and orientation of the R groups produce the cationic species shown in FIG. 8); and the anion selected from the group consisting of tetrafluoroborate, bis(trifluoromethylsulfonyl)imide, tetracyanoborate, and trifluoromethanesulfonate.

For example, given the combinations of cations and anions above, in a particular embodiment, the AES may be selected from the group consisting of trihexyltetradecylphosphonium bis(trifluoromethylsulfonyl)imide, 1-butyl-1-methylpiperidinium bis(trifluoromethylsulfonyl)imide, and butyltrimethylammonium bis(trifluoromethylsulfonyl)imide.

In certain embodiments, the AES is trihexyltetradecylphosphonium bis(trifluoromethylsulfonyl)imide.

In certain embodiments, the AES is 1-butyl-1-methylpiperidinium bis(trifluoromethylsulfonyl)imide.

In certain embodiments, the AES is butyltrimethylammonium bis(trifluoromethylsulfonyl)imide.

In another embodiment, the novel electrolyte entities useful for the advanced electrolyte system (AES) of the present invention include any combination of cations presented in FIG. 8, selected from the group consisting of imidazolium and pyrrolidinium, wherein the various branch groups Rx (e.g., Ri, R2, R3, . . . Rx) may be selected from the group consisting of alkyl, heteroalkyl, alkenyl, heteroalkenyl, alkynyl, heteroalkynyl, halo, amino, nitro, cyano, hydroxyl, sulfate, sulfonate, and carbonyl, any of which is optionally substituted, and wherein at least two Rx are not H (i.e., such that the selection and orientation of the R groups produce the cationic species shown in FIG. 8); and the anion selected from the group consisting of tetrafluoroborate, bis(trifluoromethylsulfonyl)imide, tetracyanoborate, and trifluoromethanesulfonate. In one particular embodiment, the two Rx that are not H, are alkyl. Moreover, the noted cations exhibit high thermal stability, as well as high conductivity and exhibit good electrochemical performance over a wide range of temperatures.

For example, given the combinations of cations and anions above, in a particular embodiment, the AES may be selected from the group consisting of 1-butyl-3-methylimidazolium tetrafluoroborate; 1-butyl-3-methylimidazolium bis(trifluoromethylsulfonyl)imide, 1-ethyl-3-methylimidazolium tetrafluoroborate; 1-ethyl-3-methylimidazolium tetracyanoborate; 1-hexyl-3-methylimidazolium tetracyanoborate; 1-butyl-1-methylpyrrolidinium bis(trifluoromethylsulfonyl)imide; 1-butyl-1-methylpyrrolidinium tris(pentafluoroethyl) trifluorophosphate; 1-butyl-1-methylpyrrolidinium tetracyanoborate, and 1-butyl-3-methylimidazolium trifluoromethanesulfonate.

In one embodiment, the AES is 1-butyl-3-methylimidazolium tetrafluoroborate.

In one embodiment, the AES is 1-butyl-3-methylimidazolium bis(trifluoromethylsulfonyl)imide.

In one embodiment, the AES is 1-ethyl-3-methylimidazolium tetrafluoroborate.

In one embodiment, the AES is 1-ethyl-3-methylimidazolium tetracyanoborate.

In one embodiment, the AES is 1-hexyl-3-methylimidazolium tetracyanoborate.

In one embodiment, the AES is 1-butyl-1-methylpyrrolidinium bis(trifluoromethylsulfonyl)imide.

In one embodiment, the AES is 1-butyl-1-methylpyrrolidinium tris(pentafluoroethyl)trifluorophosphate.

In one embodiment, the AES is 1-butyl-1-methylpyrrolidinium tetracyanoborate.

In one embodiment, the AES is 1-butyl-3-methylimidazolium trifluoromethanesulfonate.

In another particular embodiment, one of the two Rx that are not H, is alkyl, e.g., methyl, and the other is an alkyl substituted with an alkoxy. Moreover, it has been found that cations having an N,O-acetal skeleton structure of the formula (1) in the molecule have high electrical conductivity, and that an ammonium cation included among these cations and having a pyrrolidine skeleton and an N,O-acetal group is especially high in electrical conductivity and solubility in organic solvents and supports relatively high voltage. As such, in one embodiment, the advanced electrolyte system comprises a salt of the following formula:

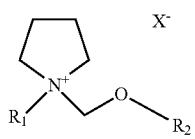

(1)

wherein R1 and R2 can be the same or different and are each alkyl, and X— is an anion. In some embodiments, Ri is straight-chain or branched alkyl having 1 to 4 carbon atoms, R2 is methyl or ethyl, and X" is a cyanoborate-containing anion 11. In a specific embodiment, X" comprises [B(CN)]4 and R2 is one of a methyl and an ethyl group. In another specific embodiment, Ri and R2 are both methyl. In addition, in one embodiment, cyanoborate anions 11, X" suited for the advanced electrolyte system of the present invention include, [B(CN)4]~ or [BFn(CN)4-n]~, where n=0, 1, 2 or 3.

Examples of cations of the AES of the present invention comprising a Novel Electrolyte Entity of formula (1), and which are composed of a quaternary ammonium cation shown in formula (I) and a cyanoborate anion are selected from N-methyl-N-methoxymethylpyrrolidinium (N-methoxymethyl-N-methylpyrrolidinium), N-ethyl-N-methoxymethylpyrrolidinium, N-methoxymethyl-N-n-propylpyrrolidinium, N-methoxymethyl-N-iso-propylpyrrolidinium, N-n-butyl-N-methoxymethylpyrrolidinium, N-iso-butyl-N-methoxymethylpyrrolidinium, N-tert-butyl-N-methoxymethylpyrrolidinium, N-ethoxymethyl-N-methylpyrrolidinium, N-ethyl-N-ethoxymethylpyrrolidinium (N-ethoxymethyl-N-ethylpyrrolidinium), N-ethoxymethyl-N-n-propylpyrrolidinium, N-ethoxymethyl-N-iso-propylpyrrolidinium, N-n-butyl-N-ethoxymethylpyrrolidinium, N-iso-butyl-N-ethoxymethylpyrrolidinium and N-tert-butyl-N-ethoxymethylpyrrolidinium. Other examples include N-methyl-N-methoxymethylpyrrolidinium (N-methoxymethyl-N-methylpyrrolidinium), N-ethyl-N-methoxymethylpyrrolidinium and N-ethoxymethyl-N-methylpyrrolidinium.

Additional examples of the cation of formula (1) in combination with additional anions may be selected from N-methyl-N-methoxymethylpyrrolidinium tetracyanoborate (N-methoxymethyl-N-methylpyrrolidinium tetracyanoborate), N-ethyl-N-methoxymethylpyrrolidinium tetracyanoborate, N-ethoxymethyl-N-methylpyrrolidinium tetracyanoborate, N-methyl-N-methoxymethylpyrrolidinium bistrifluoromethanesulfonylimide, (N-methoxymethyl-N-methylpyrrolidinium bistrifluoromethanesulfonylimide), N-ethyl-N-methoxymethylpyrrolidinium bistrifluoromethanesulfonylimide, N-ethoxymethyl-N-methylpyrrolidinium bistrifluoromethanesulfonylimide, N-methyl-N-methoxymethylpyrrolidinium trifluoromethanesulfolate (N-methoxymethyl-N-methyltrifluoromethanesulfolate).

When to be used as an electrolyte, the quaternary ammonium salt may be used as admixed with a suitable organic solvent. Useful solvents include cyclic carbonic acid esters, chain carbonic acid esters, phosphoric acid esters, cyclic ethers, chain ethers, lactone compounds, chain esters, nitrile compounds, amide compounds and sulfone compounds. Examples of such compounds are given below although the solvents to be used are not limited to these compounds.

Examples of cyclic carbonic acid esters are ethylene carbonate, propylene carbonate, butylene carbonate and the like, among which propylene carbonate is preferable.

Examples of chain carbonic acid esters are dimethyl carbonate, ethylmethyl carbonate, diethyl carbonate and the like, among which dimethyl carbonate and ethylmethyl carbonate are preferred.

Examples of phosphoric acid esters are trimethyl phosphate, triethyl phosphate, ethyldimethyl phosphate, diethylmethyl phosphate and the like. Examples of cyclic ethers are tetrahydrofuran, 2-methyltetrahydrofuran and the like. Examples of chain ethers are dimethoxy ethane and the like. Examples of lactone compounds are γ-butyrolactone and the like. Examples of chain esters are methyl propionate, methyl acetate, ethyl acetate, methyl formate and the like. Examples of nitrile compounds are acetonitrile and the like. Examples of amide compounds are dimethylformamide and the like. Examples of sulfone compounds are sulfolane, methyl sulfolane and the like. Cyclic carbonic acid esters, chain carbonic acid esters, nitrile compounds and sulfone compounds may be particularly desirable, in some embodiments.

These solvents may be used singly, or at least two kinds of solvents may be used in admixture. Examples of preferred organic solvent mixtures are mixtures of cyclic carbonic acid ester and chain carbonic acid ester such as those of ethylene carbonate and dimethyl carbonate, ethylene carbonate and ethylmethyl carbonate, ethylene carbonate and diethyl carbonate, propylene carbonate and dimethyl carbonate, propylene carbonate and ethylmethyl carbonate and propylene carbonate and diethyl carbonate, mixtures of chain carbonic acid esters such as dimethyl carbonate and ethylmethyl carbonate, and mixtures of sulfolane compounds such as sulfolane and methylsulfolane. More preferable are mixtures of ethylene carbonate and ethylmethyl carbonate, propylene carbonate and ethylmethyl carbonate, and dimethyl carbonate and ethylmethyl carbonate.

In some embodiments, when the quaternary ammonium salt of the invention is to be used as an electrolyte, the electrolyte concentration is at least 0.1 M, in some cases at least 0.5 M and may be at least 1 M. If the concentration is less than 0.1 M, low electrical conductivity will result, producing electrochemical devices of impaired performance. The upper limit concentration is a separation concentration when the electrolyte is a liquid salt at room temperature. When the solution does not separate, the limit concentration is 100%. When the salt is solid at room temperature, the limit concentration is the concentration at which the solution is saturated with the salt.

In certain embodiments, the advanced electrolyte system (AES) may be admixed with electrolytes other than those disclosed herein provided that such combination does not significantly affect the advantages achieved by utilization of the advanced electrolyte system, e.g., by altering the performance or durability characteristics by greater than 10%. Examples of electrolytes that may be suited to be admixed with the AES are alkali metal salts, quaternary ammonium salts, quaternary phosphonium salts, etc. These electrolytes may be used singly, or at least two kinds of them are usable in combination, as admixed with the AES disclosed herein. Useful alkali metal salts include lithium salts, sodium salts and potassium salts. Examples of such lithium salts are lithium hexafluorophosphate, lithium borofluoride, lithium perchlorate, lithium trifluoromethanesulfonate, sulfonylimide lithium, sulfonylmethide lithium and the like, which nevertheless are not limitative. Examples of useful sodium salts are sodium hexafluorophosphate, sodium borofluoride, sodium perchlorate, sodium trifluoromethanesulfonate, sulfonylimide sodium, sulfonylmethide sodium and the like. Examples of useful potassium salts are potassium hexafluorophosphate, potassium borofluoride, potassium perchlorate, potassium trifluoromethanesulfonate, sulfonylimide potassium, sulfonylmethide potassium and the like although these are not limitative.

Useful quaternary ammonium salts that may be used in the combinations described above (i.e., which do not significantly affect the advantages achieved by utilization of the advanced electrolyte system) include tetraalkylammonium salts, imidazolium salts, pyrazolium salts, pyridinium salts, triazolium salts, pyridazinium salts, etc., which are not limitative. Examples of useful tetraalkylammonium salts are tetraethylammonium tetracyanoborate, tetramethylammonium tetracyanoborate, tetrapropylammonium tetracyanoborate, tetrabutylammonium tetracyanoborate, triethylmethylammonium tetracyanoborate, trimethylethylammonium tetracyanoborate, dimethyldiethylammonium tetracyanoborate, trimethylpropylammonium tetracyanoborate, trimethylbutylammonium tetracyanoborate, dimethylethylpropylammonium tetracyanoborate, methylethylpropylbutylammonium tetracyanoborate, N,N-dimethylpyrrolidinium tetracyanoborate, N-ethyl-N-methylpyrrolidinium tetracyanoborate, N-methyl-N-propylpyrrolidinium tetracyanoborate, N-ethyl-N-propylpyrrolidinium tetracyanoborate, N,N-dimethylpiperidinium tetracyanoborate, N-methyl-N-ethylpiperidinium tetracyanoborate, N-methyl-N-propylpiperidinium tetracyanoborate, N-ethyl-N-propylpiperidinium tetracyanoborate, N,N-dimethylmorpholinium tetracyanoborate, N-methyl-N-ethylmorpholinium tetracyanoborate, N-methyl-N-propylmorpholinium tetracyanoborate, N-ethyl-N-propylmorpholinium tetracyanoborate and the like, whereas these examples are not limitative.

Examples of imidazolium salts that may be used in the combinations described above (i.e., which do not significantly affect the advantages achieved by utilization of the advanced electrolyte system) include 1,3-dimethylimidazolium tetracyanoborate, 1-ethyl-3-methylimidazolium tetracyanoborate, 1,3-diethylimidazolium tetracyanoborate, 1,2-dimethyl-3-ethylimidazolium tetracyanoborate and 1,2-dimethyl-3-propylimidazolium tetracyanoborate, but are not limited to these. Examples of pyrazolium salts are 1,2-dimethylpyrazolium tetracyanoborate, 1-methyl-2-ethylpyrazolium tetracyanoborate, 1-propyl-2-methylpyrazolium tetracyanoborate and 1-methyl-2-butylpyrazolium tetracyanoborate, but are not limited to these. Examples of pyridinium salts are N-methylpyridinium tetracyanoborate, N-ethylpyridinium tetracyanoborate, N-propylpyridinium tetracyanoborate and N-butylpyridinium tetracyanoborate, but are not limited to these. Examples of triazolium salts are 1-methyltriazolium tetracyanoborate, 1-ethyltriazolium tetracyanoborate, 1-propyltriazolium tetracyanoborate and 1-butyltriazolium tetracyanoborate, but are not limited to these. Examples of pyridazinium salts are 1-methylpyridazinium tetracyanoborate, 1-ethylpyridazinium tetracyanoborate, 1-propylpyridazinium tetracyanoborate and 1-butylpyridazinium tetracyanoborate, but are not limited to these. Examples of quaternary phosphonium salts are tetraethylphosphonium tetracyanoborate, tetramethylphosphonium tetracyanoborate, tetrapropylphosphonium tetracyanoborate, tetrabutylphosphonium tetracyanoborate, triethylmethylphosphonium tetrafluoroborate, trimethylethylphosphonium tetracyanoborate, dimethyldiethylphosphonium tetracyanoborate, trimethylpropylphosphonium tetracyanoborate, trimethylbutylphosphonium tetracyanoborate, dimethylethylpropylphosphonium tetracyanoborate, methylethylpropylbutylphosphonium tetracyanoborate, but are not limited to these.

Exemplary High Temperature Solid State Electrolyte

Disclosed herein is an energy storage device, e.g., a device comprising an EDLC that provides users with improved performance in a wide range of temperatures. For example, the energy storage device may be operable at temperatures ranging from as low as 0 C (degrees Celsius) or even below, to as high as about 300 C or more. In some embodiments, the energy storage device is operable at temperatures as high as about 200 C, 210 C, 220, C, 230 C, 240 C, 250 C, 260 C, 270 C, 280 C, 290 C, 300 C, or more and, in some embodiments, as low as 0 C or below. In some embodiments, the ultracapacitors may be configured to survive temperatures out side of the operating temperature range when not operating (e.g., maintained in a discharged state). For example, in some embodiments, the ultracapacitor may survive temperatures of up to 310 C or more and/or below 0 C, −10 C, −20, C, −30 C, −40 C, −45 C, −50 C, −55 C or less. In some embodiments, the ultracapacitor may be configured to have an operating temperature range of 0 C to 300 C, or any sub-range thereof, and/or a survivability temperature range of −55 C to 310 C, or any sub-range thereof.

In general, the device includes energy storage media that is adapted for providing high power density and high energy density when compared to prior art devices. The device includes components that are configured for ensuring operation over the temperature range, and includes any one or more of a variety of forms of electrolyte that are likewise rated for the temperature range. The combination of construction, energy storage media and electrolyte result in capabilities to provide robust operation under extreme conditions. To provide some perspective, aspects of an exemplary embodiment are now introduced.

As shown in FIGS. 1A and 1B, exemplary embodiments of a capacitor are shown. In each case, the capacitor is an "ultracapacitor 10." The difference between FIG. 1A and FIG. 1B is the inclusion of a separator in exemplary ultracapacitor 10 of FIG. 1A. The concepts disclosed herein generally apply equally to any exemplary ultracapacitor 10.

Certain electrolytes of certain embodiments are uniquely suited to constructing an exemplary ultracapacitor 10 without a separator. Unless otherwise noted, the discussion herein applies equally to any ultracapacitor 10, with or without a separator.

The exemplary ultracapacitor 10 is an electric double-layer capacitor (EDLC). The EDLC includes at least one pair of electrodes 3 (where the electrodes 3 may be referred to as a negative electrode 3 and a positive electrode 3, merely for purposes of referencing herein). When assembled into the ultracapacitor 10, each of the electrodes 3 presents a double layer of charge at an electrolyte interface. In some embodiments, a plurality of electrodes 3 is included (for example, in some embodiments, at least two pairs of electrodes 3 are included). However, for purposes of discussion, only one pair of electrodes 3 are shown. As a matter of convention herein, at least one of the electrodes 3 uses a carbon-based energy storage media 1 (as discussed further herein) to provide energy storage. However, for purposes of discussion herein, it is generally assumed that each of the electrodes includes the carbon-based energy storage media 1. It should be noted that an electrolytic capacitor differs from an ultracapacitor because, among other things, metallic electrodes differ greatly (at least an order of magnitude) in surface area.

Each of the electrodes 3 includes a respective current collector 2 (also referred to as a "charge collector"). In some embodiments, the electrodes 3 are separated by a separator 5. In general, the separator 5 is a thin structural material (usually a sheet) used to separate the negative electrode 3 from the positive electrode 3. The separator 5 may also serve to separate pairs of the electrodes 3. Once assembled, the electrodes 3 and the separator 5 provide a storage cell 12. Note that, in some embodiments, the carbon-based energy storage media 1 may not be included on one or both of the electrodes 3. That is, in some embodiments, a respective electrode 3 might consist of only the current collector 2. The material used to provide the current collector 2 could be roughened, anodized or the like to increase a surface area thereof. In these embodiments, the current collector 2 alone may serve as the electrode 3. With this in mind, however, as used herein, the term "electrode 3" generally refers to a combination of the energy storage media 1 and the current collector 2 (but this is not limiting, for at least the foregoing reason).

At least one form of electrolyte 6 is included in the ultracapacitor 10. The electrolyte 6 fills void spaces in and between the electrodes 3 and the separator 5. In general, the electrolyte 6 is a substance that disassociates into electrically charged ions. A solvent that dissolves the substance may be included in some embodiments of the electrolyte 6, as appropriate. The electrolyte 6 conducts electricity by ionic transport.

Generally, the storage cell 12 is formed into one of a wound form or prismatic form which is then packaged into a cylindrical or prismatic housing 7. Once the electrolyte 6 has been included, the housing 7 may be hermetically sealed. In various examples, the package is hermetically sealed by techniques making use of laser, ultrasonic, and/or welding technologies. In addition to providing robust physical protection of the storage cell 12, the housing 7 is configured with external contacts to provide electrical communication with respective terminals 8 within the housing 7. Each of the terminals 8, in turn, provides electrical access to energy stored in the energy storage media 1, generally through electrical leads which are coupled to the energy storage media 1.

Consider now the energy storage media 1 in greater detail. In the exemplary ultracapacitor 10, the energy storage media 1 is formed of carbon nanotubes. The energy storage media 1 may include other carbonaceous materials including, for example, activated carbon, carbon fibers, rayon, graphene, aerogel, carbon cloth, and a plurality of forms of carbon nanotubes. Activated carbon electrodes can be manufactured, for example, by producing a carbon base material by carrying out a first activation treatment to a carbon material obtained by carbonization of a carbon compound, producing a formed body by adding a binder to the carbon base material, carbonizing the formed body, and finally producing an active carbon electrode by carrying out a second activation treatment to the carbonized formed body. Carbon fiber electrodes can be produced, for example, by using paper or cloth pre-form with high surface area carbon fibers.

In some embodiments, the electrode of the ultracapacitor 10 includes a current collector comprising aluminum with an aluminum carbide layer on at least one surface, on which at least one layer of carbon nanotubes (CNTs) is disposed. The electrode may comprise vertically-aligned, horizontally-aligned, or nonaligned (e.g., tangled or clustered) CNTs. The electrode may comprise compressed CNTs. The electrode may comprise single-walled, double-walled, or multiwalled CNTs. The electrode may comprise multiple layers of CNTs. In some embodiments, the carbide layer includes elongated whisker structures with a nanoscale width. In some embodiments, the whiskers protrude into the layer of CNTs. In some embodiments, the whiskers protrude through an intervening layer (e.g., an oxide layer) into the layer of CNTs. Further details relating to electrodes of this type may be found in U.S. Provisional Patent Application No. 62/061,947 "ELECTRODE FOR ENERGY STORAGE DEVICE USING ANODIZED ALUMINUM" filed Oct. 9, 2014, the entire contents of which are incorporated herein by reference.

In an exemplary method for fabricating carbon nanotubes, an apparatus for producing an aligned carbon-nanotube aggregate includes apparatus for synthesizing the aligned carbon-nanotube aggregate on a base material having a catalyst on a surface thereof. The apparatus includes a formation unit that processes a formation step of causing an environment surrounding the catalyst to be an environment of a reducing gas and heating at least either the catalyst or the reducing gas; a growth unit that processes a growth step of synthesizing the aligned carbon-nanotube aggregate by causing the environment surrounding the catalyst to be an environment of a raw material gas and by heating at least either the catalyst or the raw material gas; and a transfer unit that transfers the base material at least from the formation unit to the growth unit. A variety of other methods and apparatus may be employed to provide the aligned carbon-nanotube aggregate.

In some embodiments, material used to form the energy storage media 1 may include material other than pure carbon (and the various forms of carbon as may presently exist or be later devised). That is, various formulations of other materials may be included in the energy storage media 1. More specifically, and as a non-limiting example, at least one binder material may be used in the energy storage media 1, however, this is not to suggest or require addition of other materials (such as the binder material). In general, however, the energy storage media 1 is substantially formed of carbon, and may therefore referred to herein as a "carbonaceous material," as a "carbonaceous layer" and by other similar terms. In short, although formed predominantly of carbon, the energy storage media 1 may include any form of carbon (as well as any additives or impurities as deemed appropriate or acceptable) to provide for desired functionality as energy storage media 1.

In one set of embodiments, the carbonaceous material includes at least about 60% elemental carbon by mass, and in other embodiments at least about 75%, 85%, 90%, 95% or 98% by mass elemental carbon.

Carbonaceous material can include carbon in a variety forms, including carbon black, graphite, and others. The carbonaceous material can include carbon particles, including nanoparticles, such as nanotubes, nanorods, graphene sheets in sheet form, and/or formed into cones, rods, spheres (buckyballs) and the like.

Some embodiments of various forms of carbonaceous material suited for use in energy storage media 1 are provided herein as examples. These embodiments provide robust energy storage and are well suited for use in the electrode 3. It should be noted that these examples are illustrative and are not limiting of embodiments of carbonaceous material suited for use in energy storage media 1.

In general, the term "electrode" refers to an electrical conductor that is used to make contact to another material which is often non-metallic, in a device that may be incorporated into an electrical circuit. Generally, the term "electrode," as used herein, is with reference to the current collector 2 and the additional components as may accompany the current collector 2 (such as the energy storage media 1) to provide for desired functionality (for example, the energy storage media 1 which is mated to the current collector 2 to provide for energy storage and energy transmission). An exemplary process for complimenting the energy storage media 1 with the current collector 2 to provide the electrode 3 is now provided.

The separator 5 may be fabricated from various materials. In some embodiments, the separator 5 is non-woven glass. The separator 5 may also be fabricated from fiberglass, ceramics and flouro-polymers, such as polytetrafluoroethylene (PTFE), commonly marketed as TEFLON™ by DuPont Chemicals of Wilmington, Del. For example, using non-woven glass, the separator 5 can include main fibers and binder fibers each having a fiber diameter smaller than that of each of the main fibers and allowing the main fibers to be bonded together.

For longevity of the ultracapacitor 10 and to assure performance at high temperature, the separator 5 should have a reduced amount of impurities and in particular, a very limited amount of moisture contained therein. In particular, it has been found that a limitation of about 200 ppm of moisture is desired to reduce chemical reactions and improve the lifetime of the ultracapacitor 10, and to provide for good performance in high temperature applications. Some embodiments of materials for use in the separator 5 include polyamide, polytetrafluoroethylene (PTFE), polyether-ether-ketone (PEEK), aluminum oxide (Al2O3), fiberglass, glass-reinforced plastic (GRP), polyester, nylon, and polyphenylene sulfide (PPS).

In general, materials used for the separator 5 are chosen according to moisture content, porosity, melting point, impurity content, resulting electrical performance, thickness, cost, availability and the like. In some embodiments, the separator 5 is formed of hydrophobic materials.

Note that, in some embodiments, the ultracapacitor 10 does not require or include the separator 5. For example, in some embodiments, such as where the electrodes 3 are assured of physical separation by a geometry of construction, it suffices to have electrolyte 6 alone between the electrodes 3. More specifically, and as an example of physical separation, one such ultracapacitor 10 may include electrodes 3 that are disposed within a housing such that separation is assured on a continuous basis. For example, in embodiments described herein using a solid state polymer electrolyte doped with a ionic liquid, the electrolyte itself may maintain mechanical separation of the electrodes 3.

As described in detail above, the electrolyte 6 may include a pairing of cations 9 and anions 11 and may include a solvent or other additives. The electrolyte 6 may include an "ionic liquid" as appropriate. Various combinations of cations 9, anions 11 and solvent may be used.

In some embodiments, the electrolyte 6 may be adapted such that the ultracapacitor 10 is operable at temperatures as high as about 200 C, 210 C, 220, C, 230 C, 240 C, 250 C, 260 C, 270 C, 280 C, 290 C, 300 C, 310 C, 350 C or more and, in some embodiments, as low as 0 C or below. In some embodiments, the ultracapacitor 10 may be configured to survive temperatures outside of its operating temperature range when not operating (e.g., maintained in a discharged state). For example, in some embodiments, the ultracapacitor 10 may survive temperatures of up to 350 C or more and/or below 0 C, −10 C, −20, C, −30 C, −40 C, −45 C, −50 C, −55 C or less. In some embodiments, the ultracapacitor 10 may be configured to have an operating temperature range of 0 C to 350 C, or any sub-range thereof, and/or a survivability temperature range of −55 C to 350 C, or any sub-range thereof.

Figure 9:
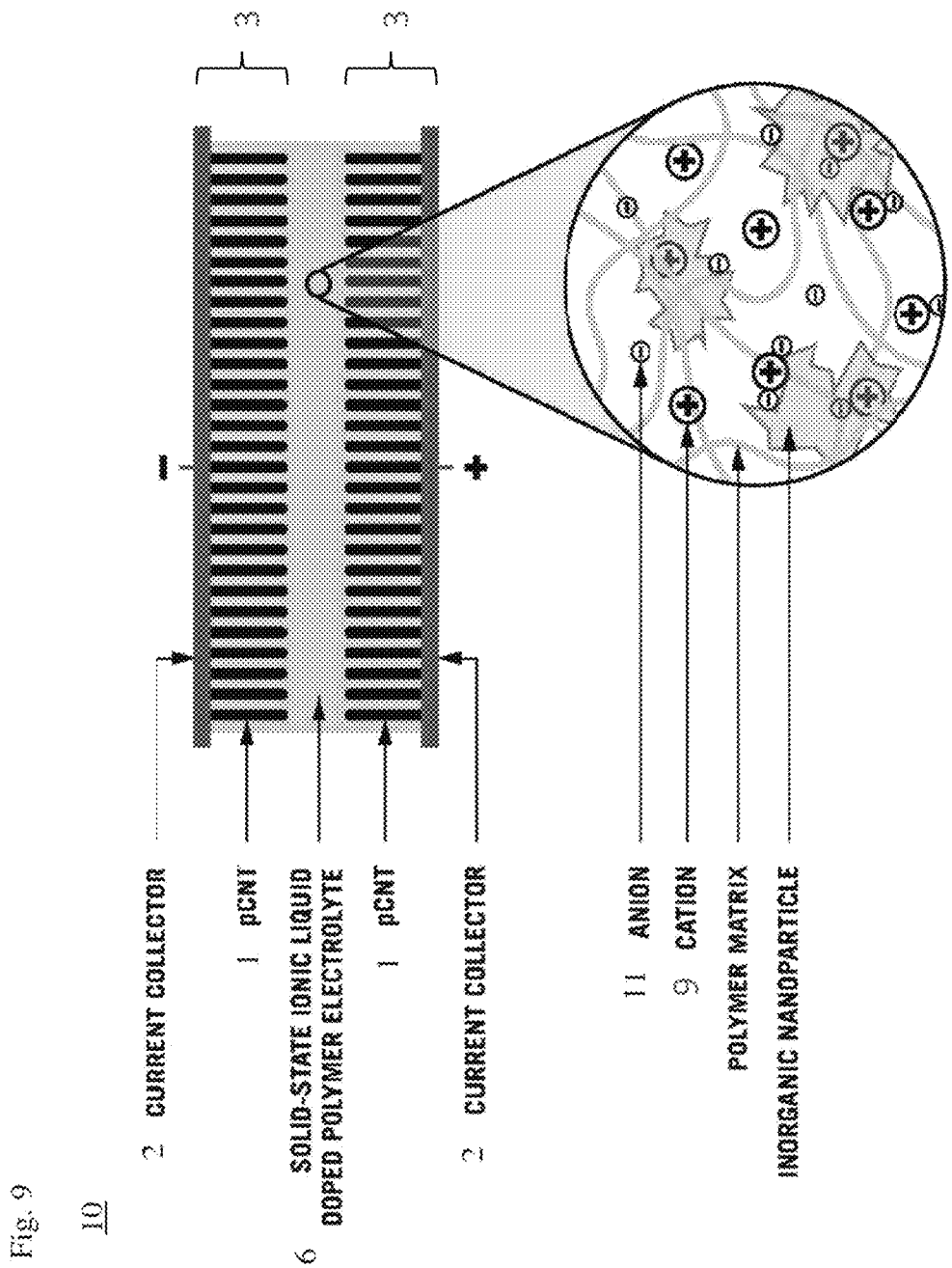
FIG. 9 illustrates aspects of an exemplary ultracapacitor that employs a solid state electrolyte.

For example, a in FIG. 9, in some embodiments the electrolyte 6 may include a solid state polymer matrix doped with one or more ionic liquids (comprising cations 9 and anions 11). The polymer electrolyte may be cast over the energy storage media 1 (as shown purified carbon nanotubes pCNT disposed on a current collector such an etched aluminum foil). The electrolyte provides mechanical separation between the electrodes, obviating the need for a separator 5 (e.g., similar to the configuration shown in FIG. 1B). In some embodiments, instead of casting the matrix directly onto the electrode, it may be cast separately, and applied in one or more portions, e.g., as a sheet cut to fit between the electrodes.

At each electrode 3, the space between adjacent pCNTs is filled by polymer electrolyte 6. When a voltage is applied to the device terminals 8, ions in the electrolyte and charge of opposite sign in the electrode 3 accumulate at the interface between the pCNTs and the polymer electrolyte 6 (e.g., as shown in FIG. 1B). The energy stored in the electric field at this double-layer of charge scales with the applied voltage, electrode surface area, capacitance, and amount of polymer electrolyte stored in each porous electrode. The peak power of the ultracapacitor scales with the applied voltage and the electrode-electrolyte conductivity.

Figure 10:
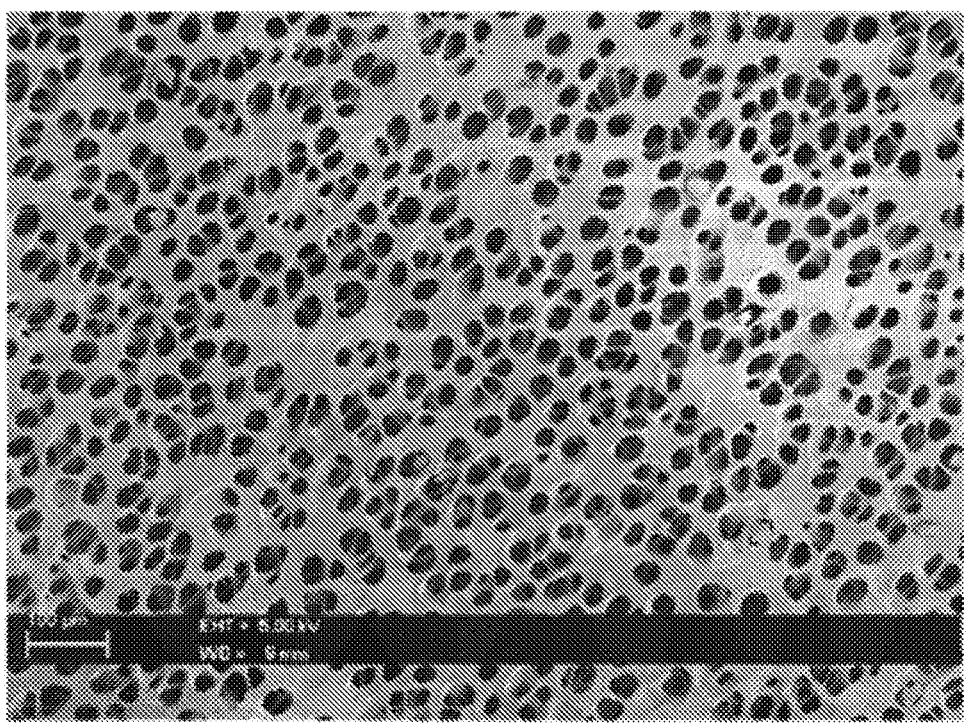
FIG. 10 illustrates am electron micrograph of an ionic liquid doped polymer matrix.

The electrolyte ions access the pCNT electrodes 3 during charge and discharge by traveling through the hosting polymer matrix. In some embodiments, additives may be included in the polymer to promoted enhanced ion mobility. For example, in some embodiments, inorganic high surface area additives such may be used that create defects in the polymer matrix and promote enhanced ion mobility thus increasing the conductivity of the solid state electrolyte. An electron micrograph of an example of a nanoporous ionic fluid doped polymer matrix is shown in FIG. 10.

Exemplary additives include fumed oxides such as fumed silicon oxide or fumed aluminum oxide, barium titanate, barium strontium titanium oxide, and the like. Other suitable additives include other inorganic or ceramic powders (e.g., alumina, titania, magnesia, aluminosilicates, or titanates such as BaTiO$_3$) or clays (e.g., bentonite or montmorillonite and their derivatives).

In some embodiments, the additives may have a small average particle, e.g., of less than 100 nm, 50 nm, 40 nm, 30 nm, 10 nm, 5 nm, 2 nm, or less, e.g., in the range of 1 nm-100 nm or any sub-range thereof. In various embodiments, the concentration of additives in the ionic liquid dope polymer electrolyte material may be, e.g., in the range of 1%-50% by weight, or any sub-range thereof.

In some embodiments, the energy storage material may be a layer of highly purified carbon nanotubes or "pCNT". In some embodiments, the CNTs may be produced with a Chemical Vapor Deposition process, e.g., of the type described herein. The CNTs may be purified, e.g., through an annealing process to form pCNTs. Unlike activated carbon, activated carbon fibers and activated aerogel, pCNTs do not present intrinsic impurities and oxygen functional groups instilled by the activation process, thus allowing for lower leakage current at high temperatures.

Figure 11:
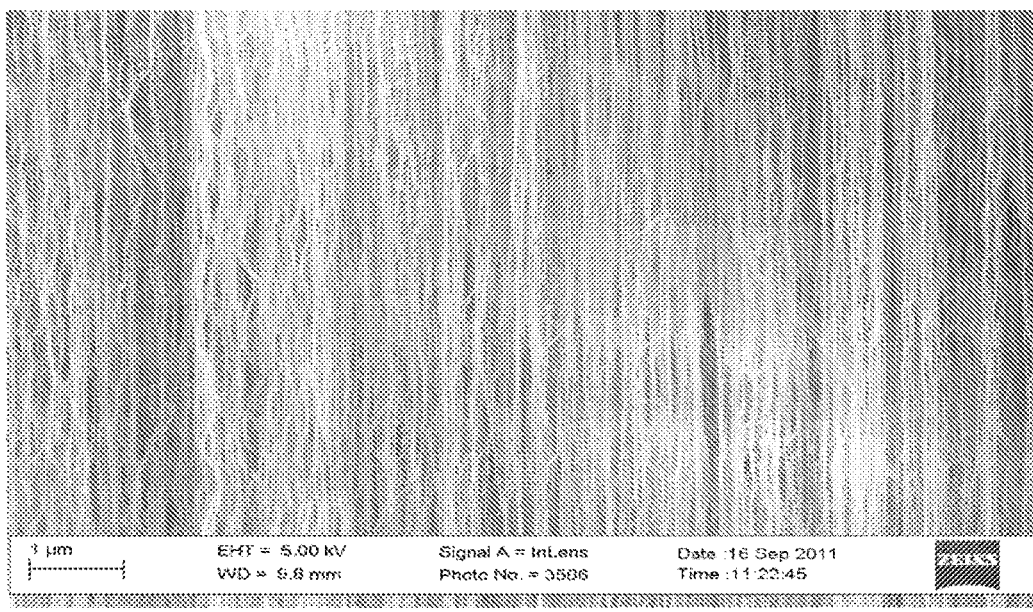
FIG. 11 illustrates am electron micrograph of purified carbon nanotubes.

In some embodiments the pCNTs may be substantially free of contaminates including binders, adhesives, and the like. pCNT electrodes do not require binder or adhesives to have mechanical stability, thanks to the large Van de Waals forces (gecko effect) between pCNTs, that keep each filament attached and parallel to each other (as shown in FIG. 11).

In some embodiments, pCNT assemblies can be transferred onto porous metallic current collectors without using adhesives. In some embodiments, the inert nature of our pCNT based electrode, due to the absence of activation processes, binders, adhesives and oxygen groups leads to a higher operating temperature. The purity of the pCNT electrode may facilitate high temperature operation: oxygen groups and other contaminants coming from the synthesis process, will have to be removed from the CNT structure to reduce spurious faradaic reaction at high temperature.

In some embodiments, a pCNT based electrode with total average thickness of 50 µm or less (e.g., in the range of 1 µm to 50 µm or any sub-range thereof) may be used in order to allow the penetration of the polymer electrolyte into each pore of the electrode (i.e., the void spaces between pCNTs). The channel-like morphology of the active material will facilitate the access of the ions contained in the ionic liquid.

In some embodiments, the average pore diameter of the electrode is selected to be larger than the average diameter of the ions contained in polymer electrolyte, which typically have average diameter of 0.5-2 nm. This may increase accessibility of the ions to the electrode. In some embodiments, the average pore diameter will be greater than about 2 nm, 5 nm, 10 nm, 15 nm or more, e.g., in the range of 2 nm to 50 nm or any sub-range thereof. In some embodiments, the average pore size can be controlled through the CNT synthesis and subsequent electrode fabrication. Pressure, temperature and feedstock gas flow during the CVD synthesis may be adjusted in other to control the CNT spacing and diameter, while the pressure during roll-to-roll transfer may be adjusted to control the total thickness and density of the pCNT active material.

In some embodiments, the pCNT may include less than 200 ppm, 100 ppm, 50 ppm, 10 ppm. 5 ppm, 4 ppm, 3 ppm, 2 ppm, 1 ppm or less (by weight or volume) of impurities including, e.g., halides, moisture, and oxygen functional groups.

In some embodiments, CNTs are grown using a CVD process on a high temperature metallic substrate. Examples of substrate materials are Tungsten or Ni—Fe—Co alloys.

After synthesis CNTs may be purified through a low pressure annealing process. The oxygen groups (OH, COOH) that are attached to the outer wall of the CNTs after synthesis maybe removed during a low pressure high temperature (e.g., T>800° C.) treatment in inert gas (e.g., Argon, Helium, Nitrogen, or combinations thereof).

During this step the oxygen groups will be outgassed, and the so formed pCNTs will show a graphitized more electrochemically stable structure for high temperature operations. Physical and structural characterization tests (such as Raman Spectroscopy, TGA) may be performed to corroborate the removal of the oxygen groups.

In some embodiments, the electrode 6 may be fabricated as follows. The active material is composed of the pCNTs. These structures are intrinsically extremely conductive and impurity free. The electrode current collector 2 may be very conductive and electrochemically stable. A suitable current collector 2 is an etched metallic foil such as etched aluminum foil. In some embodiments, pCNTs are transferred from the high temperature metallic substrate to the etched aluminum current collector, e.g., via a roll-to-roll step. The Van der Waals forces between pCNTs and the aluminum foil will create a good mechanical and electrical contact, thus forming a high surface area and low resistance binder-free, adhesive-free electrode. Pressure and speed are the parameters to be controlled during this step since they affect the density and total thickness of the final electrode.

Returning to the electrolyte 6, in some embodiments, one or more selected ionic liquids will be inserted in the hosting polymer matrix by dissolving the polymer in polar solvents and subsequently adding a selected amount of ionic liquid in the mixture. This mixture may be casted, e.g., on top of the pCNT electrodes, to form separate membranes. The solvent contained in the mixture can be removed, e.g., by evaporation in vacuum. The deposited ionic liquid polymer compound will form a flexible membrane. Thus, the polymer electrolyte may be formed in the pCNT electrode pores and as a separate self-standing membrane that may be used to securely separate the electrodes in order to prevent short circuits once the ultracapacitor is assembled.

In some embodiments, the polymer electrolyte may be fabricated in an environment configured to prevent impurities, e.g., a dry environment under inert gas. In some embodiments, the polymer electrolyte may include less than 200 ppm, 100 ppm, 50 ppm, 10 ppm, 5 ppm, 4 ppm, 3 ppm, 2 ppm, 1 ppm or less (by weight or volume) of impurities including, e.g., halides, moisture.

In various embodiments, the polymer material may be chosen for high mechanical and chemical stability at temperatures above the maximum operating temperature of the ultracapacitor. For example, in some embodiments the polymer remains substantially solid (e.g., sufficiently solid to mechanically separate the electrodes of the ultracapacitor) at temperatures up to at least 300 C, 325 C, 350 C, 375 C, 400 C, 425 C, 450 C, 475 C, 500 C or more. In some embodiments the polymer has a decomposition temperature of at least 300 C, 325 C, 350 C, 375 C, 400 C, 425 C, 450 C, 475 C, 500 C or more. In various embodiments, the polymer may include Polyimide (PI), Polybenzimidazole (PBI), Polyetheretherketone (PEEK), Polytetrafluoroethylene (PTFE), Poly(vinylidenefluoride-hexafluoropropylene) (PVDF-HFP), Polysulfone (PSU), Polyethersulfone (PES). Or the like, and combinations thereof.

In some embodiments, the ionic liquid may be selected for a high decomposition temperature, e.g., greater than 300 C, 325 C, 350 C, 375 C, 400 C, 425 C, 450 C, 475 C, 500 C, or more. Exemplary ionic liquids include: 1-Butyl-2,3- dimethylimidazolium bis(trifluoromethylsulfonyl)imide, 1-Ethyl-3-methylimidazolium bis(pentafluoroethylsulfonyl) imide, 1-Ethyl-2,3-dimethylimidazolium hexafluorophosphate, 1-Butyl-3-methylpyrrolidinium bis(trifluoromethylsulfonyl)imide, 1-Butyl-3-methylimidazolium bis (trifluoromethylsulfonyl)imide, 1-Butyl-3-methylimidazolium trifluoromethanesulfonate, and combinations thereof.

In various embodiments, the concentration of ionic liquid in the polymer material may be, e.g., in the range of 1%-50% by weight, or any sub-range thereof.

In some embodiments, the ionic liquid doped polymer electrolyte may have a decomposition temperature of greater than 300 C, 310 C, 320 C, 330 C, 340 C, 350 C, 360 C, 370 C, 380 C, 390 C, 400 C, or more. In some embodiments, the ionic liquid doped polymer electrolyte may be formed as a relatively thin membrane, e.g., with a thickness of less than about 100 µm or less. In some embodiments, the ionic liquid doped polymer electrolyte may have a conductivity at 300 C of greater than about 10 mS/cm.

Exemplary Applications

In various embodiments, ultracapacitors of the type described herein may be incorporated in a power system, e.g., of the types described in International Patent Application No. PCT/US14/29992 filed Mar. 15, 2014. For example, in various embodiments, the power system may include one or more of an ultracapacitor charging circuit, an ultracapacitor monitoring circuit, a cross over circuit, and a signal interface device such as a modular signal interface device, examples of all of which are described in the reference incorporated herein. In various embodiments, the ultracapacitor may be charged by another energy source, such as a battery, a generator, a wire line, etc.

In various embodiments, multiple ultracapacitors of the type described herein may be incorporated in a power system for use over a wide range of temperatures. For example, the system may include a first set of one or more ultracapacitors adapted for operation at low temperatures, but capable of surviving higher temperatures when not in use. The system may further include a second set of one or more ultracapacitors adapted for operation at high temperatures, but capable of surviving lower temperatures when not in use. The system may include a temperature sensor (or an ultracapacitor performance sensor) and control electronics capable of switching between the two sets of ultracapacitors to use the appropriate set for the ambient conditions (as determined directly from a temperature sensor, or indirectly based on system performance). In various embodiments, more than two sets of capacitors may be used, e.g., with each set adapted to operate in a respective temperature range. In some embodiments, such systems may be configured to have operating temperature ranges of e.g., −55 C to 300 C or any sub-range thereof. In an embodiment, the ultracapacitor that utilizes the electrolyte is configured to output electrical energy at operating voltages throughout an operating voltage range, the operating voltage range being between about 0 V and about 0.5 V.

Ultracapacitors described herein may be used in a variety of applications. In general, such ultracapacitors may be employed in power systems used in extreme conditions (e.g., low and/or high temperatures, high mechanical shock and vibration, etc.), e.g., to provide high power output. In various embodiments, the ultracapacitors may be charged from a relatively low rated source (e.g., low voltage, low current, low power, low reliability, and combinations thereof) and provide, e.g., pulses of power (e.g., at higher voltage, higher current, higher power, and combinations thereof) or "smoothed" output with greater reliability than the charging source. For example, in some embodiments, the relatively low rated source may include a battery, a solar cell, a thermoelectric generator, a mechanical generator, or any other suitable source.

In various embodiments, power systems including ultracapacitors described herein may be used to provide power to one or more components with high power demand. For example, in the aerospace context (e.g., airplanes, helicopters, drones, missiles, rockets, space launch vehicles, space exploration vehicles, and the like), the ultracapacitors may be charged over time by a relatively low power source (e.g., the main electrical system of an aerospace vehicle) and then discharged to provide relatively short pulses of high power output, e.g., to power one or more actuators (e.g., to actuate a control surface, door, landing gear, or other component of the vehicle), a sensor (e.g., a location sensor such as a GPS sensor, a radar sensor, an infrared sensor such as forward or downward looking infrared sensors, an acoustic sensor, a pressure sensor, etc.), a communication device (e.g., a radio or optical communication link, a satellite communication link, etc.), or any other suitable component.

In various embodiments, the teachings herein enable performance of ultracapacitors in extreme conditions. Ultracapacitors fabricated accordingly may, for example, operate at temperatures above 300 C for 10,000 charge/discharge cycles and/or over 100 hours or more at a voltage of 0.5V or more while exhibiting and increase in ESR or less than 100%, e.g. less than about 85% and a decrease in capacitance of less than about 10%. In some embodiments, such ultracapacitors may have a volumetric capacitance of about 5 Farad per liter (F/L), 6 F/L, 7 F/L, 8 F/L, 8 F/L, 10 F/L or more, e.g., in the range of about 1 to about 10 F/L or any sub-range thereof.

In some embodiments, ultracapacitors of the types described herein may exhibit any of: a high volumetric energy density (e.g., exceeding 0.25 Wh/L, 0.5 Wh/L, 1 Wh/L, 2 Wh/L, 3 Wh/L, 4 Wh/L, 5 Wh/L, 6 Wh/L, 7 Wh/L, 8 Wh/L, 9 Wh/L, 10 Wh/L, 11 Wh/L, 12 Wh/L, 15 Wh/L, 18 Wh/L, 20 Wh/L, or more), a high gravimetric energy density (e.g., exceeding 5 Wh/kg, 6 Wh/kg, 7 Wh/kg, 8 Wh/kg, 9 Wh/kg, 10 Wh/kg, 11 Wh/kg, 12 Wh/kg, 15 Wh/kg, 18 Wh/kg, or more), a high volumetric power density (e.g., exceeding 30 kW/L, 40 kW/L, 50 kW/L, 60 kW/L, 70 kW/L, 80 kW/L, 90 kW/L, 100 kW/L, 110 kW/L, 120 kW/L, or more), a high gravimetric power density (e.g., exceeding 30 kW/kg, 40 kW/kg, 50 kW/kg, 60 kW/kg, 70 kW/kg, 80 kW/kg, 90 kW/kg, 100 kW/kg, 110 kW/kg, 120 kw/KG or more), and combinations thereof. In some embodiments, ultracapacitors of the types described herein demonstrate high performance as indicated by the product of energy density and power density, e.g., exceeding 300 Wh-kW/L^2, 500 Wh-kW/L^2, 700 Wh-kW/L^2, or more.

In some embodiments, ultracapacitors of the type described herein may be highly resistant to shock and vibration. For example, in some embodiments, the ultracapacitor may operate for hundred, thousands, tens of thousands or more charge/discharge cycles even in the presence of shocks of up to 1000 G or more and vibrations of up to 60 $G_{rms}$ or more.

It should be recognized that the teachings herein are merely illustrative and are not limiting of the invention. Further, one skilled in the art will recognize that additional components, configurations, arrangements and the like may be realized while remaining within the scope of this invention. For example, configurations of layers, electrodes, leads, terminals, contacts, feed-throughs, caps and the like may be varied from embodiments disclosed herein. Generally, design and/or application of components of the ultracapacitor and ultracapacitors making use of the electrodes are limited only by the needs of a system designer, manufacturer, operator and/or user and demands presented in any particular situation.

Exemplary Wide Temperature Ultracapacitor

Disclosed herein is an energy storage device, e.g., comprising an EDLC that provides users with improved performance in a wide range of temperatures. For example, the energy storage device may be operable at temperatures ranging from about as low as −40 C (degrees Celsius) or even below, to as high as about 250 C. In some embodiments, the energy storage device is operable temperatures as high as about 200 C, as high as about 210 C, as high as about 220 C, as high as about C, as high as about 240 degrees C., or as high as about 250 C. In some embodiments, the ultracapacitor is operable temperatures as low as about 0 degrees Celsius, as low as about 0 C, −10 C, −20 C, −30 C, −40 C, −50 C, −60 C, −70. C, −80 C, −90 C, −100 C, −110 C, or even less.

In general, the device includes energy storage media that is adapted for providing high power density and high energy density when compared to prior art devices. The device includes components that are configured for ensuring operation over the temperature range, and includes any one or more of a variety of forms of electrolyte that are likewise rated for the temperature range. The combination of construction, energy storage media and electrolyte result in capabilities to provide robust operation under extreme conditions. To provide some perspective, aspects of an exemplary embodiment are now introduced.

As shown in FIGS. 1A and 1B, exemplary embodiments of a capacitor are shown. In each case, the capacitor is an "ultracapacitor 10." The difference between FIG. 1A and FIG. 1B is the inclusion of a separator in exemplary ultracapacitor 10 of FIG. 1A. The concepts disclosed herein generally apply equally to any exemplary ultracapacitor 10. Certain electrolytes of certain embodiments are uniquely suited to constructing an exemplary ultracapacitor 10 without a separator. Unless otherwise noted, the discussion herein applies equally to any ultracapacitor 10, with or without a separator.

The exemplary ultracapacitor 10 is an electric double-layer capacitor (EDLC). The EDLC includes at least one pair of electrodes 3 (where the electrodes 3 may be referred to as a negative electrode 3 and a positive electrode 3, merely for purposes of referencing herein). When assembled into the ultracapacitor 10, each of the electrodes 3 presents a double layer of charge at an electrolyte interface. In some embodiments, a plurality of electrodes 3 is included (for example, in some embodiments, at least two pairs of electrodes 3 are included). However, for purposes of discussion, only one pair of electrodes 3 are shown. As a matter of convention herein, at least one of the electrodes 3 uses a carbon-based energy storage media 1 (as discussed further herein) to provide energy storage. However, for purposes of discussion herein, it is generally assumed that each of the electrodes includes the carbon-based energy storage media 1. It should be noted that an electrolytic capacitor differs from an ultracapacitor because, among other things, metallic electrodes differ greatly (at least an order of magnitude) in surface area.

Each of the electrodes 3 includes a respective current collector 2 (also referred to as a "charge collector"). In some embodiments, the electrodes 3 are separated by a separator 5. In general, the separator 5 is a thin structural material (usually a sheet) used to separate the negative electrode 3 from the positive electrode 3. The separator 5 may also serve to separate pairs of the electrodes 3. Once assembled, the electrodes 3 and the separator 5 provide a storage cell 12. Note that, in some embodiments, the carbon-based energy storage media 1 may not be included on one or both of the electrodes 3. That is, in some embodiments, a respective electrode 3 might consist of only the current collector 2. The material used to provide the current collector 2 could be roughened, anodized or the like to increase a surface area thereof. In these embodiments, the current collector 2 alone may serve as the electrode 3. With this in mind, however, as used herein, the term "electrode 3" generally refers to a combination of the energy storage media 1 and the current collector 2 (but this is not limiting, for at least the foregoing reason).

At least one form of electrolyte 6 is included in the ultracapacitor 10. The electrolyte 6 fills void spaces in and between the electrodes 3 and the separator 5. In general, the electrolyte 6 is a substance that disassociates into electrically charged ions. A solvent that dissolves the substance may be included in some embodiments of the electrolyte 6, as appropriate. The electrolyte 6 conducts electricity by ionic transport.

Generally, the storage cell 12 is formed into one of a wound form or prismatic form which is then packaged into a cylindrical or prismatic housing 7. Once the electrolyte 6 has been included, the housing 7 may be hermetically sealed. In various examples, the package is hermetically sealed by techniques making use of laser, ultrasonic, and/or welding technologies. In addition to providing robust physical protection of the storage cell 12, the housing 7 is configured with external contacts to provide electrical communication with respective terminals 8 within the housing 7. Each of the terminals 8, in turn, provides electrical access to energy stored in the energy storage media 1, generally through electrical leads which are coupled to the energy storage media 1.

In the exemplary ultracapacitor 10, the energy storage media 1 is formed of carbon nanotubes. The energy storage media 1 may include other carbonaceous materials including, for example, activated carbon, carbon fibers, rayon, graphene, aerogel, carbon cloth, and a plurality of forms of carbon nanotubes. Activated carbon electrodes can be manufactured, for example, by producing a carbon base material by carrying out a first activation treatment to a carbon material obtained by carbonization of a carbon compound, producing a formed body by adding a binder to the carbon base material, carbonizing the formed body, and finally producing an active carbon electrode by carrying out a second activation treatment to the carbonized formed body. Carbon fiber electrodes can be produced, for example, by using paper or cloth pre-form with high surface area carbon fibers.

In some embodiments, the electrode of the ultracapacitor 10 includes a current collector comprising aluminum with an aluminum carbide layer on at least one surface, on which at least one layer of carbon nanotubes (CNTs) is disposed. The electrode may comprise vertically-aligned, horizontally-aligned, or nonaligned (e.g., tangled or clustered) CNTs. The electrode may comprise compressed CNTs. The electrode may comprise single-walled, double-walled, or multiwalled CNTs. The electrode may comprise multiple layers of CNTs. In some embodiments, the carbide layer includes elongated whisker structures with a nanoscale width. In some embodiments, the whiskers protrude into the layer of CNTs. In some embodiments, the whiskers protrude through an intervening layer (e.g., an oxide layer) into the layer of CNTs. Further details relating to electrodes of this type may be found in U.S. Provisional Patent Application No. 62/061,947 "ELECTRODE FOR ENERGY STORAGE DEVICE USING ANODIZED ALUMINUM" filed Oct. 9, 2014, the entire contents of which are incorporated herein by reference.

In some embodiments, material used to form the energy storage media 1 may include material other than pure carbon (and the various forms of carbon as may presently exist or be later devised). That is, various formulations of other materials may be included in the energy storage media 1. More specifically, and as a non-limiting example, at least one binder material may be used in the energy storage media 1, however, this is not to suggest or require addition of other materials (such as the binder material). In general, however, the energy storage media 1 is substantially formed of carbon, and may therefore referred to herein as a "carbonaceous material," as a "carbonaceous layer" and by other similar terms. In short, although formed predominantly of carbon, the energy storage media 1 may include any form of carbon (as well as any additives or impurities as deemed appropriate or acceptable) to provide for desired functionality as energy storage media 1.

In one set of embodiments, the carbonaceous material includes at least about 60% elemental carbon by mass, and in other embodiments at least about 75%, 85%, 90%, 95% or 98%) by mass elemental carbon.

Carbonaceous material can include carbon in a variety of forms, including carbon black, graphite, and others. The carbonaceous material can include carbon particles, including nanoparticles, such as nanotubes, nanorods, graphene sheets in sheet form, and/or formed into cones, rods, spheres (buckyballs) and the like.

Some embodiments of various forms of carbonaceous material suited for use in energy storage media 1 are provided herein as examples. These embodiments provide robust energy storage and are well suited for use in the electrode 3. It should be noted that these examples are illustrative and are not limiting of embodiments of carbonaceous material suited for use in energy storage media 1.

In general, the term "electrode" refers to an electrical conductor that is used to make contact to another material which is often non-metallic, in a device that may be incorporated into an electrical circuit. Generally, the term "electrode," as used herein, is with reference to the current collector 2 and the additional components as may accompany the current collector 2 (such as the energy storage media 1) to provide for desired functionality (for example, the energy storage media 1 which is mated to the current collector 2 to provide for energy storage and energy transmission). An exemplary process for complimenting the energy storage media 1 with the current collector 2 to provide the electrode 3 is now provided.

The separator 5 may be fabricated from various materials. In some embodiments, the separator 5 is non-woven glass. The separator 5 may also be fabricated from fiberglass, ceramics and flouro-polymers, such as polytetrafluoroethylene (PTFE), commonly marketed as TEFLON™ by DuPont Chemicals of Wilmington, Del. For example, using non-woven glass, the separator 5 can include main fibers and binder fibers each having a fiber diameter smaller than that of each of the main fibers and allowing the main fibers to be bonded together.

For longevity of the ultracapacitor 10 and to assure performance at high temperature, the separator 5 should have a reduced amount of impurities and in particular, a very limited amount of moisture contained therein. In particular, it has been found that a limitation of about 200 ppm of moisture is desired to reduce chemical reactions and improve the lifetime of the ultracapacitor 10, and to provide for good performance in high temperature applications. Some embodiments of materials for use in the separator 5 include polyamide, polytetrafluoroethylene (PTFE), polyether-ether-ketone (PEEK), aluminum oxide (Al2O3), fiberglass, glass-reinforced plastic (GRP), polyester, nylon, and polyphenylene sulfide (PPS).

In general, materials used for the separator 5 are chosen according to moisture content, porosity, melting point, impurity content, resulting electrical performance, thickness, cost, availability and the like. In some embodiments, the separator 5 is formed of hydrophobic materials.

Note that, in some embodiments, the ultracapacitor 10 does not require or include the separator 5. For example, in some embodiments, such as where the electrodes 3 are assured of physical separation by a geometry of construction, it suffices to have electrolyte 6 alone between the electrodes 3. More specifically, and as an example of physical separation, one such ultracapacitor 10 may include electrodes 3 that are disposed within a housing such that separation is assured on a continuous basis. A bench-top example would include an ultracapacitor 10 provided in a beaker.

The ultracapacitor 10 may be embodied in several different form factors (i.e., exhibit a certain appearance). Examples of potentially useful form factors include, a cylindrical cell, an annular or ring-shaped cell, a flat prismatic cell or a stack of flat prismatic cells comprising a box-like cell, and a flat prismatic cell that is shaped to accommodate a particular geometry such as a curved space. A cylindrical form factor may be most useful in conjunction with a cylindrical tool or a tool mounted in a cylindrical form factor. An annular or ring-shaped form factor may be most useful in conjunction with a tool that is ring-shaped or mounted in a ring-shaped form factor. A flat prismatic cell shaped to accommodate a particular geometry may be useful to make efficient use of "dead space" (i.e., space in a tool or equipment that is otherwise unoccupied, and may be generally inaccessible).

The electrolyte 6 includes a pairing of cations 9 and anions 11 and may include a solvent or other additives. The electrolyte 6 may be referred to as a "ionic liquid" as appropriate. Various combinations of cations 9, anions 11 and solvent may be used.

In some embodiments, the electrolyte 6 may be adapted such that the ultracapacitor 10 has an operational temperature range that extends to low temperatures, e.g., less than about −40 C, −50 C, −60 C, −70 C, −80 C, −90 C, −100 C, −110 C, −120 C, −130 C, −140 C, −150 C, −160 C, −170 C, −180 C, −190 C, −200 C, or less. In some embodiments, the operational temperature range may also extend to relatively high temperatures, e.g., greater than about 0 C, 10 C, 20 C, 30 C, 40 C, 50 C, 60 C, 70 C, 80 C, 90 C, 100 C, 110 C, 120 C, 130 C, 140 C, 150 C, 160 C, 170 C, 180 C, 190 C, 200 C, 210 C, 220 C, 230 C, 240 C, 250 C, or more. For example, in various embodiments, the operational temperature range may be, e.g., −200 C to 250 C, or any subrange thereof, e.g., −60 C to 70 C, −70 C to 70 C, −80 C to 70 C, −90 C to 70 C, −100 C to 70 C, −110 C to 70 C, −120 C to 70 C, −130 C to 70 C, −60 C to 75 C, −70 C to 75 C, −80 C to 75 C, −90 C to 75 C, −100 C to 75 C, −110 C to 75 C, −120 C to 75 C, −130 C to 75 C, −60 C to 80 C, −70 C to 80 C, −80

C to 80 C, −90 C to 80 C, −100 C to 80 C, −110 C to 80 C, −120 C to 80 C, or −130 C to 80 C.

In some embodiments, such performance may be provided at least in part by use of solvent combined with the cations 9 and anions 11 (cations 9 and anions 11 are referred to collectively as a "salt" or "ionic liquid") to form the electrolyte 6. The solvent may be chosen to have a low melting point (e.g., significantly lower than the low end of the operating temperature range of the ultracapacitor 10) and a high dielectric constant to improve solubility of the salt and achieve high ionic conductivity (which tends to be reduced at lower temperatures).

However, in many cases, solvents with low melting point have relatively low dielectric constant, and vice versa. Accordingly, in some embodiments a combination of at least two solvents are used. The first solvent may be selected to provide relatively high dielectric constant. For example, in some embodiments, the first solvent may have a dielectric constant at 25 C greater than about 2, e.g., preferable greater than about 5, 10, 15, 20, 25, 30, 35, 40, 45, 50, or more, e.g., in the range of 2 to 50, or any subrange thereof, such as about 20 to about 40. In some embodiments, the first solvent may be selected to exhibit relatively low viscosity. For example, in some embodiments, the first solvent may exhibit a viscosity of (in units of centiPoise or 0.01 Poise) of less than about 2, 1.5, 1.0, 0.5, 0.4, 0.3, 0.2 or less.

In some embodiments, the first solvent may have a relatively high melting point, e.g., greater than about −80 C, −70 C, −60 C, −50 C, −40 C, or more, e.g., greater than the lower limit of the operating temperature range of the ultracapacitor 10. In some such embodiments, the second solvent (discussed in greater detail below) may be selected to have a melting point lower than the first solvent, such that the overall melting point of the electrolyte 6 is reduced, e.g., such that it is less than the lower limit of the operating temperature range of the ultracapacitor 10.

Examples of materials suitable for use as the first solvent include, but are not limited to: acetonitrile, trimethylamine, propylene carbonate, gamma-butyrolactone, and the like. In some embodiments, the first solvent and or the second solvent may be selected from acetonitrile, propylene carbonate, methyl formate, ethyl acetate, methyl acetate, propionitrile, butyronitrile, and 1,3-dioxolane.

In some embodiments, the second solvent may have a lower dielectric constant than the first solvent, but may exhibit some other desirable property. For example, in some embodiments, the second solvent may be selected to have a melting point lower than the first solvent, such that the overall melting point of the electrolyte 6 is reduced. For example, the second solvent may have a melting point that is less than the boiling point of the first solvent by at least 10 C, 20 C, 30 C, 40 C, 50 C, 60 C, 70 C, 80 C, 90 C, 100 C, or more.

In some embodiments, the second solvent may also exhibit relatively low viscosity. In some embodiments, the first solvent may exhibit a viscosity of (in units of centiPoise or 0.01 Poise) of less than about 2, 1.5, 1.0, 0.5, 0.4, 0.3, 0.2 or less.

Examples of materials suitable for use as the second solvent include, but are not limited to the solvents provided in FIG. 12. In various embodiments, an ester solvent may be used as the second solvent. In some embodiments of the invention, (e.g., where the first solvent includes acetonitrile) the second solvent may include an organic carbonate, ether, formate, ester or substituted nitrile.

In various embodiments, the ratio of the amount (by mass or volume) of the first solvent to the second solvent may be any suitable value. For example, in some embodiment the ratio may be in the range of, e.g., 1:1 to 10:1, or any subrange thereof, e.g., about 1:1, about 2:1, about 3:1, or about 4:1.

In some embodiments, more or less than two solvents may be used. In general, multiple solvents may be combined to provide suitable trade-offs in performance in any of several aspects including: melting point, boiling point, disintegration temperature, salt solubility, ultracapacitor capacitance, ultracapacitor equivalent series resistance, and the like.

In some embodiments, the molarity of the salt in the electrolyte 6 may be selected to enhance the performance of the ultracapacitor 10. In some embodiments, at low temperatures, choosing a reduced concentration of salt unexpectedly provides for increased low temperature ultracapacitor performance (e.g., increased capacitance or decreased equivalent series resistance at low temperature). Not wishing to be bound be theory, it is believed that lower concentration reduces or eliminates precipitation of the salt into pores in the energy storage media 1, thereby reducing the surface area of the media.

In some embodiments, the molarity of the salt may be selected as follows. First, some or all of the other relevant design parameters of the ultracapacitor 10 (e.g., electrolyte type, energy storage media type, separator material, form factor, etc.) may be set. Next, the molarity of the salt in the electrolyte 6 is varied (e.g., by preparing several otherwise identical test cells with varying salt molarity). Next, at least one performance metric (e.g., capacitance, ESR, and/or voltage window) of the ultracapacitor is measured, e.g., at a desired minimum operating temperature as a function of salt molarity (e.g., over the range of 0.1 M to 10 M, or a selected subrange thereof). Finally a desired molarity is selected based on the measured performance metric (e.g., by interpolating a molarity corresponding to an optimum performance metric).

In some embodiments, the molarity of the salt in the electrolyte 6 may be in the range of, e.g., 0.1 M to 10 M, or a selected subrange thereof, such as 0.25 M to 2.5 M.

In various embodiments, the salt may include any of the cations and anions set forth in FIG. 13. In some embodiments, it may be advantageous to select a salt featuring a highly asymmetric cation, which may promote a lower melting point of the resulting ionic liquid.

In some embodiments, the salt may include more than one ionic liquid (i.e., more than one cation, anion, or both). In some such embodiments, the cations of each of the ionic liquids may be selected to have significantly different structures, which may promote a lower melting point of the resulting ionic liquid combination. For example, in some embodiments, the first cation may include one or more functional groups not present in the second cation. In some embodiments, the first cation may be more highly branched than the second cation, etc.

Examples of suitable salts for use in electrolyte 6 include, but are not limited to quaternary ammonium salts such as tetraethylammonium tetrafluoroborate, triethylmethylammonium tetrafluoroborate, spiro-type quaternary ammonium salts such as spiro-(1,1')-bipyrrolidinium tetrafluoroborate, and alkyl quaternary ammonium salts such tetraalkylammonium salts. In some embodiments, other suitable cations, anions, and combinations thereof for use as ionic liquids in electrolyte 6 include those set forth in the FIG. 13.

In some embodiments, the electrolyte 6 may include a combination of a liquid gas (i.e., a liquefied material that would be a gas at, e.g., a temperature of 0 C and a pressure of 760 mmHg), and one or more salts (e.g., of any of the types disclosed herein). For example, the housing 7 of the ultracapacitor 10 may include a pressure vessel used to contain the liquid gas a sufficient pressure to maintain the material in the liquid state over the operational temperature range of the ultracapacitor 10. For example, the pressure vessel may include a metallic (e.g., steel) material, a composite material (e.g., wound carbon fiber), or combinations thereof. In some embodiments, all or a portion of the interior surface of the vessel may be coated with a material that is less chemically reactive with the electrolyte 6 than the underlying material of the vessel. In some embodiments, the vessel is compliant with one or more pressure vessel safety standards known in the art, including, e.g., one or more of ASME Boiler and Pressure Vessel Code Section VIII: Rules for Construction of Pressure Vessels., AIAA S-080-1998: AIAA Standard for Space Systems—Metallic Pressure Vessels, Pressurized Structures, and Pressure Components, AIAA S-081A-2006: AIAA Standard for Space Systems—Composite Overwrapped Pressure Vessels (COPVs).

In some embodiments, the vessel may include one or more thermal insulating elements. For example, in some embodiments, the vessel may be constructed as a vacuum flask or Dewar flask of the type familiar from cryogenic storage applications.

Examples of liquid gases suitable for use in some embodiments includes, but is not limited to, liquid nitrogen, liquid argon, liquid helium, and liquid chlorofluorocarbons (e.g., hydrochlorofluorocarbons such as chlorodifluoromethane).

In various embodiments, the liquid gas may be produced and transferred to the housing 7 using any suitable technique known in the art, such as cryogenic distillation, e.g., of liquefied air.

In certain embodiments, electrolyte 6 may include one or more additional additives, e.g., gelling agents (e.g., silica or silicates), other inorganic or ceramic powders (e.g., alumina, titania, magnesia, aluminosilicates, or titanates such as $BaTiO_3$), clays (e.g., bentonite or montmorillonite and their derivatives), solvents, polymeric materials (including polymeric microbeads), plasticizers, and combinations thereof. In an embodiment, the additive comprises a gelling agent that contains a mesoporous inorganic oxide, a polycrystalline inorganic oxide or a microcrystalline inorganic oxide. Porous inorganic oxides are useful additives for providing a gel electrolyte. Exemplary additives include silica, silicates, alumina, titania, magnesia, aluminosilicates, zeolites, or titanates.

For example, an electrolyte according to one embodiment of the present invention comprises an ionic liquid, e.g., one of the ionic liquids described herein, such as an ionic liquid comprising a cation, as described herein, and an anion, as described herein, and fumed silica as a gelling agent, which are mixed in a ratio to produce an ionic liquid gel. Certain embodiments may employ a different form of silica as a gelling agent, e.g., silica gel, mesoporous silica, or a microcrystalline or polycrystalline form of silica. The amount of the additive will vary according to the nature of the application and is typically in the range of about 2 wt. % to about 20 wt. %, potentially as much as about 50 wt. %, of the electrolyte. In these embodiments, impurities may also be minimized in the ultracapacitor cell as described above, specifically less than 1,000 ppm moisture, less than 500 ppm moisture, and preferably less than 200 ppm moisture. In addition, other impurities were minimized in these embodiments as described above, particularly halide impurities and organic impurities.

In certain embodiments, an ultracapacitor comprising a gel electrolyte is disclosed. Such ultracapacitors can also operate stably, e.g., at high voltages.

A suitable concentration of additive will be determined based on the desired properties of the electrolyte and/or ultracapacitor, e.g., the viscosity of the electrolyte or the leakage current, capacitance, or ESR of the ultracapacitor. The specific surface area (SSA) also affects the properties of the electrolyte and the resultant ultracapacitor. Generally, a high SSA is desirable, e.g., above about 100 $m^2/g$, above about 200 $m^2/g$, about 400 $m^2/g$, about 800 $m^2/g$, or about 1000 $m^2/g$. The viscosity of the electrolyte comprising the additive affects the performance of the resultant ultracapacitor and must be controlled by adding an appropriate amount of the additive.

In certain embodiments, where an appropriate gel-based electrolyte is employed, a separator-less ultracapacitor 10 can be prepared, as shown in FIG. 1B. A separator-less ultracapacitor 10 of FIG. 1B is prepared in a manner analogous a typical ultracapacitor having a separator, e.g., an ultracapacitor of FIG. 1A, except that the gel-based electrolyte is of a sufficient stability that a separator is not required.

In certain embodiments, a solid state polymeric electrolyte may be prepared and employed in an ultracapacitor. In such embodiments, a polymer containing an ionic liquid is cast by dissolving a polymer in a solvent together with an electrolyte and any other additives, e.g., e.g., gelling agents (e.g., silica or silicates), other inorganic or ceramic powders (e.g., alumina, titania, magnesia, aluminosilicates, or titanates such as $BaTiO_3$), clays (e.g., bentonite or montmorillonite and their derivatives), solvents, other polymeric materials, plasticizers, and combinations thereof. After drying the cast polymer electrolyte film can be incorporated into an ultracapacitor using the techniques for assembling ultracapacitors described herein, except that the polymer electrolyte replaces both the liquid (or gel) electrolyte and the separator in the ultracapacitor. The polymer film may also be cast directly onto the electrode of an ultracapacitor. Exemplary polymers include polyamide, polytetrafluoroethylene (PTFE), polyvinylidene fluoride-hexafluoropropylene copolymer (PVDF-HFP), polyether ether ketone (PEEK), CRAFT, sulfonated poly(ether ether ketone) (SPEEK), crosslinked sulfonated poly(ether ether ketone) (XSPEEK), and other polymer and copolymers stable at high temperature and appropriate for hermetic applications.

The chart represented in FIGS. 14A and 14B shows experimentally obtained performance data for a number of ultracapacitor cells of the type described herein. In each case, the ultracapacitor under test was an EDLC contained in a 7.9 cubic centimeter housing and featuring activated carbon energy storage material on each electrode. The electrolyte used in EDLC included a salt of the type described herein in combined with acetonitrile solvent in the ratio set forth on the chart. The ESR and capacitance for each cell was measured at a variety of temperatures. The results show remarkably stable performance at temperatures as low as −40 C. The data below demonstrates that cells may have a capacitance variance from room temperature to −40 C of less than 1%. Accordingly, it is expected that comparable performance will be evidences at even lower temperatures, e.g., −50 C, −60 C, −70 C, −80 C, or lower, e.g., by use of techniques described above such as the use of multiple solvents, multiple salts, and/or pressurized liquid gas solvents.

Exemplary Applications

In various embodiments, ultracapacitors of the type described herein may be incorporated in a power system, e.g., of the types described in International Patent Application No. PCT/US14/29992 filed Mar. 15, 2014. For example, in various embodiments, the power system may include one or more of an ultracapacitor charging circuit, an ultracapacitor monitoring circuit, a cross over circuit, and a signal interface device such as a modular signal interface device, examples of all of which are described in the reference incorporated herein. In various embodiments, the ultracapacitor may be charged by another energy source, such as a battery, a generator, a wire line, etc.

In some embodiments, the electronic components of the power system may be adapted for extreme (e.g., low, high, or both) temperature use. For example, in some embodiments, the power system may incorporate low temperature electronics of the type described in Patterson, et al., Low Temperature Electronics for Space and Terrestrial Application (accessed Jan. 11, 2015 at https://www.google.com/webhp?sourceid=chrome-instant&ion=1&espv=2&ie=UTF-8#q=low%20temperature%20electronics). In some embodiments, the power system may incorporate one or more heaters (e.g., thermoelectric heaters) to regulate the temperature of the electronics. However, in some other embodiments, no active heating is used.

In various embodiments, multiple ultracapacitors of the type described herein may be incorporated in a power system for use over a wide range of temperatures. For example, the system may include a first set of ultracapacitors adapted for operation at low temperatures, but capable of surviving higher temperatures when not in use. The system may further include a second set of ultracapacitors adapted for operation at high temperatures, but capable of surviving lower temperatures when not in use. The system may include a temperature sensor (or an ultracapacitor performance sensor) and control electronics capable of switching between the two sets of ultracapacitors to use the appropriate set for the ambient conditions (as determined directly from a temperature sensor, or indirectly based on system performance). In various embodiments, more than two sets of capacitors may be used, e.g., with each set adapted to operate in a respective temperature range. In some embodiments, such systems may be configured to have operating temperature ranges of −200 C to 250 C, or any subrange thereof such as −180 C to 250 C, −150 C to 250 C, −125 C to 250 C, −100 C to 250 C, −80 C to 250 C, −70 C to 250 C, −60 C to 250 C, or −50 C to 250 C.

Ultracapacitors described herein may be used in a variety of applications. In general, such ultracapacitors may be employed in power systems used in extreme conditions (e.g., low and/or high temperatures, high mechanical shock and vibration, etc.), e.g., to provide high power output. In various embodiments, the ultracapacitors may be charged from a relatively low rated source (e.g., low voltage, low current, low power, low reliability, and combinations thereof) and provide, e.g., pulses of power (e.g., at higher voltage, higher current, higher power, and combinations thereof) or "smoothed" output with greater reliability than the charging source. For example, in some embodiments, the relatively low rated source may include a battery, a solar cell, a thermoelectric generator, a mechanical generator, or any other suitable source.

In various embodiments, power systems including ultracapacitors described herein may be used to provide power to one or more components with high power demand. For example, in the aerospace context (e.g., airplanes, helicopters, drones, missiles, rockets, space launch vehicles, space exploration vehicles, and the like), the ultracapacitors may be charged over time by a relatively low power source (e.g., the main electrical system of an aerospace vehicle) and then discharged to provide relatively short pulses of high power output, e.g., to power one or more actuators (e.g., to actuate a control surface, door, landing gear, or other component of the vehicle), a sensor (e.g., a location sensor such as a GPS sensor, a radar sensor, an infrared sensor such as forward or downward looking infrared sensors, an acoustic sensor, a pressure sensor, etc.), a communication device (e.g., a radio or optical communication link, a satellite communication link, etc.), or any other suitable component.

In some embodiments, power systems including ultracapacitors described herein may be used as uninterrupted power sources or auxiliary power units, e.g., for use in aerospace vehicles.

Figure 15:
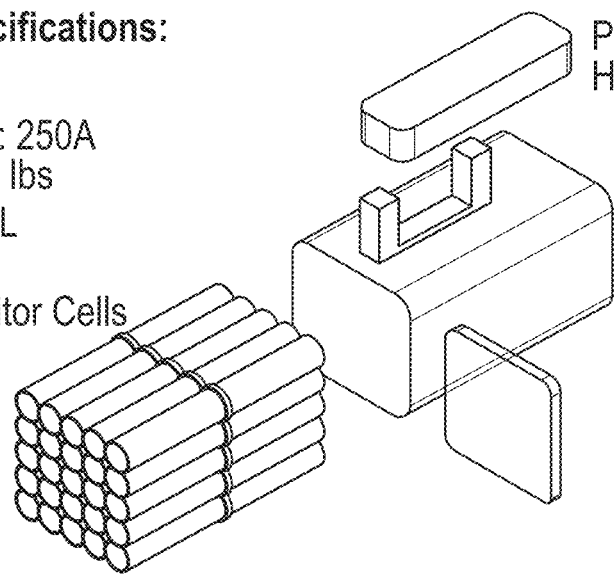
FIG. 15 illustrates a pyro initiator for use in stage separation of a launch vehicle.

In various embodiments, power systems including ultracapacitors of the type described herein may be used in launch vehicles, e.g., to provide power for controlling pyrotechnic devices used to facilitate separation of launch vehicle stages. An exemplary system is shown in the FIG. 15.

In some embodiments, power systems including ultracapacitors of the type described herein may be incorporated in extraterrestrial devices (e.g., satellites, interplanetary probes, etc.). For example, in some embodiments, power systems including ultracapacitors described herein may be suitable for the use in as deep space systems such as exploration vehicles, communication transponders, radars, telescopes, and the like.

In various embodiments, power systems including ultracapacitors of the type described herein may provide various advantages over prior power systems. For example, in some embodiments, ultracapacitors may reduce or eliminate the need for high rated batteries that often are characterized by low volumetric and gravimetric power density and/or may be prone to catastrophic failure. In contrast, ultracapacitors of the type described herein may have high volumetric and gravimetric power density. In some embodiments, ultracapacitors of the type described herein may be free or substantially free from materials associated with catastrophic failure. For example, in some embodiments, ultracapacitors of the type described herein may be free or substantially free from highly flammable materials such as lithium or other alkali metals.

In some embodiments, power systems including low temperature ultracapacitors of the type described herein may reduce or eliminate the need for heating elements (as the associated use of power for heating). For example, in some embodiments, power systems including low temperature ultracapacitors of the type described herein require no active heating. For example, in some embodiments, power systems including low temperature ultracapacitors of the type described herein require no active heating for the ultracapacitor cells, e.g., only requiring heating for associated electronics (e.g., ultracapacitor control, management, monitoring, and other such electronics.)

As noted above, in some embodiments, power systems of the type described herein may include both low temperature and high temperature ultracapacitors combined to provide a very wide operational temperature range. Such power systems may be suitable for use in, e.g., deep space exploration vehicles which may experience wide swings in operational temperature based on, e.g., the amount of sunlight incident on the vehicle.

Although the examples above focus on the use of low temperature electrolytes in ultracapacitors, it is to be understood that such materials may be used in other applications.

For example, in some embodiments low temperature ionic liquid materials of the type described herein may be used, e.g., in electric propulsion devices (e.g., for use in propelling and/or maneuvering satellites or other space craft. For example, temperature ionic liquid materials of the type described herein may be used as propellant in propulsion devices of the type described in Courtney & Lozano, Ionic Liquid Ion Source Emitter Arrays Fabricated on Bulk Porous Substrates for Spacecraft Propulsion, Thesis for Massachusetts Institute of Technology (2011) (accessed Jan. 10, 2015 at http://ssl.mit.edu/publications/theses/PhD-2011-CourtneyDaniel.pdf).

In some embodiments, low temperature electrolytes of the type described herein may be used in electrolytic capacitors (i.e., conventional capacitors that do not use an electric double layer to store energy).

In some embodiments, low temperature electrolytes of the type described herein may be included in drilling fluid material, e.g., when drilling in low temperature regions such as polar regions.

In various embodiments, the teachings herein enable performance of ultracapacitors in extreme conditions. Ultracapacitors fabricated accordingly may, for example, operate at temperatures below $-40$ C (e.g., $-70$ C, $-80$ C, $-90$ C, $-100$ C, $-110$ C or less) and as high as 150 C, 180 C, 200 C, 210 C, 225 C, 250 C or more, e.g., for 10,000 charge/discharge cycles and/or over 100 hours or more at a voltage of 0.5V or more while exhibiting and increase in ESR or less than 100%, e.g. less than about 85% and a decrease in capacitance of less than about 10%. In some embodiments, such ultracapacitors may have a volumetric capacitance of about 5 Farad per liter (F/L), 6 F/L, 7 F/L, 8 F/L, 8 F/L, 10 F/L or more, e.g., in the range of about 1 to about 10 F/L or any sub-range thereof.

In some embodiments, ultracapacitors of the types described herein may exhibit any of: a high volumetric energy density (e.g., exceeding 0.25 Wh/L, 0.5 Wh/L, 1 Wh/L, 2 Wh/L, 3 Wh/L, 4 Wh/L, 5 Wh/L, 6 Wh/L, 7 Wh/L, 8 Wh/L, 9 Wh/L, 10 Wh/L, 11 Wh/L, 12 Wh/L, 15 Wh/L, 18 Wh/L, 20 Wh/L, or more), a high gravimetric energy density (e.g., exceeding 5 Wh/kg, 6 Wh/kg, 7 Wh/kg, 8 Wh/kg, 9 Wh/kg, 10 Wh/kg, 11 Wh/kg, 12 Wh/kg, 15 Wh/kg, 18 Wh/kg, or more), a high volumetric power density (e.g., exceeding 30 kW/L, 40 kW/L, 50 kW/L, 60 kW/L, 70 kW/L, 80 kW/L, 90 kW/L, 100 kW/L, 110 kW/L, 120 kW/L, or more), a high gravimetric power density (e.g., exceeding 30 kW/kg, 40 kW/kg, 50 kW/kg, 60 kW/kg, 70 kW/kg, 80 kW/kg, 90 kW/kg, 100 kW/kg, 110 kW/kg, 120 kW/kg or more), and combinations thereof. In some embodiments, ultracapacitors of the types described herein demonstrate high performance as indicated by the product of energy density and power density, e.g., exceeding 300 Wh-kW/L^2, 500 Wh-kW/L^2, 700 Wh-kW/L^2, or more.

Exemplary Ultracapacitor Performance

Ultracapacitors fabricated according the techniques described herein may, for example, operate at temperatures as high as 350 degrees Celsius or more for 10,000 charge/discharge cycles and/or over 100 hours or more at a voltage of 0.5 V or more while exhibiting and increase in ESR or less than 100%, e.g. less than about 85% and a decrease in capacitance of less than about 10%. In some embodiments, such ultracapacitors may have a volumetric capacitance of about 5 Farad per liter (F/L), 6 F/L, 7 F/L, 8 F/L, 8 F/L, 10 F/L or more, e.g., in the range of about 1 to about 10 F/L or any sub-range thereof.

In some embodiments, ultracapacitors of the types described herein may exhibit any of: a high volumetric energy density (e.g., exceeding 5 Wh/L, 6 Wh/L, 7 Wh/L, 8 Wh/L, 9 Wh/L, 10 Wh/L. 11 Wh/L, 12 Wh/L, 15 Wh/L, 18 Wh/L, 20 Wh/L, or more), a high gravimetric energy density (e.g., exceeding 5 Wh/kg, 6 Wh/kg, 7 Wh/kg, 8 Wh/kg, 9 Wh/kg, 10 Wh/kg, 11 Wh/kg, 12 Wh/kg, 15 Wh/kg, 18 Wh/kg, or more), a high volumetric power density (e.g., exceeding 30 kW/L, 40 kW/L, 50 kW/L, 60 kW/L, 70 kW/L, 80 kW/L, 90 kW/L, 100 kW/L, 110 kW/L, 120 kW/L, or more), a high gravimetric power density (e.g., exceeding 30 kW/kg, 40 kW/kg, 50 kW/kg, 60 kW/kg, 70 kW/kg, 80 kW/kg, 90 kW/kg, 100 kW/kg, 110 kW/kg, 120 kw/KG or more), and combinations thereof. In some embodiments, ultracapacitors of the types described herein demonstrate high performance as indicated by the product of energy density and power density, e.g., exceeding 300 Wh-kW/L^2, 500 Wh-kW/L^2, 700 Wh-kW/L^2 or more or 300 Wh-kW/kg^2, 500 Wh-kW/kg^2, 700 Wh-kW/kg^2, or more.

In some embodiments, the ultracapacitors disclosed herein are capable of maintaining their performance over a long period of time, e.g., hundreds of thousands, or even millions of charge/discharge cycles. In some such embodiments, cell lifetime is defined as the number of cycles required before the cell exhibits a reduction in discharge energy of 5% or more or an increase in ESR of 25% or more.

In an embodiment, a solid state electrolyte for use in an ultracapacitor comprises a polymer matrix doped with an ionic liquid and two solvents-a first solvent and a second solvent; where the second solvent has a melting point lower than the first solvent; where the first solvent has a dielectric constant at 25° C. greater than about 2. An ultracapacitor that utilizes the electrolyte is configured to output electrical energy at temperatures throughout an operating temperature range. The operating temperature range comprises 0 degrees Celsius to 275 degrees Celsius, preferably 0 degrees Celsius to 250 degrees Celsius.

The ultracapacitor that utilizes the electrolyte is configured to output electrical energy at operating voltages throughout an operating voltage range, the operating voltage range being between about 0 V and about 0.5 V.

In an embodiment, the solid state electrolyte is cast directly onto an electrode in the ultracapacitor. In another embodiment, the second solvent may have a melting point that is lower than the boiling point of the first solvent by at least 10° C. The first solvent comprises acetonitrile, trimethylamine, propylene carbonate or gamma-butyrolactone. In yet another embodiment, the second solvent comprises methyl formate, ethyl acetate, methyl acetate, propionitrile, butyronitrile or 1,3-dioxolane.

The ionic liquid comprises a cation comprising at least one of: tetrabutylammonium, 1-(3-cyanopropyl)-3-methylimidazolium, 1,2-dimethyl-3-propylimidazolium, 1,3-bis(3-cyanopropyl)imidazolium, 1,3-diethoxyimidazolium, 1-butyl-1-methylpiperidinium, 1-butyl-2,3-dimethylimidazolium, 1-butyl-3-methylimidazolium, 1-butyl-4-methylpyridinium, 1-butylpyridinium, 1-decyl-3-methylimidazolium, 1-ethyl-3-methylimidazolium, 1-pentyl-3-methylimidazolium, 1-hexyl-3-methylimidazolium, 3-methyl-1-propylpyridinium, or a combination thereof.

The ionic liquid comprises a cation comprising at least one of: ammonium, imidazolium, pyrazinium, piperidinium, pyridinium, pyrimidinium, and pyrrolidinium and combinations thereof. The ionic liquid comprises a anion comprising at least one of: bis(trifluoromethanesulfonate)imide, tris (trifluoromethanesulfonate)methide, dicyanamide, tetrafluoroborate, tetra(cyano)borate, hexafluorophosphate, tris(pentafluoroethyl)trifluorophosphate, trifluoromethanesulfonate, bis(pentafluoroethanesulfonate)imide, thiocyanate, trifluoro (trifluoromethyl)borate, and combinations thereof.

In an embodiment, the electrolyte comprises at least one additive. The additive comprises a porous inorganic oxide. The porous inorganic oxide comprises at least one of silica, silicates, alumina, titania, magnesia, aluminosilicates, zeolites, titanates, or combinations thereof.

In one embodiment, the additive comprises silica or silicates. In another embodiment, the additive comprises a mesoporous inorganic oxide. In yet another embodiment, the additive comprises a gelling agent that comprises a polycrystalline inorganic oxide. In yet another embodiment, the additive comprises a gelling agent that comprises a microcrystalline inorganic oxide.

The additive comprises preferably a material with a specific surface area (SSA) above about 400 m2/g. In an embodiment, at least one solvent of the two solvents is a gas at 0° C. and 760 mm Hg.

As trade-offs may be made among various demands of the ultracapacitor (for example, voltage and temperature) performance ratings for the ultracapacitor may be managed (for example, a rate of increase for ESR, capacitance) may be adjusted to accommodate a particular need. Note that in reference to the foregoing, "performance ratings" is given a generally conventional definition, which is with regard to values for parameters describing conditions of operation.

Note that measures of capacitance as well as ESR, as presented herein, follow generally known methods. Consider first, techniques for measuring capacitance.

Capacitance may be measured in a number of ways. One method involves monitoring the voltage presented at the capacitor terminals while a known current is drawn from (during a "discharge") or supplied to (during a "charge") of the ultracapacitor. More specifically, we may use the fact that an ideal capacitor is governed by the equation:

$$I=C*dV/dt,$$

where I represents charging current, C represents capacitance and dV/dt represents the time-derivative of the ideal capacitor voltage, V. An ideal capacitor is one whose internal resistance is zero and whose capacitance is voltage-independent, among other things. When the charging current is I constant, the voltage V is linear with time, so dV/dt may be computed as the slope of that line. However, this method is generally an approximation and the voltage difference provided by the effective series resistance (the ESR drop) of the capacitor should be considered in the computation or measurement of a capacitance. The effective series resistance (ESR) may generally be a lumped element approximation of dissipative or other effects within a capacitor. Capacitor behavior is often derived from a circuit model comprising an ideal capacitor in series with a resistor having a resistance value equal to the ESR. Generally, this yields good approximations to actual capacitor behavior.

In one method of measuring capacitance, one may largely neglect the effect of the ESR drop in the case that the internal resistance is substantially voltage-independent, and the charging or discharging current is substantially fixed. In that case, the ESR drop may be approximated as a constant and is naturally subtracted out of the computation of the change in voltage during said constant-current charge or discharge. Then, the change in voltage is substantially a reflection of the change in stored charge on the capacitor. Thus, that change in voltage may be taken as an indicator, through computation, of the capacitance.

For example, during a constant-current discharge, the constant current, I, is known. Measuring the voltage change during the discharge, Delta V, during a measured time interval DeltaT, and dividing the current value I by the ratio Delta V/DeltaT, yields an approximation of the capacitance. When the current I is measured in Amperes, DeltaV in volts, and DeltaT in seconds, the capacitance result will be in units of Farads.

Turning to estimation of ESR, the effective series resistance (ESR) of the ultracapacitor may also be measured in a number of ways. One method involves monitoring the voltage presented at the capacitor terminals while a known current is drawn from (during a "discharge") or supplied to (during a "charge") the ultracapacitor. More specifically, one may use the fact that ESR is governed by the equation:

$$V=I*R,$$

where I represents the current effectively passing through the ESR, R represents the resistance value of the ESR, and V represents the voltage difference provided by the ESR (the ESR drop). ESR may generally be a lumped element approximation of dissipative or other effects within the ultracapacitor. Behavior of the ultracapacitor is often derived from a circuit model comprising an ideal capacitor in series with a resistor having a resistance value equal to the ESR. Generally, this yields good approximations of actual capacitor behavior.

In one method of measuring ESR, one may begin drawing a discharge current from a capacitor that had been at rest (one that had not been charging or discharging with a substantial current). During a time interval in which the change in voltage presented by the capacitor due to the change in stored charge on the capacitor is small compared to the measured change in voltage, that measured change in voltage is substantially a reflection of the ESR of the capacitor. Under these conditions, the immediate voltage change presented by the capacitor may be taken as an indicator, through computation, of the ESR.

For example, upon initiating a discharge current draw from a capacitor, one may be presented with an immediate voltage change DeltaV over a measurement interval DeltaT. So long as the capacitance of the capacitor, C, discharged by the known current, I, during the measurement interval, DeltaT, would yield a voltage change that is small compared to the measured voltage change, DeltaV, one may divide DeltaV during the time interval DeltaT by the discharge current, I, to yield an approximation to the ESR. When I is measured in Amperes and DeltaV in Volts, the ESR result will have units of Ohms.

Both ESR and capacitance may depend on ambient temperature. Therefore, a relevant measurement may require the user to subject the ultracapacitor to a specific ambient temperature of interest during the measurement.

Performance requirements for leakage current are generally defined by the environmental conditions prevalent in a particular application. For example, with regard to a capacitor having a volume of 20 mL, a practical limit on leakage current may fall below 100 mA. As referred to herein, a "volumetric leakage current" of the ultracapacitor generally refers to leakage current divided by a volume of the ultracapacitor, and may be expressed, for example in units of mA/cc. Similarly, a "volumetric capacitance" of an ultracapacitor generally refers to capacitance of the ultracapacitor divided by the volume of the ultracapacitor, and may be expressed, for example in units of F/cc. Additionally, "volumetric ESR" of the ultracapacitor generally refers to ESR of the ultracapacitor multiplied by the volume of the ultracapacitor, and may be expressed, for example in units of Ohms*cc.

Note that one approach to reduce the volumetric leakage current at a specific temperature is to reduce the operating voltage at that temperature. Another approach to reduce the volumetric leakage current at a specific temperature is to increase the void volume of the ultracapacitor. Yet another approach to reduce the leakage current is to reduce loading of the energy storage media on the electrode of the ultracapacitor.

A variety of environments may exist where an ultracapacitor of the type described herein is of particular usefulness. For example, in automotive applications, ambient temperatures of 105 degrees Celsius may be realized (where, in some embodiments, a practical lifetime of some exemplary ultracapacitors will range from about 1 year to 20 years). In some downhole applications, such as for geothermal well drilling, ambient temperatures of 250 degrees Celsius or more may be reached (where, in some embodiments, a practical lifetime of some exemplary ultracapacitors will range from about 100 hours to 10,000 hours).

A "lifetime" for an ultracapacitor is also generally defined by a particular application and is typically indicated by a certain percentage increase in leakage current or degradation of another parameter (as appropriate or determinative for the given application). For instance, in one embodiment, the lifetime of an ultracapacitor in an automotive application may be defined as the time at which the leakage current increases to 200% of its initial (beginning of life or "BOL") value. In another embodiment, the lifetime for an ultracapacitor in a downhole application may be defined based on the increase of its ESR from its initial BOL value, e.g., the lifetime may be defined as the time at which the ESR increases to 50%, 75%, 100%, 150%, or 200% of its BOL value.

As used herein, "peak power density" is one fourth times the square of peak device voltage divided by the effective series resistance of the device. "Energy density" is one half times the square of the peak device voltage times the device capacitance.

Nominal values of normalized parameters may be obtained by multiplying or dividing (as appropriate) the normalized parameters (e.g. volumetric leakage current) by a normalizing characteristic (e.g. volume). For instance, the nominal leakage current of an ultracapacitor having a volumetric leakage current of 10 mA/cc and a volume of 50 cc is the product of the volumetric leakage current and the volume, 500 mA. Meanwhile the nominal ESR of an ultracapacitor having a volumetric ESR of 20 mOhm*cc and a volume of 50 cc is the quotient of the volumetric ESR and the volume, 0.4 mOhm.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various embodiments described herein are to be understood in both open and closed terms. In particular, additional features that are not expressly recited for an embodiment may fall within the scope of a corresponding claim, or can be expressly disclaimed (e.g., excluded by negative claim language), depending on the specific language recited in a given claim.

Unless otherwise stated, any first range explicitly specified also may include or refer to one or more smaller inclusive second ranges, each second range having a variety of possible endpoints that fall within the first range. For example, if a first range of 3 V>X>10 V is specified, this also specifies, at least by inference, 4 V<x<9 V, 4.2 V<x<8.7 V, and the like.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of and "consisting essentially of shall be closed or semi-closed transitional phrases, respectively, as set forth in the United States Patent Office Manual of Patent Examining Procedures, Section 2111.03.

What is claimed is:

1. A solid state electrolyte for use in an ultracapacitor comprising:
   a polymer matrix doped with an ionic liquid and two solvents-a first solvent and a second solvent; where the second solvent has a melting point lower than the first solvent; where the first solvent has a dielectric constant at 25° C. greater than about 2;
   an additive; and
   wherein an ultracapacitor that utilizes the electrolyte is configured to output electrical energy at temperatures throughout an operating temperature range.

2. The electrolyte of claim 1, wherein the operating temperature range comprises 0 degrees Celsius to 275 degrees Celsius.

3. The electrolyte of claim 1, where the solid state electrolyte is cast directly onto an electrode in the ultracapacitor.

4. The electrolyte of claim 1, where the first solvent comprises acetonitrile, trimethylamine, propylene carbonate or gamma-butyrolactone.

5. The electrolyte of claim 1, where the second solvent comprises methyl formate, ethyl acetate, methyl acetate, propionitrile, butyronitrile or 1,3-dioxolane.

6. The electrolyte of claim 1, where the second solvent may have a melting point that is lower than the boiling point of the first solvent by at least 10° C.

7. The electrolyte of claim 1, wherein the ionic liquid comprises a cation comprising at least one of: tetrabutylammonium, 1-(3-cyanopropyl)-3-methylimidazolium, 1,2-dimethyl-3-propylimidazolium, 1,3-bis(3-cyanopropyl)imidazolium, 1,3-diethoxyimidazolium, 1-butyl-1-methylpiperidinium, 1-butyl-2,3-dimethylimidazolium, 1-butyl-3-methylimidazolium, 1-butyl-4-methylpyridinium, 1-butylpyridinium, 1-decyl-3-methylimidazolium, 1-ethyl-3-methylimidazolium, 1-pentyl-3-methylimidazolium, 1-hexyl-3-methylimidazolium, 3-methyl-1-propylpyridinium, or a combination thereof.

8. The electrolyte of claim 1, wherein the ionic liquid comprises a cation comprising at least one of: ammonium, imidazolium, pyrazinium, piperidinium, pyridinium, pyrimidinium, and pyrrolidinium and combinations thereof.

9. The electrolyte of claim 1, wherein the ionic liquid comprises a anion comprising at least one of: bis(trifluoromethanesulfonate)imide, tris(trifluoromethanesulfonate)methide, dicyanamide, tetrafluoroborate, tetra(cyano)borate, hexafluorophosphate, tris(pentafluoroethyl)trifluorophosphate, trifluoromethanesulfonate, bis(pentafluoroethanesulfonate)imide, thiocyanate, trifluoro(trifluoromethyl)borate, and combinations thereof.

10. The electrolyte of claim 1, wherein the additive comprises a porous inorganic oxide.

11. The electrolyte of claim 10, wherein the porous inorganic oxide comprises at least one of silica, silicates, alumina, titania, magnesia, aluminosilicates, zeolites, titanates, or combinations thereof.

12. The electrolyte of claim 1, wherein the additive comprises silica or silicates.

13. The electrolyte of claim 1, wherein the additive comprises a mesoporous inorganic oxide.

14. The electrolyte of claim 1, wherein the additive comprises a gelling agent that comprises a polycrystalline inorganic oxide.

15. The electrolyte of claim 1, wherein the additive comprises a gelling agent that comprises a microcrystalline inorganic oxide.

16. The electrolyte of claim 1, wherein the additive comprises a material with a specific surface area (SSA) above about 400 $m^2/g$.

17. The electrolyte of claim 1, wherein the ultracapacitor that utilizes the electrolyte is configured to output electrical energy at operating voltages throughout an operating voltage range, the operating voltage range being between about 0 V and about 0.5 V.

* * * * *